United States Patent
Anand et al.

[11] Patent Number: 5,832,496
[45] Date of Patent: Nov. 3, 1998

[54] SYSTEM AND METHOD FOR PERFORMING INTELLIGENT ANALYSIS OF A COMPUTER DATABASE

[75] Inventors: Tejwansh S. Anand, Roswell, Ga.; Glenn K. Wikle, Sante Fe, N. Mex.; Marshall P. Lindsay, San Diego, Calif.; Richard N. Schubert, San Diego, Calif.; Drew T. Lettington, San Diego, Calif.; Jeffrey P. Ludwig, San Diego, Calif.

[73] Assignee: NCR Corporation, Dayton, Ohio

[21] Appl. No.: 742,006

[22] Filed: Oct. 31, 1996

Related U.S. Application Data

[63] Continuation-in-part of Ser. No. 542,266, Oct. 12, 1995.

[51] Int. Cl.$^6$ .................................................... G06F 17/00
[52] U.S. Cl. ......................... 707/102; 345/326; 345/358; 395/50; 395/52
[58] Field of Search ................... 707/1–206; 395/50–52; 345/326–358

[56] References Cited

U.S. PATENT DOCUMENTS

| | | | |
|---|---|---|---|
| 5,088,052 | 2/1992 | Spielman et al. | 395/158 |
| 5,404,506 | 4/1995 | Fujisawa et al. | 395/600 |
| 5,414,838 | 5/1995 | Kolton et al. | 395/600 |
| 5,455,945 | 10/1995 | VanderDrift | 395/600 |
| 5,471,611 | 11/1995 | McGregor | 395/600 |
| 5,537,590 | 7/1996 | Amado | 395/600 |
| 5,544,298 | 8/1996 | Kanavy et al. | 395/155 |

OTHER PUBLICATIONS

Korth and Silberschatz, "Database System Concepts" 2/E, McGraw–Hill Inc., pp. 97–98, 1986.

*Primary Examiner*—Thomas G. Black
*Assistant Examiner*—David Yiuk Jung
*Attorney, Agent, or Firm*—Needle & Rosenberg

[57] ABSTRACT

A system and method for performing intelligent analysis and for generating a report for a user which allows the user to make decisions, without requiring the user to understand or interpret data itself. A database computer includes a database containing the data. The data includes a collection of information about an enterprise of the user. A server computer is coupled to the database computer and executes a database management program. A client computer is coupled to the server and executes an application program. The application program allows a user to define predetermined data types, to define relationships between the data types, to define parameters for the report, to define a method of analysis for the report, and to create the report. The report summarizes the data in terms of the data types, the data relationships, and the method of analysis.

17 Claims, 33 Drawing Sheets

FIG. 7A

Folder Name: Analyst Name

Selections:
No selections have been made.

Analyst Name, Analysis Type & Measure(s)    130

Analyst Name:
[          ]

Type of Analysis:
[Change Analysis  ⇨]    Compare a measure or measures across two time periods.

Measure(s) to be analyzed:

Target Measure:
[(none)  ⇨]

Additional Measure(s):
[⇦  [  ]  ⇨]
Product Share
Market Share
Number of Items Stocked per Store
Sales Volume
Everyday Number of Stores
Regular Number of Stores

[Help] [Cancel]   [< Back] [Next >] [Run Now] [Save] [Save As]

FIG. 7C

Employees:

Selections:
No selections have been made.

Time Period Considered   130

Choose the time period the analyst will consider in the report (e.g. 1 week, year to date).

Type of Year Used: [Calendar Year ▼]

Base Period:
- ⦿ _ to date
- ○ Previous_
- ○ Specific Period
- ○ Specific Dates

[Quarter ▼] to date

Because you chose to perform a Change Analysis, choose a comparison time period.

Comparison Period: [_____ ▼]

[Help]  [Cancel]     [< Back] [Next >] [Run Now] [Save] [Save As]

FIG. 7D

Employees:

Selections:
No selections have been made.

130

Schedule and Trigger Option

If you want this analyst to run on a schedule (e.g., every week), fill in the schedule.

Schedule
☐ Enable Schedule

Report every [1 ⇵] [week ⇵] for [1 ⇵] [month ⇵]

Start on [10/21/96 ⇵]

Would you like set a trigger so that this analyst will run if a measure changes in a certain way (e.g., Revenue > $1,000,000)?

⦿ No   ○ Yes

[Help]   [Cancel]   [< Back]   [Next >]   [Run Now]   [Save]   [Save As]

FIG. 9A

Measure Builder — 132

Measure Name:

Measure Definition:
Sum | Count | Avg. | Time | Measure.... | + | - | * | / | ( | )

Units:

○ Private Measure
○ Public Measure

Measure Description:

Help | Delete | New | Save | Cancel

FIG. 11

Restrict Relationship

Range Restriction
☒ When Display Discount [is less than] [10]

Magnitude Restriction
☒ When Display Discount increases by [12] [%]

Segment Restriction
☐ This relationship is only true for these segments

Defined Segments:
All Customers

All Customers
+ [Street Address]
+ [City]
+ [State]
+ [Income]
+ [Name]
+ [Zipcode]
+ [Head of Household]
+ [Marital Status]
+ [Ethnic Group]

Selected Segments:

[Add >]
[> Remove]

[Help]  [Reset]  [OK]  [Cancel]

SYSTEM AND METHOD FOR PERFORMING INTELLIGENT ANALYSIS OF A COMPUTER DATABASE

CROSS-REFERENCE TO RELATED APPLICATIONS

This patent application is a continuation-in-part of U.S. patent application Ser. No. 08/542,266, filed Oct. 12, 1995 now pending, and entitled "System and Method For Generating Reports From a Computer Database". This patent application is also related to co-pending U.S. patent application Ser. No. 08/742,007, filed Oct. 31, 1996, and entitled "System and Method For Segmenting a Database Based Upon Data Attributes", and Ser. No. 08/742,003, filed Oct. 31, 1996, and entitled "Hypertext Markup Language (HTML) Extensions For Graphical Reporting Over An Internet" now U.S. Pat. No. 5,748,188.

BACKGROUND OF THE INVENTION

1. Field of the Invention

The present invention relates to expert systems and reporting systems, and more specifically to a system and method for generating reports from a computer database.

2. Description of the Prior Art

Storing large amounts of transaction-level data for later analysis (data warehousing) is becoming recognized as an enabler for businesses that are seeking a competitive advantage. Tightening competitive environments and global economic trends are forcing businesses and entire industries to search for a means to gain an advantage. This advantage can be realized through the use of strategic data relating to their business—allowing better and more timely decisions, leading to a better understanding of their business and support for their customers, that ultimately leads to growth. To make use of data warehouses, the data must be retrieved, organized and then presented in an understandable format.

Discovery tools are used to retrieve, analyze and present data from data warehouses. These tools can range from very complex modeling tools to relatively simple end user query tools designed to do no more than mask the complexity of the SQL database programming language from the user. Automated tools that search the data for trends or relationships are also considered discovery tools.

The marketplace is comprised of various tool vendors whose products provide solutions for a portion of the entire knowledge discovery process. Therefore, to effectively utilize their data, the user community is forced to pick multiple, disjoint tools. In addition, these tools are targeted toward the expert user who has an in-depth knowledge of the data and database formats or the various analytic methods that are implemented in the tool. Existing products also do not let the business user explicitly and iteratively represent business knowledge. Finally, the output of existing tools consists of tables of numbers that users have to analyze and interpret.

Data warehouses, and databases in general, typically have complex structure organized for efficiency of data retrieval, not ease-of-use by the end user. Users, especially business users, desire reports in their vocabulary, not the vocabulary of the database. While some tools in the marketplace allow a user to define new terms and map those terms to the database, the management of related sets of new terms is not supported. That is, the relationship of a new term to existing terms is not automatically detected for the user.

In addition to these difficulties, it is common for the contents of a report to cause a user to desire another, similar report. Saving and re-using sets of related reports (re-generating the reports over a new set of data) is also desired. The generation of related reports and the re-generation of reports over new data is a capability not adequately available in the marketplace.

Therefore, it would be desirable to provide a system and method for generating reports from a computer database which allow a user to retrieve and analyze data with one tool without requiring the user to have knowledge of underlying data structures or of the SQL database programming language, which allow a user to define new terms and detect and manage relationships between terms, which allow a user to easily generate related reports, and which allow a user to re-run sets of related reports over new data.

SUMMARY OF THE INVENTION

In accordance with the teachings of the present invention, a system and method for performing intelligent analysis and generating reports from a computer database are provided.

A database computer includes a database containing the data. The data includes a collection of information about an enterprise of the user. A server computer is coupled to the database computer and executes a database management program. A client computer is coupled to the server and executes a metadata management and SQL generator program. The application program allows a user to define predetermined data types, to define relationships between the data types, to define parameters for the report, to define a method of analysis for the report, and to create the report. The report summarizes the data in terms of the data types, the data relationships, and the method of analysis.

BRIEF DESCRIPTION OF THE DRAWINGS

FIGS. 6–12 are views of a tool for creating reports which employs a graphic user interface;

DETAILED DESCRIPTION OF THE INVENTION

1. Overview of Basic Invention

Figure 1:
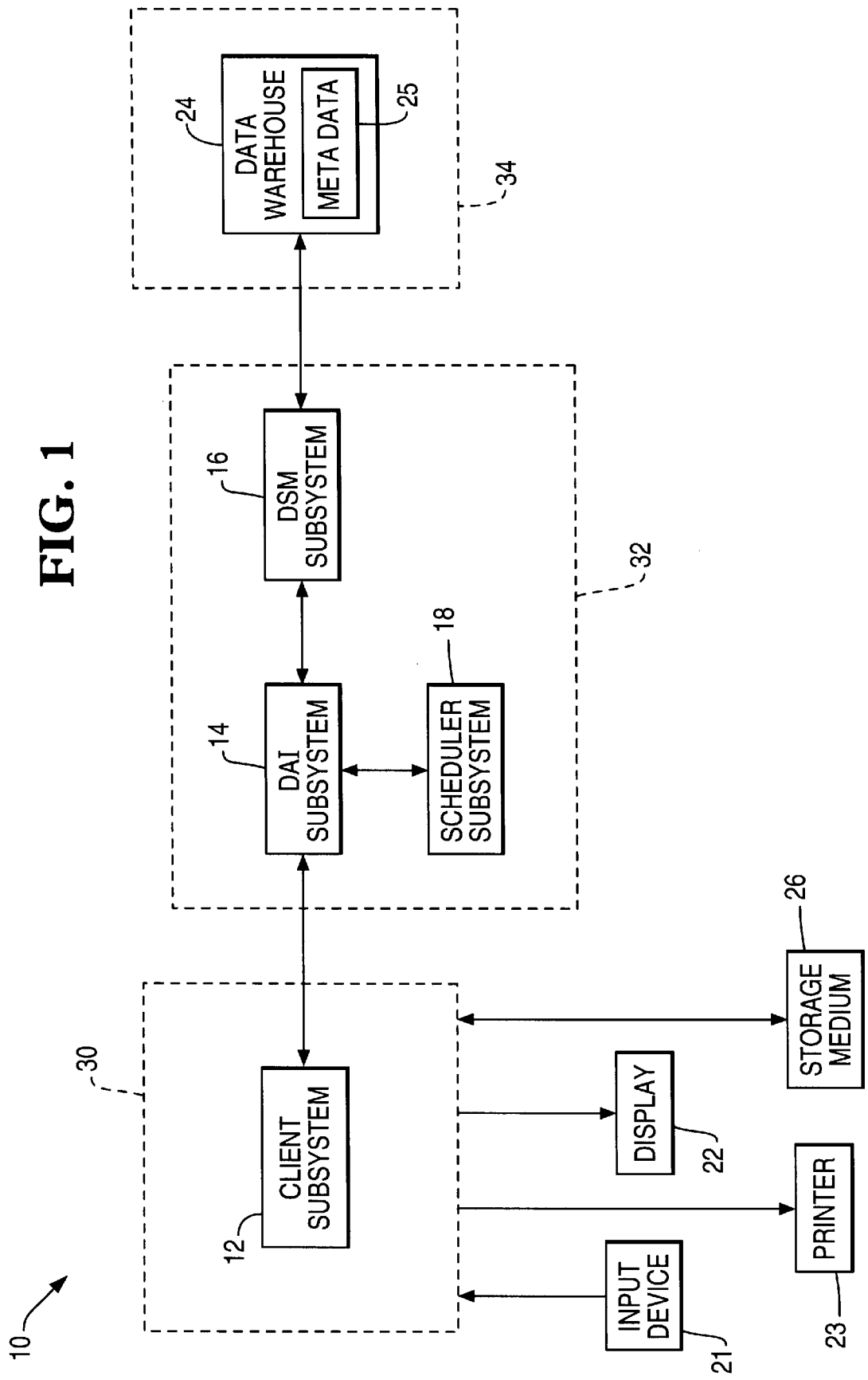
FIG. 1 is a block diagram of the system of the present invention.

Referring now to FIG. 1, system 10 includes four major subsystems: client subsystem 12, data abstraction intelligence (DAI) subsystem 14, data and schema manipulation (DSM) subsystem 16, and scheduler subsystem 18.

In connection with the description of system 10, the following definitions are provided:

An Alert Condition is a user-defined condition or set of conditions that when satisfied returns an Alert Message. For instance, an Alert Condition may be defined so that when the inventory of brand A shirts drops below 200 units for a given week, system 10 produces an Alert Message, InfoFrame or runs another analyst.

An Alert Message is a message that notifies the user that an Alert Condition has been satisfied. From an Alert Message the user can select the corresponding InfoFrame to be run. An example of an Alert Message would be "Alert: the inventory of brand A shirts is below 200."

An Alert InfoFrame is a type of InfoFrame that describes an Alert Message in detail. The Alert InfoFrame has a description of what happened, when, and probable reasons why it occurred.

An Analyst specifies an event in the data which must trigger an Alert; or specifies the type of analysis and the business measures and segments to be reported on in an InfoFrame, and optionally the schedule on which this InfoFrame is to be generated or the event in the data which must trigger the InfoFrame.

An attribute is a characteristic or feature of an entity represented in the warehouse. For example, Color, Manufacturer, or Size are all attributes of the product category of Clothing.

An attribute restriction is an expression that restricts the value that attribute can have. For example, in "Price is less than $10.00", the "less than $10.00" is a restriction on the Prices attribute. Another example might be: "Woman's Clothing or Men's Clothing" is a restriction on the Department Attribute. A single attribute value, like "Blue" or "Men's Clothing", is also an attribute restriction.

A specific entity (like a product) in the data warehouse is represented as a set of attributes and values. For example, the product "Perry Ellis men's shirt, size 42, color blue", might be represented as "Product: Department: Men's Clothing; Manufacturer: Perry Ellis; Size: 42; Color: blue". These values are members of a specific domain for each attribute (see below).

Business Indicators are classifications across Business Concepts that are usually related to numerical values (e.g. Sales Volume, Inventory, Price). Business indicators have methods and formulae that pertain to their computation (e.g. Total Sales) and causal associations between Business Indicators (e.g. If Price increases Sales Volume should decrease). Within a Business Indicator, segments can be defined which describe a specific group of Business Indicators of interest (e.g. Senior Customer, Company A Products).

A Change Analysis Report is a compound document describing Business Indicators over two time periods. Within system 10, one can specify two periods of time and see the difference of a chosen Business Indicator for that period (e.g., How did this year's sales of textiles compare to last years sales?) Change Analysis Reports can report results for a day, week, month, quarter, year, or other defined period.

A Comparison Analysis InfoFrame is a type of InfoFrame helps a business user compare the value of two Business Indicators across the same time period or compare the value of the same Business Indicator across two sibling segments across the same time period.

Compound Business Indicators are user-defined Business Indicators created by combining primitive Business Indicators with arithmetic and set operations.

A Data Warehouse is a very large collection of data that is housed in one or more databases. These databases usually reside on database server computers and can be either in one location or distributed geographically.

A Dimension defines the high-level categories of entities. For example, in a Retail domain, the dimensions might be: Product, Market, and Time (Time is a universal dimension applicable to any domain). A dimension has associated with a set of attributes that can be used to describe its entities; for example, Brand, Manufacturer and Size describe the dimensions of a product.

Every attribute has an implicit or explicit domain of values. For example, the domain of values for the Department attribute is an encoding of the legitimate departments for the enterprise, and the domain of values for the Size attribute is a non-zero number representing the size in specified units.

A Drill Down Heuristic specifies some relation between the measure values of the segments of a free attribute of a segment which must be reported to the user.

End Users are users for which system 10 is specifically designed. End users typically have knowledge of a business' operations and for this example have used Microsoft Windows (Windows 3.1, Windows NT & Windows 95, etc.). End users typically do not have expertise in SQL code generation or the specific data structures of the databases they want to access.

Enterprise Information Factory (EIF) is a commercial software package that allows typical business users to access their data warehouse data. The data warehouse is essentially a passive environment that usually requires the use of SQL code and knowledge about the structure of the database to access data. The EIF differs from the data warehouse by providing a foundation for providing tools to allow users without SQL or database knowledge to get data out of their databases.

An Exception Analyst is specifically an Analyst which runs regularly to test for a trigger condition, and which returns an Alert or a Report when the trigger condition occurs.

If the domain of an attribute is a finite set (like Department above), it is called a finite domain. The alternative is an infinite or continuous domain, like Price.

A Free Attribute is an attribute of a segment which has not been restricted to define that segment. Color, Cost, and Weight might all be free attributes of the segment "Expensive Shirts".

A Heuristic Rule specifies some condition of data, some relation between the segment measure values found by an analyst, that should be reported to the user in the completed InfoFrame.

HyperText Markup Language (HTML) is an emerging standard format for software documents that allows for the inclusion of hyperlinks and graphics (pictures, graphs, tables) in text documents. A hyperlink is a "hot" area in the document (usually text in a different color than the surrounding text), that when clicked on, shows another document that is related or linked to the original HTML document.

InfoFrame Definitions are System Templates that have been customized to include particular Business Concepts, Business Indicators, Time Intervals, Analysis Type, and segments. InfoFrame Definitions can be immediately "run" to produce a "InfoFrame", saved to be run later, saved and scheduled to be run later, or triggered by another analyst.

A Knowledge Worker is typically a person familiar with SQL, who knows the structure of the Data Warehouse and who has an analytical background. In addition, the Knowledge Worker may use statistical and data analysis packages and data modeling tools.

Managament Discovery Tool (MDT) refers to the overall system of the present invention.

Metadata is the collection of information about the end user's particular business, and may be one of three types: core, public or private. After installation this information is stored in the end user's database and is used to tailor reports to the end user's particular business needs. Metadata includes, but is not limited to, Business Concepts, Business Indicators, Segments, Attributes, Attribute Values and Measure Relationships.

The core set of metadata is typically set up at installation by professional services personnel and the MDT Administrator. Core metadata consists of Dimensions, Attributes, Basic Measures, Segments and Year definitions.

Public metadata is only changeable by the MDT Administrator and Knowledge Worker user types and is defined and modified after installation. Public metadata includes Public Composite Measures, Public Measure Relationships and Public Segments.

Private metadata belongs to each user and is only changeable by the end user (Business/executive user) user type. Private metadata includes Private Composite Measures, Private Measure Relationships and Private Segments.

If an attribute has a finite domain, the Natural Partition is the partition where each segment corresponds to each element of the domain. For example, the natural partition of the Department attribute is the set of segments "Men's Clothing", "Woman's Clothing", etc.

Object Linking and Embedding (OLE) is a computer format that allows objects (e.g., graphs, tables) in computer documents to, when double clicked on, bring up the software application that created the object (graph, table, document).

If the user-defined segments for a given partition do not cover the domain, then an "Other" segment will stand for the rest of the partition.

A partition is an implicit or explicit division of the dimension by the restriction of a single attribute. For example, of one takes the Price attribute, and the "less than $10.00" restriction, this defines a partition of products into two sets or segments: those products with Price less than ten dollars, and those products with Price greater to or equal to ten dollars. Note that the sets or segments of a partition must cover the original set and not overlap, i.e., "Price<$10.00" and "Price<$15.00" do not define a partition.

Primitive Business Indicators are Business Indicators that are directly mappable to data in the data warehouse. They are set up during installation of the present invention and are not changeable by the end user.

Reports or InfoFrames are compound documents that display data from a database in text and graphics (e.g., graphs, tables). Reports are the result of running a InfoFrame Definition. InfoFrames may be in the HTML format and may be OLE 2.0 compliant.

A Restricted Attribute is an attribute of a segment which has be restricted to defined the segment. Product and Price might be the restricted attributes of "Expensive Shirts".

Segments are user-defined groups that are defined within a Business Concept having a meaningful attribute or attributes in common. For instance, the segment "Senior Customers" might be those customers whose age is greater than 65 years.

A segment is one part of a partition. Actually, a segment is a subset of data defined by restrictions on one or several attributes. If a segment is defined by several attributes, it can be part of several partitions, one for each restricted attribute (as shown shortly. This means that, given a segment in isolation, one cannot determine which partition it "should" belong to, and thus, one cannot determine its natural parents in the hierarchy).

A set of segments forms a segment hierarchy under the subset relation, with a root that is the "top-level segment", which contains all of the members of the dimension.

Structured Query Language (SQL) is a structured language for viewing the contents of a relational database.

Summarization InfoFrame is a type of InfoFrame that shows a roll-up or summarization of a specified Business Indicator across one or more specified segments. By selecting a particular Business Indicator in this report a InfoFrame showing the "winners" and "losers" for the specified period can be automatically produced.

System Administrators (MDT Administrators, or MDTA) are those users of system 10 who have an intimate knowledge of the databases and data structures of an organization. Often the System Administrator has the title of "database administrator" (DBA).

A Text Generation Rule specifies the text that must be inserted into an InfoFrame when the some heuristic rule is satisfied.

A Trend Analysis InfoFrame is a type of InfoFrame that, when defined, shows the trend for a specific Business Indicator or indicators over a specified period of time. This analysis can aid in forecasting the future by identifying patterns in past activities.

Client subsystem 12 is a single application program which has a graphical user interface (GUI) 40 and which allows a user to select and specify parameters for InfoFrames, view InfoFrames, print InfoFrames, and save InfoFrames. Finally, the user can define Composite Business Indicators and Segments, create Analysts, define Measure Relationships, or modify the schedule of Analysts.

DAI subsystem 14 provides intelligent middleware for translating graphical user requests, selecting system templates, manipulating data views, and generating dimensional queries for retrieving data from data warehouse 24. It also contains rules for choosing default parameters, for choosing layout and display formats, and for generating text from data. DAI subsystem 14 is responsible for instantiating user selected InfoFrames and managing several kinds of metadata 25 used in this instantiation. This metadata 25 represents Business Concepts and Business Indicators that provide a customizable "dimensionalization" of the relational data in data warehouse 24. DAI subsystem 14 also processes updates to this metadata 25 that originate in client subsystem 12 and handles several other kinds of user updates, primarily by passing them to DSM subsystem 16.

DSM subsystem 16 reads schema from data warehouse 24, creates data views, and creates a mapping between the two. It also uses that mapping to translate the Dimensional Queries received from DAI subsystem 14 into SQL and package and return the results.

Scheduler subsystem 18 is responsible for starting Analysts which are to run at a scheduled time or on a regulare schedule; or Exception Analsysts which must regularly test for a trigger condition in the database. When the requested time interval occurs, the Scheduler starts up, requests a list of scheduled InfoFrame Requests from DAI subsystem 14. From those lists, scheduler subsystem 18 determines which should be run during the current time interval and sends those requests to DAI subsystem 14 as if they were sent by client subsystem 12.

Thus, system 10 is implemented as a three-tier architecture. Client computer 30 executes client subsystem 12. Client computer 30 preferably executes Windows NT, or Windows 95, although other operating systems are also envisioned by the present invention. Client subsystem 12 (FIGS. 6–12) is suitable for use with these operating systems. Display 22 and input device 21 allow a user to view GUI 40 and enter choices of metadata 25 used in creating Analysts. Input device 21 may be a keyboard, mouse, or other pointing device.

Printer 23 allows a user to print a InfoFrame. Storage medium 26 allows a user to store an InfoFrame or Alert Message.

Server computer 32 executes DAI subsystem 14, DSM subsystem 16, and scheduler subsystem 18. These three subsystems combine to satisfy user requests from client subsystem 12 using information from data warehouse 24. Server computer 32 is preferably a multi-processor computer and executes the UNIX operating system or Windows NT, although other computer and operating system configurations are also envisioned by the present invention.

Client and server computers 30 and 32 are preferably coupled asynchronously for report requests; all other requests are satisfied synchronously. Communication between client and server computers 30 and 32 is preferably through transmission control protocol/internet protocol (TCP/IP), although other transmission protocols are also envisioned by the present invention.

Database computer 34 includes one or more storage media 36 containing data warehouse 24. Database computer 34 is preferably a massively parallel processor computer and executes the UNIX operating system or Windows NT, although other computer and operating system configurations are also envisioned by the present invention. Data warehouse 24 is suited to run on any computer which supports an Open Database Connect (ODBC) interface to data warehouse 24. Communication between server computer 32 and database computer 34 is preferably via ODBC, although other database interfaces are also envisioned by the present invention.

Figure 2:
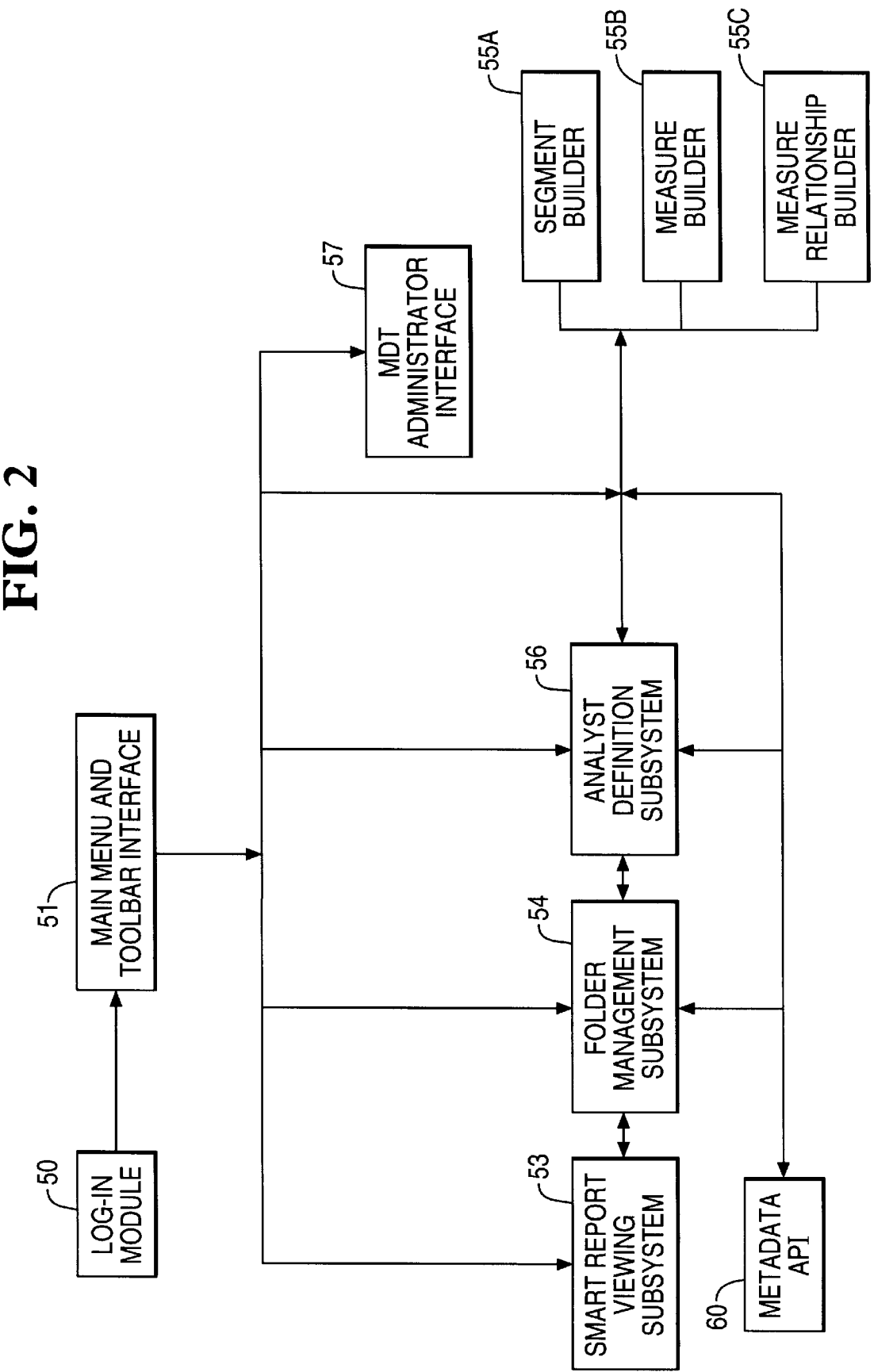
FIG. 2 is a block diagram of a client subsystem within the system of FIG. 1.

Turning now to FIG. 2, client subsystem 12 is an application program which gives a user control over system 10 and is suitable for execution on top of the Windows NT, or Windows 95 operating systems. Client subsystem 12 includes log-in module 50, folder management subsystem 54, segment builder 55A, measure builder 55B and measure relationship builder 55C, analyst definition subsystem 56, InfoFrame viewing subsystem 53 and MDT Administrator interface 57.

Log-in module 50 verifies that only one copy of the client subsystem 12 is running on computer 30, checks the localization of computer 30, connects to computer 32, and interacts with the user to log him onto client subsystem 12. During logon, log-in module 50 verifies a user's name and password and then retrieves any user preferences that may have been earlier defined. The only request from a user that is handled by log-in module 50 is a request to log onto client subsystem 12.

Log-in module 50 issues the following requests:

| | |
|---|---|
| • single program running | to Operating System (DOS, NT, Windows 95, etc.) |
| • retrieve localization | to Operating System (DOS, NT, Windows 95, etc.) |
| • connect to server | to Client/Server module |
| • disconnect from server | to Client/Server module |
| • authenticate user | to Metadata API 60 |
| • run main menu | to Main Menu 51 |
| • run admin menu | to MDT Administrator Interface 57 |

If the user is the System Administrator, log-in module 50 displays MDT Administrator interface 57 "Setup" menu item. If the user is an end user or knowledge worker, a Main menu and toolbar interface 51 are displayed, as are the interfaces associated with subsystems 53–55.

MDT Administrator interface 57 is used by a System Administrator to perform system administration tasks, such as making user-defined segments available globally and creating and editing Business Concepts. Interface 62 is preferably only available to System Administrators during system installation.

Folder management subsystem 54 handles all functions related to manipulating, storing, and retrieving Folder hierarchies, and the InfoFrames and Agents that are stored in those Folders. It also handles querying from DAI subsystem 14 for newly-completed InfoFrames, both when client subsystem 12 starts up, and then periodically thereafter.

Folder management subsystem 54 also handles User requests for operations on:

Folders (new, delete, rename)

Agents (edit, delete, run now, print)

InfoFrames (view, delete, annotate, print [in cooperation with the InfoFrame View Window])

Each folder is represented by one folder object. A folder stores a list of child folders, a list of InfoFrames, and a list of Agents. Folder objects are created and deleted by folder management subsystem 54 in response to user requests.

Subsystems 55B provides a user with the ability to create new measures, update measures, or delete existing measures. This information is sent to a Metadata API 60 and thereafter to DAI subsystem 14 for updating the user's Metadata 25.

Subsystem 55A provides a user with the ability to create new Segments, update segments, or delete existing Segments. This information is sent to a Metadata API 60 and thereafter to DAI subsystem 14 for updating the user's Metadata 25.

Finally, Subsystem 55C provides a user with an interface to modify measure relations and to constrain measure relations. The user selects the current measure and whether to evaluate that measure's relationships when it increases or decrease. Then the user can then select from a list of other measures and define their relationship to the current measure. These relationships are in the form of "decreases", "increases", or "is unrelated to the current measure". Also, every relationship between two measures can be constrained. The relationship between measures and the constraints placed upon them are saved on computer 32 for use in generating InfoFrames.

Analyst definition subsystem 56 handles all functions related to user selection of parameters needed to generate specific reports. It also allows the user to define and schedule Alerts for scheduled reports.

The user may invoke an existing Analyst, delete one from within the folder management subsystem 54, or create a new Analyst. The five types of Analysts are:

Summarization

Segment Comparison

Measure Comparison

Change Analysis

Trend Analysis

The Summarization Analyst requires the following user selection requirements:

Analyst name

Primary measure, other optional measures

Primary segment, other segments

Time period

Optional schedule

Optional trigger type of year used optional trigger event (Alert Message, InfoFrame, Run another analyst)

The Segment Comparison Analyst requires the following user selection requirements:

Analyst name

Primary measure

Primary segment, a comparison segment

Time period

Optional schedule

Optional trigger type of year used optional trigger event (Alert Message, InfoFrame, Run another nalyst)

The Measure Comparison Analyst requires the following user selection requirements:

Analyst name

Primary measure, Comparison measure

Primary segment, other optional segments base time period, comparison time period Optional schedule Optional trigger type of year used optional trigger event (Alert Message, InfoFrame, Run another nalyst)

The Change Analysis Analyst requires the following user selection requirements:

Analyst name

Primary measure

Primary segment, Other optional segments base time period, comparison time period Optional schedule Optional trigger type of year used optional trigger event (Alert Message, InfoFrame, Run another nalyst)

The Trend Analysis Analyst requires the following user selection requirements:

Analyst name

Primary measure

Primary segment, other optional segments.

Time period, Time interval.

Optional schedule

Optional trigger type of year used optional trigger event (Alert Message, InfoFrame, Run another nalyst)

The user can save or run the analyst definition. The user is restricted to choosing one Segment from within each Business Concept with the exception of Target Segment, in which case he may select only one segment and more than one child partition of the selected segment. The user may choose to schedule an Analyst or to modify or delete an existing schedule. Unscheduled Analysts will be run when the user commands. Scheduled Analysts will be submitted to the server for execution at a later date or periodic execution.

The user may specify a trigger condition for the Analyst to specify an Exception Analyst. When submitted to the server it will be run regularly to test for its trigger condition, and will return an Alert or an InfoFrame whenever the trigger condition occurs.

The Analyst definition subsystem 56 makes the following requests to the folder management subsystem 54:

| | |
|---|---|
| Save | Check if the user has selected the appropriate parameters for the selected analyst. Send a request to the folder management subsystem 54 to save an existing Analyst Definition |
| Save As | Check if the user has selected the appropriate parameters for the selected analyst. Send a request to the folder management subsystem 54 to save an existing Analyst Definition |
| Submit | Check if the user has selected the appropriate parameters for the selected analyst. Send a request to the folder management subsystem 54 to submit a report generation |

The Analyst definition subsystem also makes the following requests to Metadata API 60:

| | |
|---|---|
| Get all Measures | The request will be made to Metadata API 60 each time there is a need for it at the initialization point of a dialog |
| Get all Business Concepts | The request will be made to Metadata API 60 subsystem each time there is a need for it at the initialization point of a dialog |
| Get a Business Concept's Partitions | The request will be made depending on a user's selection of a business concept |
| Get Partitions | The request will be made depending on a user selection of a defined Segment. |
| Get Segments | The request will be made depending on a user selection of a partition. |

InfoFrame viewing subsystem 53 includes a WYSIWYG browser which displays a selected InfoFrame on screen, when InfoFrame viewing subsystem 53 gets a notification from folder management subsystem 54 to view a InfoFrame. If the user decides to drill down from the current InfoFrame, InfoFrame viewing subsystem 53 notifies the folder management subsystem 54 to send a new report request.

When the user double-clicks on an InfoFrame or chooses "menu item -View" from the File menu Folders, the folder management subsystem 54 notifies the InfoFrame viewing subsystem to view the InfoFrame. When the user clicks on a hypertext to drill down from the current InfoFrame, the InfoFrame viewing subsystem 53 passes the drill down information to the folder management subsystem 54 to send a new report request to DAI subsystem 14.

InfoFrame viewing subsystem 53 includes a parser which parses the InfoFrame, and extracts the completed report, which is written in HTML. In an HTML file, HTML tags indicate document elements, structure, formatting, and hypertext linking to other documents or resources. The parser then outputs all the information for display. In the current invention, the hyperlink may instance a new Analyst and a new InfoFrame The InfoFrame viewing subsystem 53 allows a user to display and format text, tables, and graphs displayed by display 22 based on the information gathered by the parser. A header, a footer, and annotations can be added to a InfoFrame. The user can save the viewed InfoFrame. The user can also save an InfoFrame as a HTML file in either UNICODE or ASCII code format. A saved HTML InfoFrame can be attached to an e-mail to mail out. Any HTML version 3.0 browser, or equivalent, can read the HTML InfoFrame.

Metadata API 60 handles most of the communications between client subsystem 12 and DAI subsystem 14. These communications involve four basic types of data: metadata 25, InfoFrames, user profiles, and data warehouse schema. For metadata communication, Metadata API 60 provides the ability to add, delete and update metadata 25. For InfoFrames, Metadata API 60 provides the ability to request a report, get the status of a report, retrieve a report and cancel a report request. For user profiles, Metadata API 60 provides the ability to add a user, authenticate a user and delete a user. The communication for data warehouse schema is to retrieve it.

Metadata API 60 allows a user to define new ways of looking at a business. A user cannot modify the public segments, the basic measures or the public measures. However, the user can create new Business Indicators and new Segments. In a typical organization of users and system administrators, only system administrators can create or change basic business measures. Administrators and knowledge workers can create, edit or delete public composite measures, public segments and public measure relationships.

The MetaData API 60 will handle the following requests from other client subsystems:

| | |
|---|---|
| update metadata | from subsystems 55A/55B/55C |
| get report status | from Folder management subsystem 54 |
| generate report | from Folder management subsystem 54 |
| retrieve report | from Folder management subsystem 54 |
| retrieve schema | from MDT Administrator Interface 57 |
| update schedule | from Analyst Definition subsystem 56 |
| cancel a report | from Analyst Definition subsystem 56 |
| authenticate user | from Log-in module 50 |
| add a user | from MDT Administrator Interface 57 |
| delete a user | from MDT Administrator Interface 57 |
| update user password | from MDT Administrator Interface 57 |

Metadata API 60 sends the following requests directly to DAI subsystem 14:
  disconnect from computer 32
  send data to DAI subsystem 14
  receive data from DAI subsystem 14

Figure 3:
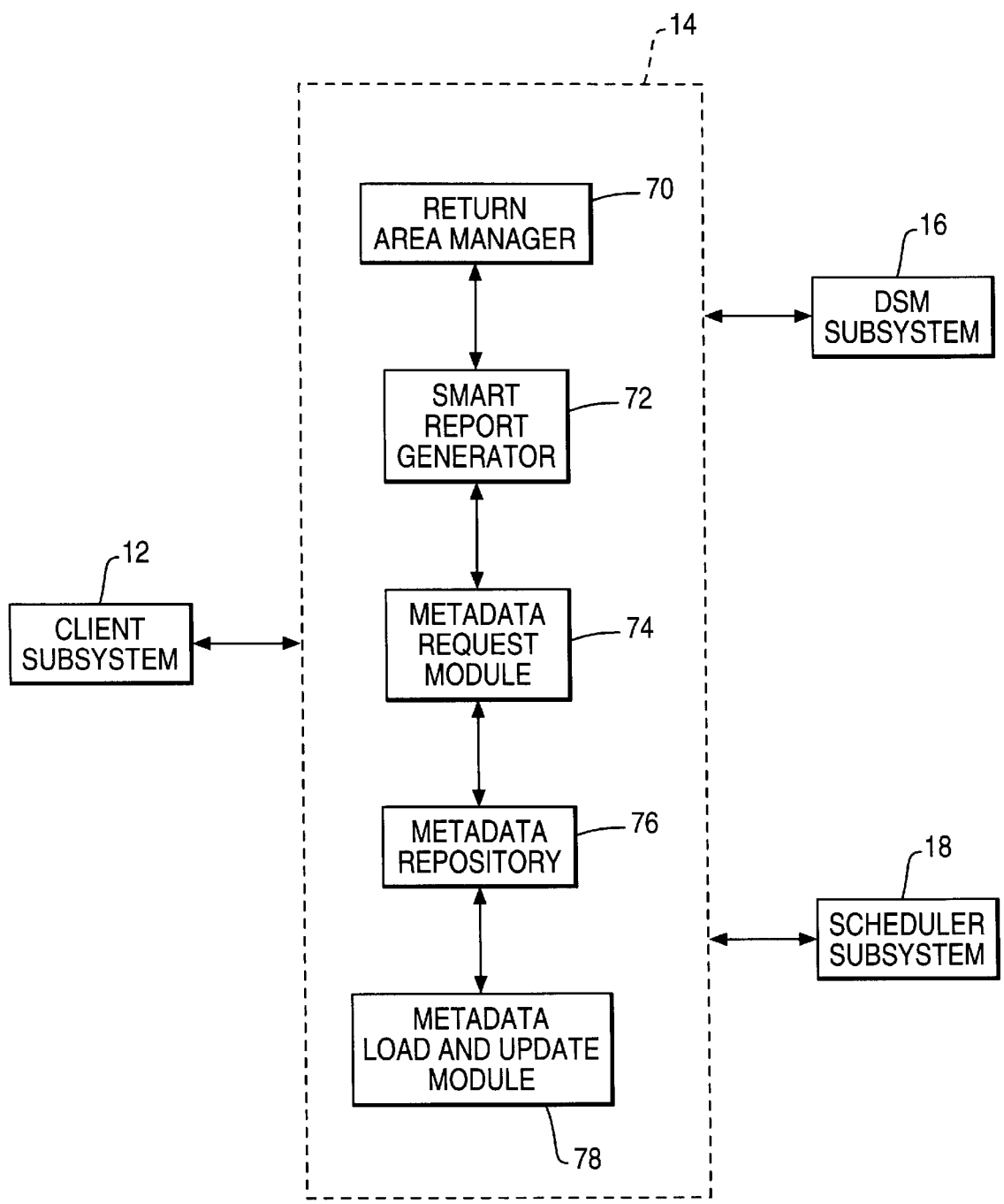
FIG. 3 is a block diagram of a data abstraction intelligence subsystem within the system of FIG. 1.

Turning now to FIG. 3, DAI subsystem 14 includes return area manager 70, InfoFrame generator 72, metadata request module 74, metadata repository 76, and metadata load and update module 78.

Metadata repository 76 contains a representation of metadata 25 within data warehouse 24. This metadata 25 is the core of system 10; it provides a customizable business view over the relational data in warehouse 24 and is the primary vocabulary for the specification of InfoFrames. Metadata repository 76 gets populated at startup time by DSM subsystem 16 from the persistent metadata representation in data warehouse 24.

There are four fundamental kinds of metadata 25 in metadata repository 76, listed and described below:

Business Concepts: business concepts represent the business dimensions along which the data can be viewed. Each dimension imposes a hierarchy over the underlying data, and dimensions can be combined to drive "drill-down" or "drill-up" operations. For example, a simple retail application might have two Business Concepts: Market and Product. The Market hierarchy is composed of Sales Regions, each of which consists of several States, each of which consists of a set of Stores. The Product Hierarchy is composed of a set of Departments (Home Electronics, Men's Clothing, Hardware), each Department is composed of product Categories (Shirts, Shoes, Slacks), and each Category is composed of individual manufacturer's product lines. Time is a dimension that is important in all applications, and will be represented in system 10. Users can add new Business Concepts (see below). These, as all of the metadata 25 in metadata repository 76, must be mapped into relational form (that is, into SQL) in order to actually query data warehouse 24. Mapping is done by DSM subsystem 16 during the process of processing Dimensional Queries (see below).

Business Indicators: Business Indicators are the important measures of data of interest. For example, product Volume, Price, or Current Stock are all Business Indicators. The use of time in a query further refines the idea of a Business Indicator; for example, "Change in Volume" applies between two time periods.

Alerts: Alerts are essentially tests over the data, but they are not part of the metadata. They are specified in the Analyst in terms of the metadata. For example, a user might specify that if the available stock of a product falls by some percentage, to generate the appropriate InfoFrame. The user also specifies how often to check the Trigger condition. A list of Alerts is maintained by DAI subsystem 14 and executed by scheduler subsystem 18. This metadata 25 is also available to DAI subsystem 14 and is used to generate InfoFrame information.

Measure Relationshops: Measure Relationshops are simple expressions of business causality; for example, "Increased Sales mean Increased Profit". This kind of metadata 25 is used to generate supporting information for a InfoFrame or, alternatively, alert the user to trends that run counter to the set of Measure Relationships.

Metadata 25 is initially created during installation of the present invention at the customer's site. The process of creating the metadata 25 is illustrated in more detail in FIGS. 7A–7E. What is included within metadata 25 depends on the industry (some metadata 25 will be industry-specific and usable by all companies in that industry), the specific customer of the present invention, and the structure of the customer's data warehouse 24. During installation, some industry-specific metadata 25 is used, some company specific metadata 25 may be created, and the mapping information needed to map metadata 25 to data warehouse 24 is created. All metadata 25, including the mapping information, is stored in a set of relational tables. These relational tables are kept in data warehouse 24 and used by the present invention to create reports for the user.

Metadata request module 74 handles all requests for metadata 25, either from client subsystem 12 or DAI subsystem 14. Client subsystem 12 requests metadata 25 from DAI subsystem 14 to be presented to the end users. InfoFrame generator 72 requests metadata 25 in order to create Dimensional Queries as part of instantiating a InfoFrame for a user. A request for metadata 25 might be, for example, a request for all sub-concepts of a particular Business Concept.

Metadata request module 74 also handles metadata updates from client subsystem 12. A user adds new Segments by specifying a new dimension from which to group the data. This dimension must be supported by an existing data attribute in the warehouse data. For example, a Product may include a List-Price and a Discount-Price. The user can specify a new dimension called "Discount-Factor", specified using the percent difference between the Discount-Price and the List-Price, and use that to create three new Segments: Heavily-Discounted Products, Slightly-Discounted Products, and Non-Discounted Products. These new Segments can now be used in subsequent InfoFrame requests, and, if indicated by the user, made persistent by writing them back into data warehouse 24 by metadata load and update module 78.

Request Structures are passed from one subsystem to another when one subsystem requires processing and results from another. Request Structures vary according to the type of request being sent. Most requests, however, have some common attributes, such as an identification field, an owner, a name and a description of the request.

Business Concept Update Requests are sent from client subsystem 12 to DAI subsystem 14 and are preferably issued only by the System Administrator. Business Concept Update Requests are requests for adding a new Business Concept to the metadata 25. The requests have the following format:

| | |
|---|---|
| BC_ID: | ID which uniquely identifies this Business Concept |
| BC_NAME: | The name of this Business Concept |
| BC_DESC: | The description of this Business Concept |
| MAPPING: | Mapping of this Business Concept to data warehouse tables |

Business Indicator Update Requests are sent from client subsystem 12 to DAI subsystem 14. Business Indicator Update Requests are requests for adding a new Business Indicator to the metadata 25.

Business Indicator Update Requests primarily include primitive and compound requests. Primitive requests have the following format:

| | |
|---|---|
| BI_ID: | ID which uniquely identifies this Business Indicator |
| OWNER: | The user who created this Business Indicator |
| BI_NAME: | The name of this Business Indicator |
| BI_DESC: | The description of this Business Indicator |
| MAPPING: | Mapping of this Business Indicator to data warehouse tables |
| ROLLUP_OP: | Operator for performing the roll-up operation |

Compound requests have the following format:

| | |
|---|---|
| BI_ID: | ID which uniquely identifies this Business Indicator |
| BI_NAME: | The name of this Business Indicator |
| BI_DESC: | The description of this Business indicator |
| EXP: | The expression which describes this Business Indicator function |

Causal Indicator Update Requests are sent from client subsystem 12 to DAI subsystem 14. Causal Indicator Update Requests add a new Causal Indicator to the metadata 25. The request has the following format:

| | |
|---|---|
| CI_ID: | ID which uniquely identifies this Casual Indicator |
| OWNER: | The user who created this Causal Indicator |
| CI_NAME: | The name of this Causal Indicator |
| CI_DESC: | The description of this Causal Indicator |
| BI_ID1: | Business Indicator which is the independent variable of this causal relationship |
| OP: | The operator for this causal relationship |
| BI_ID2: | Business Indicator which is the dependent variable of this causal relationship |
| RANGE: | When OP is +/−, the range where it is + and the range where it is − |

Schema Requests are sent from client subsystem 12 to DAI subsystem 14 and may only be issued by the System Administrator. Schema Requests are requests to retrieve the data base schema from data warehouse 24. This type of request is just a simple unformatted message to DAI subsystem 14.

Segment Update Requests are sent from client subsystem 12 to DAI subsystem 14. Segment Update Requests are requests for adding a new Segment to the metadata 25. Segment Update Requests have the following format:

| | |
|---|---|
| SEG_ID: | ID which uniquely identifies this Segment |
| OWNER: | The user who created this Segment |
| SEG_NAME: | The name of this Segment |
| SEG_DESC: | The description of this Segment |
| SEG_LEVEL: | Level in the Segment Hierarchy of this Segment |
| BC_ID: | The Business Concept for this Segment |
| ATTR_ID: | The Attribute(s) for this Segment |
| OP: | The operator(s) for this Segment |
| VALUE: | The value (s) for this Segment |

InfoFrame Requests are sent from the Client subsystem to the DAI subsystem. This type of request is to create a new InfoFrame based on user specified selections. The request has the following format:

| | |
|---|---|
| SR_ID: | ID which uniquely identifies this InfoFrame |
| OWNER: | The user who created this InfoFrame |
| SR_NAME: | The name of this InfoFrame |
| SR_DESC: | The description of this InfoFrame |
| SR_TYPE: | One of the four types of InfoFrames |
| BC_ID: | The Business Concept for this InfoFrame |
| SEG_ID: | The Segment(s) for this InfoFrame |
| TIME: | The time interval(s) for this InfoFrame |

Dimensional Queries are sent from DAI subsystem 14 to DSM subsystem 16. Dimensional Queries formulate requests for data from data warehouse 24. DSM subsystem 16 converts Dimensional Queries into SQL statements.

The DAI subsystem 14 communicates a dimensional query to the DSM subsystem 16 as a list of metadata segment definitions or partition definitions, a list of metadata measure definitions and a Measure Value Table. The DSM subsystem 16 converts these to SQL Queries and submits them to the Data Warehouse 24. The results returned by the Data Warehouse to the DSM are returned to the DAI in the Measure Value Table.

Client subsystem 12 produces the following outputs to DAI subsystem 14:

Business Concept Update Requests
Business Indicator Update Requests
Causal Indicator Update Requests
Schema Requests
Segment Update Requests
InfoFrame Requests Cancel Requests DAI subsystem 14 provides the following outputs to client subsystem 12:

Business Concept Structures
Business Indicator Structures
Causal Indicator Structures
Schema Structures
Segment Structures
InfoFrames
Error/Status Codes DAI subsystem 14 provides the following outputs to scheduler subsystem 18:

Schedule Analyst Request
Delete Analyst Request

DAI subsystem 14 provides the following outputs to DSM subsystem 16:

Dimensional Queries
Metadata Retrieval Requests
Schema Requests

DSM subsystem 16 provides the following outputs to DAI subsystem 14:

Updated Metadata
Data from the Data Warehouse
Database Schema

DSM subsystem 16 provides the following outputs to data warehouse 24:

SQL Statements

DSM subsystem 16 receives the following inputs from data warehouse 24:

Metadata
Database Schema
Warehouse Data

Scheduler 18 provides the following output to DAI subsystem 14:

Analyst Definitions

Metadata load and update module 78 populates metadata repository 76 from the persistent metadata stored in data warehouse 24 upon system startup. In addition, when a user specifies new Business Concepts and indicates that he wants them saved, metadata load and update module 78 writes them back into data warehouse 24 for future use.

InfoFrame generator 72 fulfills the primary purpose of DAI subsystem 14. Report generation begins when a user's Analyst containing an InfoFrame definition is received by the DAI. The type of Analyst is used to select appropriate Drill Down Heuristics and Text Generation Rules from the set implemented in the DAI. Drill Down Heuristics are used to determine if there any data relationships between the segments of the free attributes of the target segment which must be reported. Text Generation Rules are used to determine what features of the target segment ought to be reported and what relationships to sibling segments, other segments in the restricted attributes of the target segment, ought to be reported. Text Generation rules may specify localizable text, graphs or tables as appropriate output. The output of the Report Generation process is a fully instantiated InfoFrame returned to client subsystem 12 in the form of HyperText Markup Language (HTML), a widely-used standard for building portable compound documents.

InfoFrame generator 72 has several kinds of knowledge:
Knowledge of how to map Abstract Queries into Dimensional Queries
Knowledge of how to use metadata 25 to generate default choices (choices not made by the user in the InfoFrame Request)
Knowledge of how to use both metadata 25 and data returned from the warehouse to guide the selection of both text components
Knowledge of how to use both metadata 25 and data returned from the warehouse to guide the selection of different types of graphical presentations.

For example, the Summary InfoFrame may take as arguments a Business Concept, a Business Indicator, and a time period. The Report Generation Module uses the user selected parameters, for example, the Business Concept "Product", the Business Concept Segment "Men's Shirts", the Business Indicator "Volume", and the time period "December 1994" to create a Dimensional Query. This Dimensional Query is sent to the Data and Schema Manipulation subsystem, which translates this query into SQL and actually executes it. It returns the computed data to DAI subsystem 14, where other Abstract Queries might embed the actual number in a bullet.

Other Abstract Queries have conditionals associated with them. To build off the previous example, another part of the summary System Template might specify the creation of a graph, showing how the target-business-indicator (volume) is apportioned among the segments of the target-business-concept (shirts). In this case, report generator 72 makes a metadata request to return the set of segments, in this example, the dimension that specifies the shirt manufacturer. All volume information is requested for each manufacturer of shirts. Now, additional information guides report generator 72 in the selection of a choice of graph. For example, if the number of segments (manufacturers in this case) is small, like 7 or less, then a pie graph is appropriate, otherwise, a bar graph is preferred. If the number of segments is very large, then aggregate the bottom 20 percent (in terms of the Business Indicator, in this case, Volume) and use that aggregate with the label "Other" in the graph.

Return area manager 70 keeps track of InfoFrames and Alert Evaluations with positive results by user that are waiting for delivery to client subsystem 12. When a user logs into system 10, client subsystem 12 issues a request to DAI subsystem 14 to return all data for that user in the return area. Return area manager 70 retrieves the information from the return area on server computer 32 and sends it back to client computer 30 through DAI subsystem 14.

Figure 4:
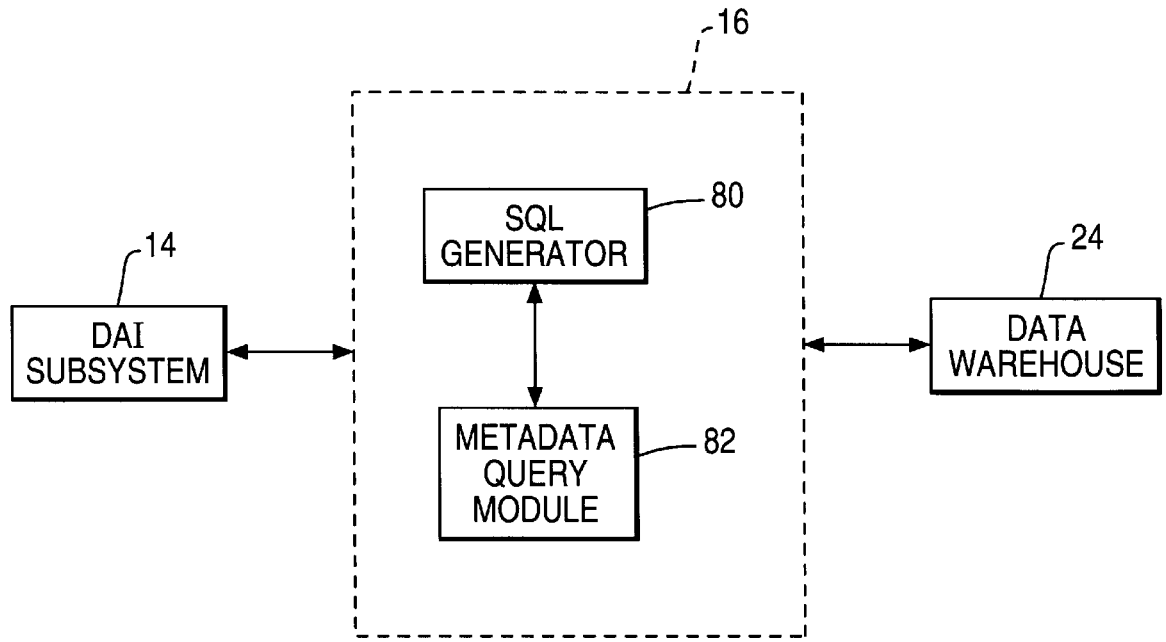
FIG. 4 is a block diagram of a data and schema manipulation subsystem within the system of FIG. 1.

Turning now to FIG. 4, DSM subsystem 16 includes SQL generator 80 and metadata query module 82.

SQL generator 80 translates dimensional queries received from DAI subsystem 14 into SQL statements used to retrieve data from data warehouse 24. A mapping from business concepts to database entities is stored in the metadata 25 and is used in the formatting of the SQL statements. SQL generator 80 provides to DAI subsystem 14 for use in creating InfoFrames.

Metadata query generator 82 processes requests for metadata 25 submitted by DAI subsystem 14. At system startup, DAI subsystem 14 requests all metadata 25 in order to initialize the knowledge base. Metadata query generator 82 is also invoked whenever the user modifies his Segments, causing DAI subsystem 14 to issue an update metadata request.

Figure 5:
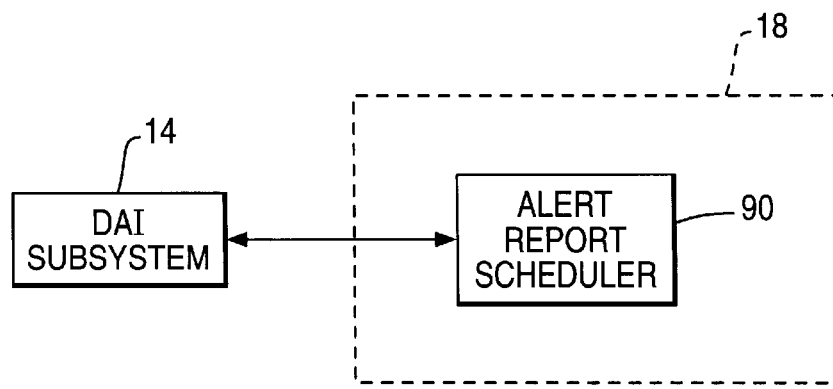
FIG. 5 is a block diagram of a scheduler subsystem within the system of FIG. 1.
Figure 27:
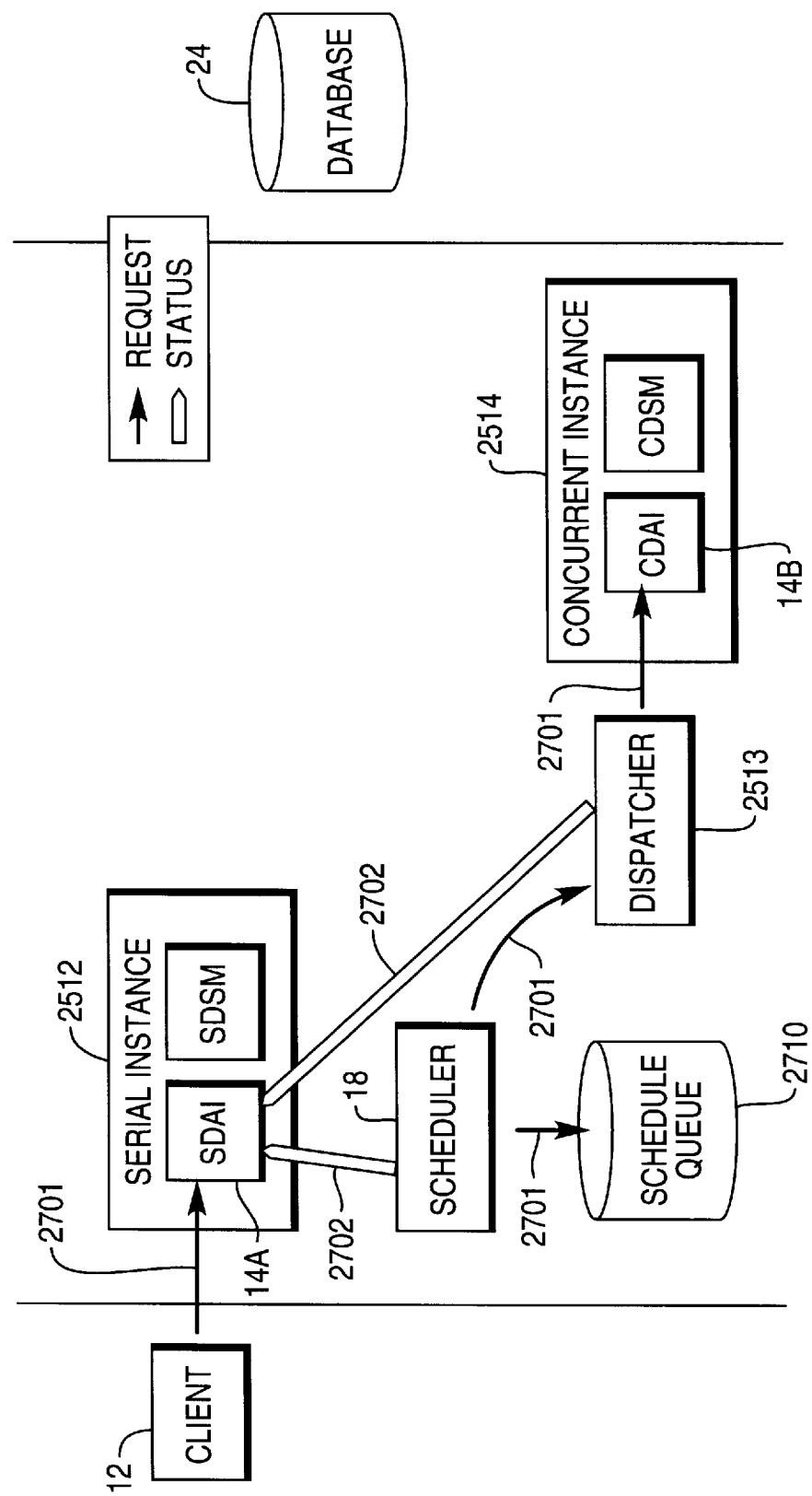
FIG. 27 is a diagram showing the relationships and operations with respect to the scheduler queue.

Turning now to FIG. 5, scheduler subsystem 18 includes alert and report scheduler 90. The scheduler periodically tests queued Scheduled Analysts and will dispatch those to the have come due to the DAI subsystem 14. It will periodically dispatch all submitted Exception Analysts to the DAI subsystem 14 so that they can test for trigger conditions. The schedule and trigger periods are independently configurable by the MDT Administrator. The scheduler passes analysts to the CDAI 14B, by way of the Dispatcher 2513 (FIG. 27).

Turning now to FIGS. 6–12, client subsystem 12 and its operation are illustrated in more detail.

Figure 6:
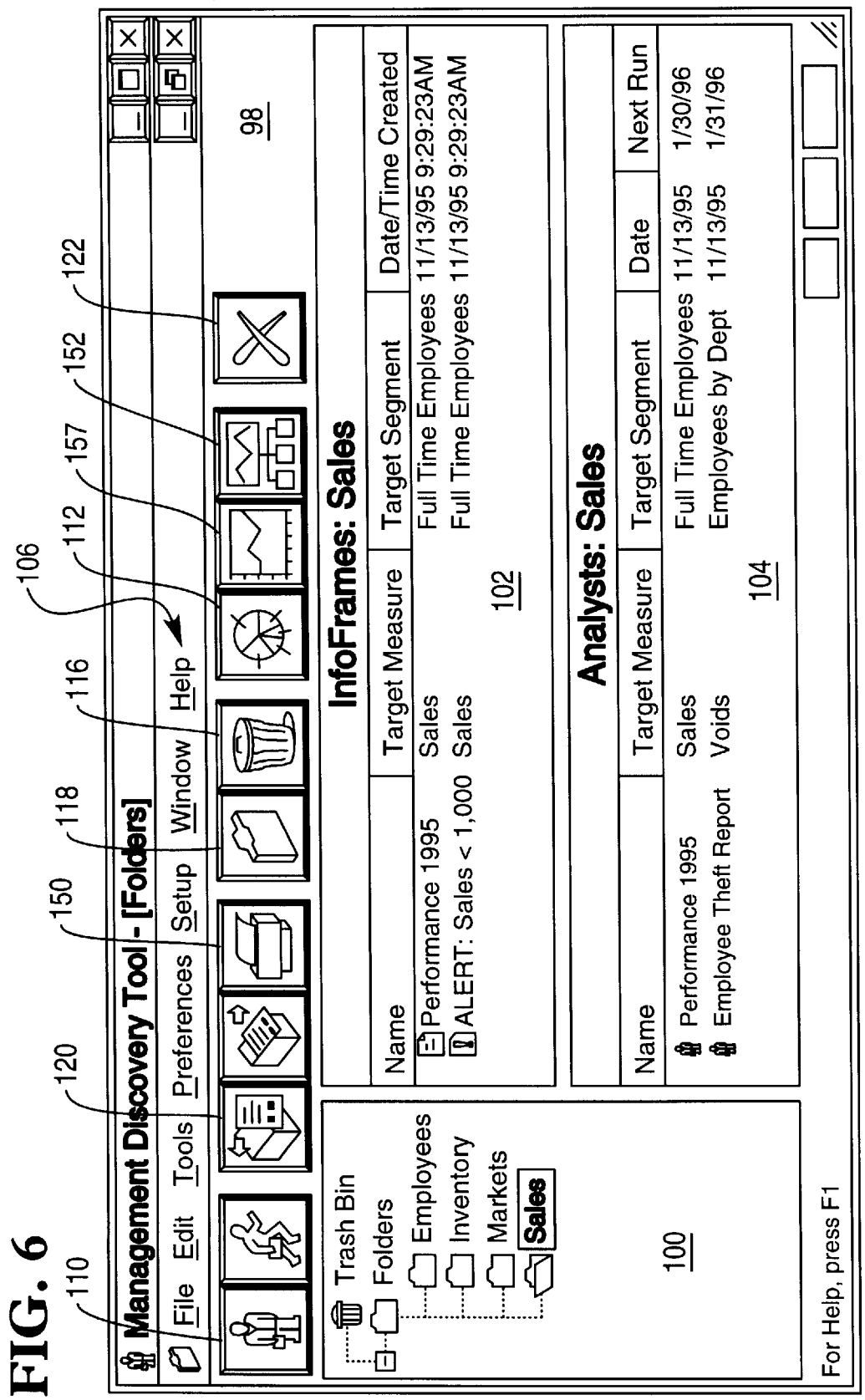
Figure 7B:
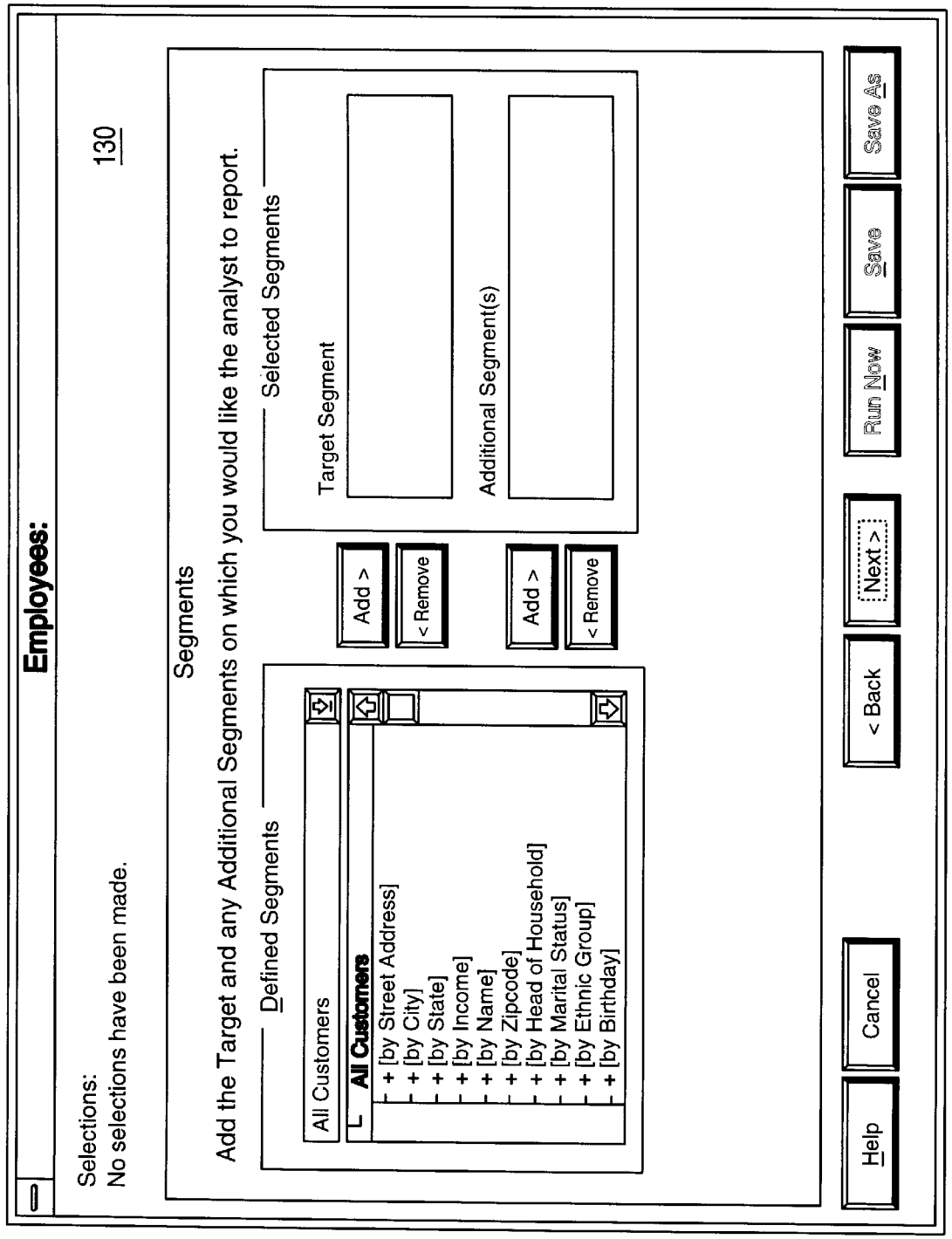
Figure 7E:
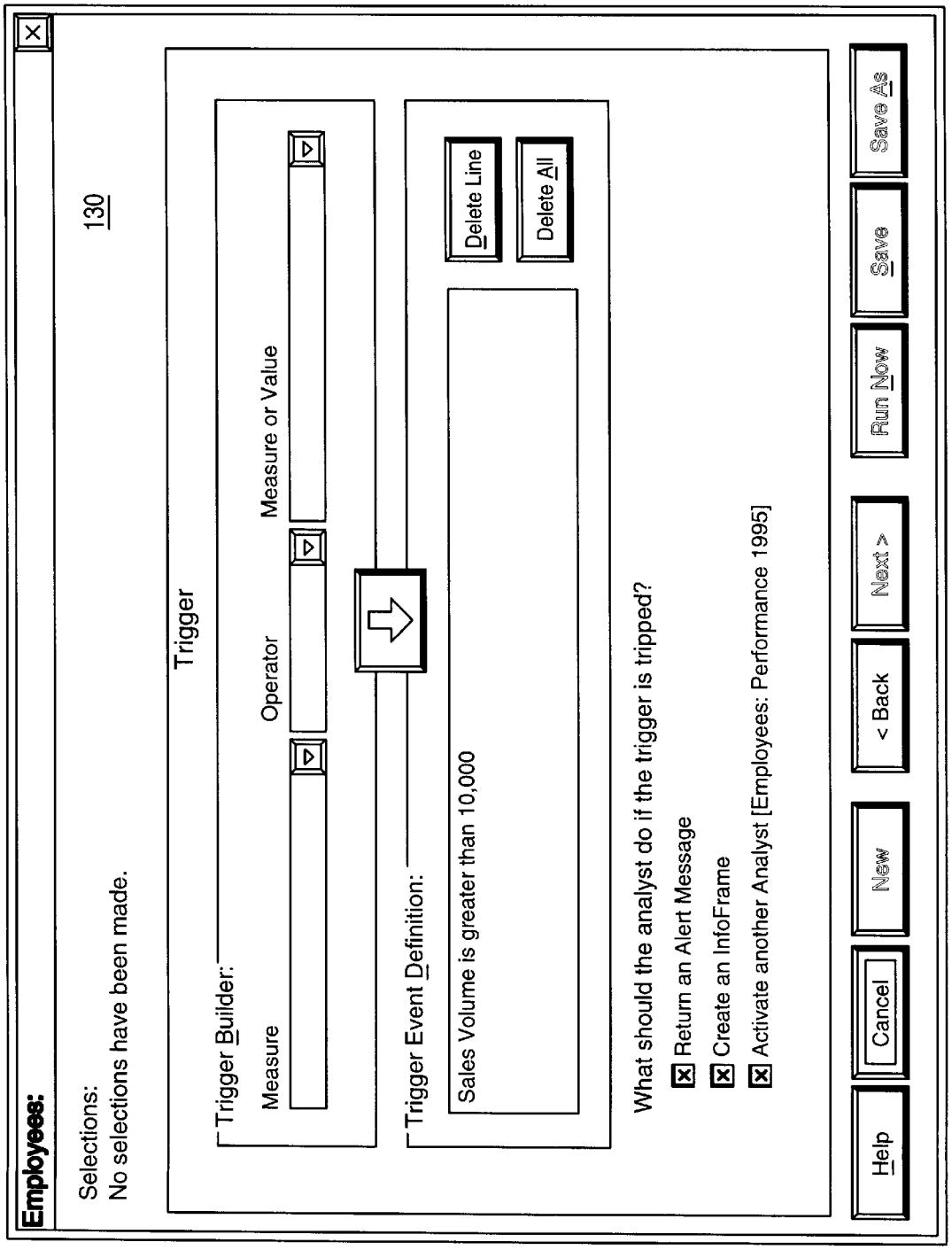

Client subsystem 12 includes a primary overlay 98 which appears when client subsystem 12 is executed. Overlay 98 includes three display areas 100–104 within a common Folders window, pull-down menus 106, and buttons 110–120. The Folders window may be maximized (as it is shown in FIG. 6) to eliminate its borders, resized, or minimized as an icon within client subsystem 12. The Folders window cannot be closed.

Display area 100 contains a list of folders, which represent the metaphor used by client subsystem 12 in organizing InfoFrames and the analysis that creates them. A folder is opened by highlighting it and selecting it with input device 21. The first folder in the list is opened by default when client subsystem 12 is executed.

Figure 12:
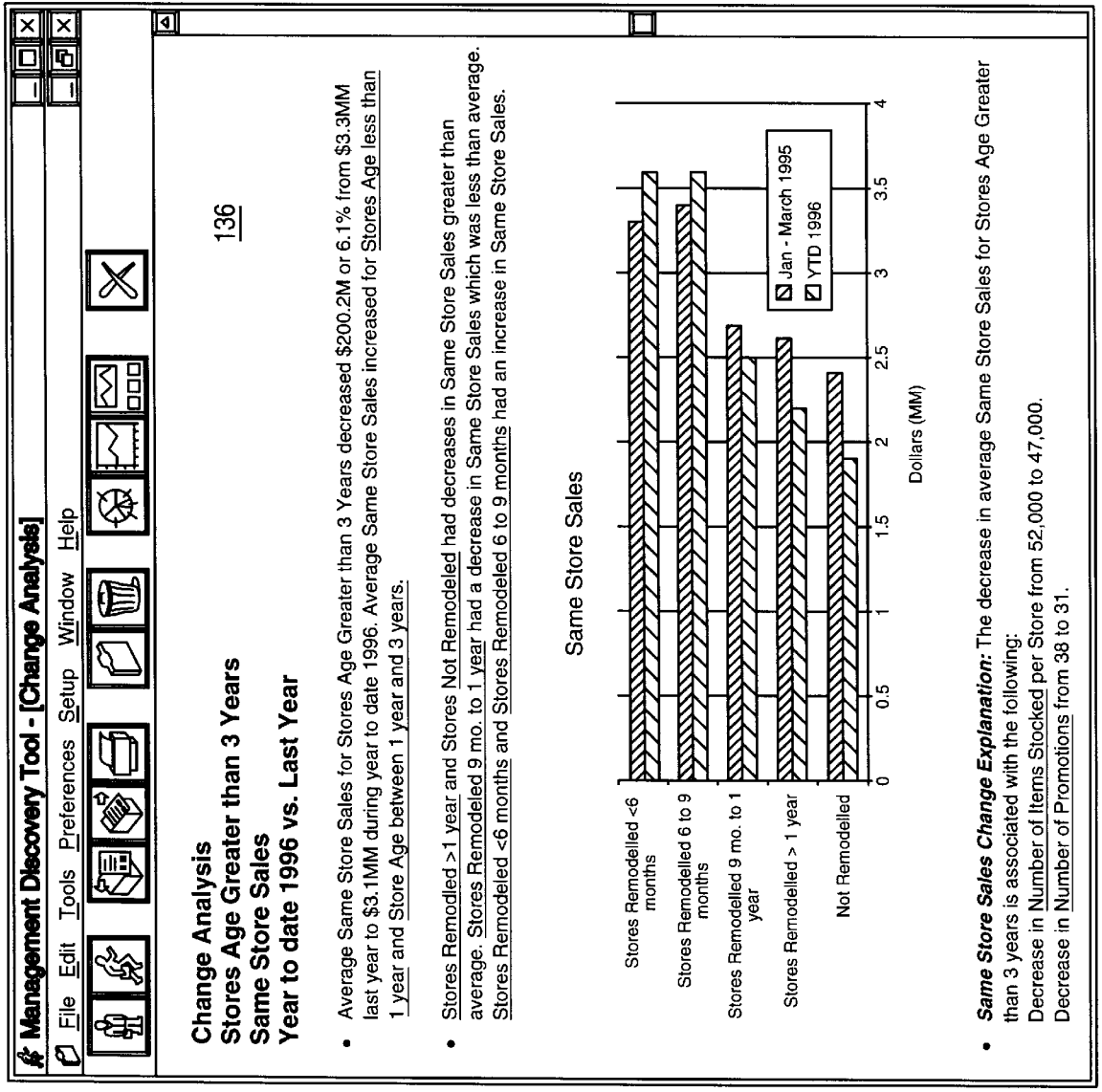

Display area 102 contains a list of InfoFrames within a selected folder. A InfoFrame may be viewed by highlighting it and selecting it with input device 21. An Analysis window 136 appears containing the InfoFrame. The title bar of the window indicates the type of preselected analysis that has been performed. For example, in FIG. 12, "change" analysis was preselected by a user to be the type of analysis to run. The Analysis window 136 may be maximized (as it is shown in FIG. 12) to eliminate its borders, resized, or minimized as an icon within client subsystem 12. The Analysis window 136 may be closed by selecting button 122 (FIG. 12) or by a manner well known to users of Windows 3.1, Windows 95, and other windows operating environments.

Display area 104 contains a list of Analysts within a selected folder. An Analyst is a personification of preselected operations performed on preselected data for the purpose of generating a InfoFrame. An Analyst may be viewed by highlighting it and selecting it with input device 21. Analyst Builder windows 130 (FIGS. 7A–7E) appears containing the preselected settings saved within the Analyst and used to generate the corresponding InfoFrame listed in display area 102. (The InfoFrames listed in display area 102 are arranged in the same order as the Analysts listed in display area 104, and have the same titles as the corresponding Analysts). The Analyst Builder window 130 may be not be maximized, resized, or minimized as an icon; it may only be closed in a manner well known to users of Windows 3.1, Windows 95, and other windows operating environments.

Buttons 110–122 (FIG. 6) implement the primary operational commands within pull-down menus 106 and are activated using a pointing device. Button 110 calls the Analyst Builder windows 130 (FIGS. 7A–7E).

Figure 8A:
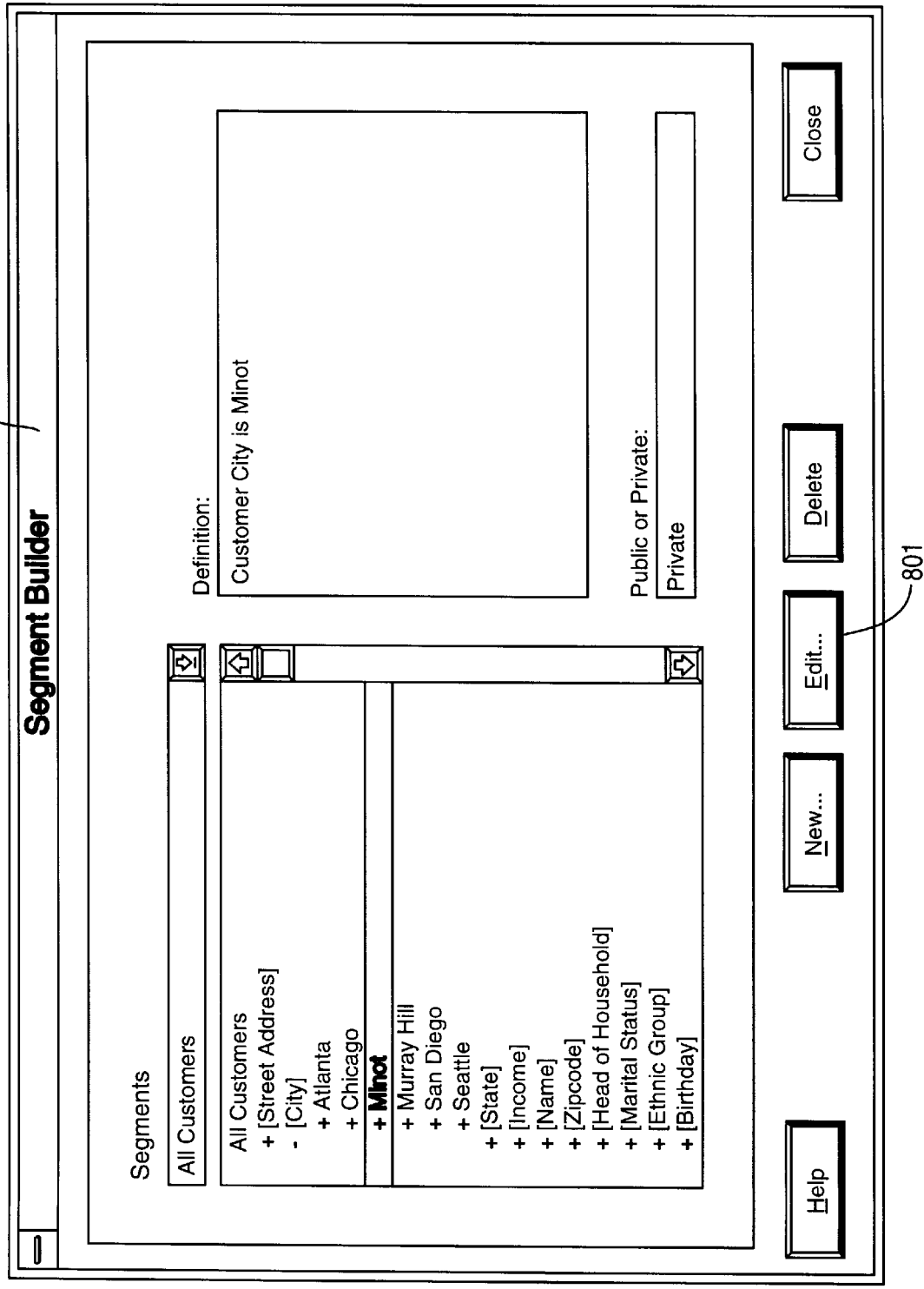

Button 112 calls a Segments divider within a Business Information Setup window 132 (FIG. 8A). Button 116 deletes a selected file or folder within display areas 100–104. Button 118 creates a new folder. Button 120 calls the Analysis window 136 with a selected InfoFrame from display area 102. Button 122 closes client subsystem 12. Button 150 is a print button, button 151 allows the user to create measures, and button 152 allows the user to create or edit measure relationships.

With reference to FIGS. 7A–7E, Analyst Builder window 130 allows a user to define how selected data is analyzed. An Analyst is named under the Analyst Name field. A type of analysis is chosen under the Type of Analysis field. A primary measure to be used in implementing the analysis is chosen under the Primary Measure field. Segments to be reported on are chosen from the list of Defined Segments. Finally, a period for the InfoFrame is defined under the Time Slice Considered fields. A InfoFrame can be created immediately by selecting the Report Now button, or can be scheduled as part of a batch of InfoFrames by selecting the Schedule Analyst button.

Figure 8B:
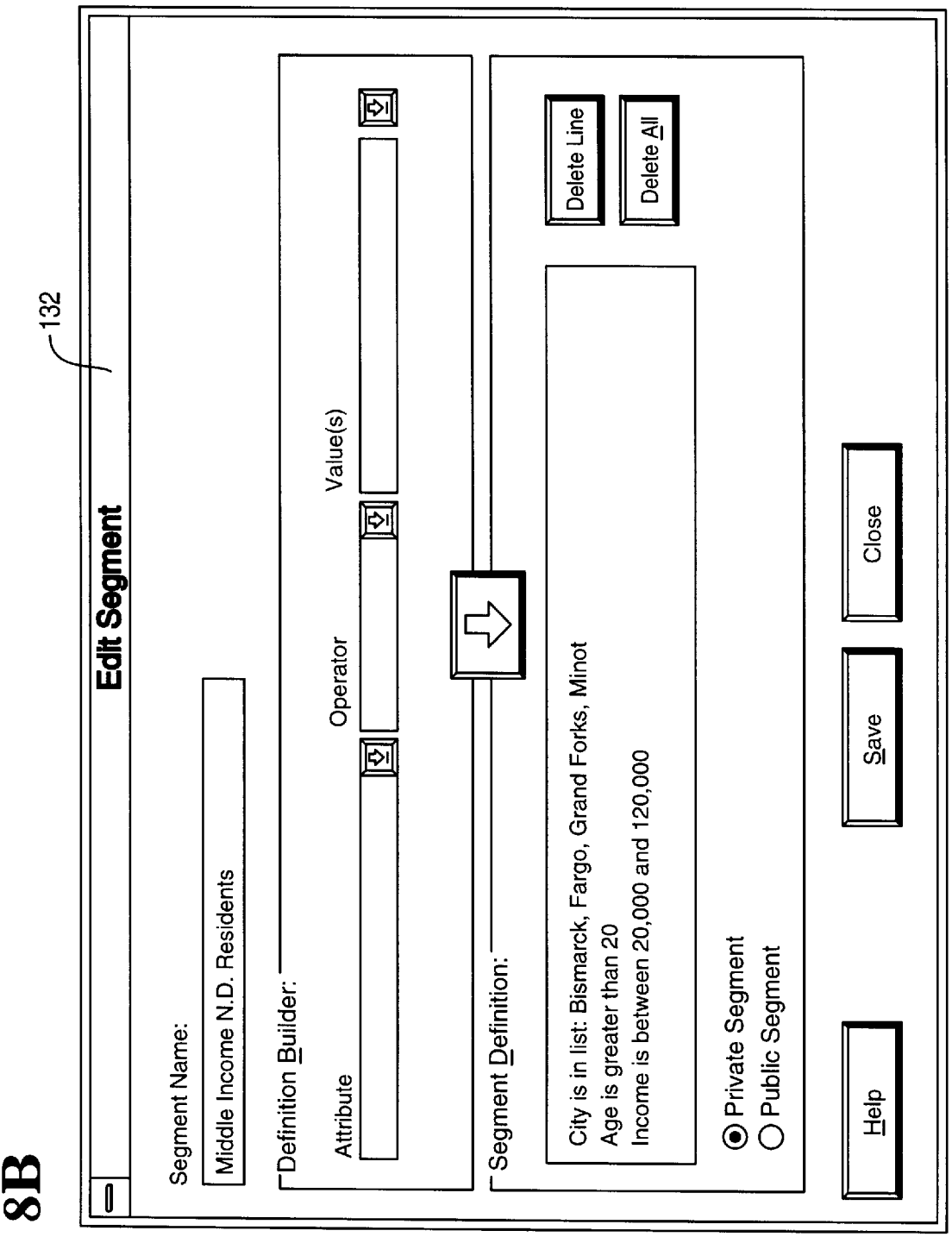

With reference to FIG. 8A, the Segments divider within the Business Information Setup window 132 allows Segments to be created, modified, or deleted. A description of the segment appears in the Description field. Upon activation of button 801 by the user, the window 132 of FIG. 8B is launched, allowing the user to edit segment definitons.

Figure 9B:
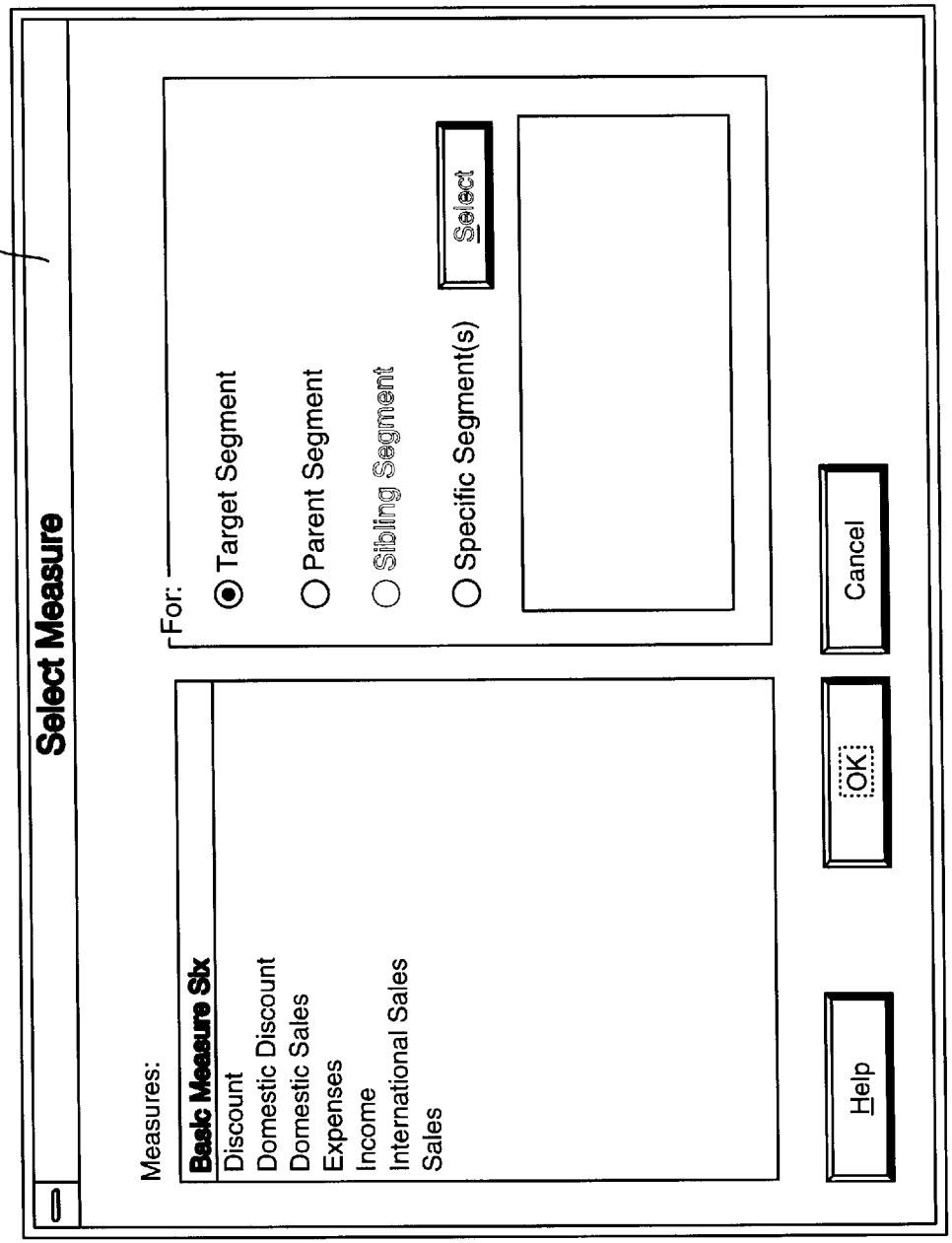
Figure 9C:
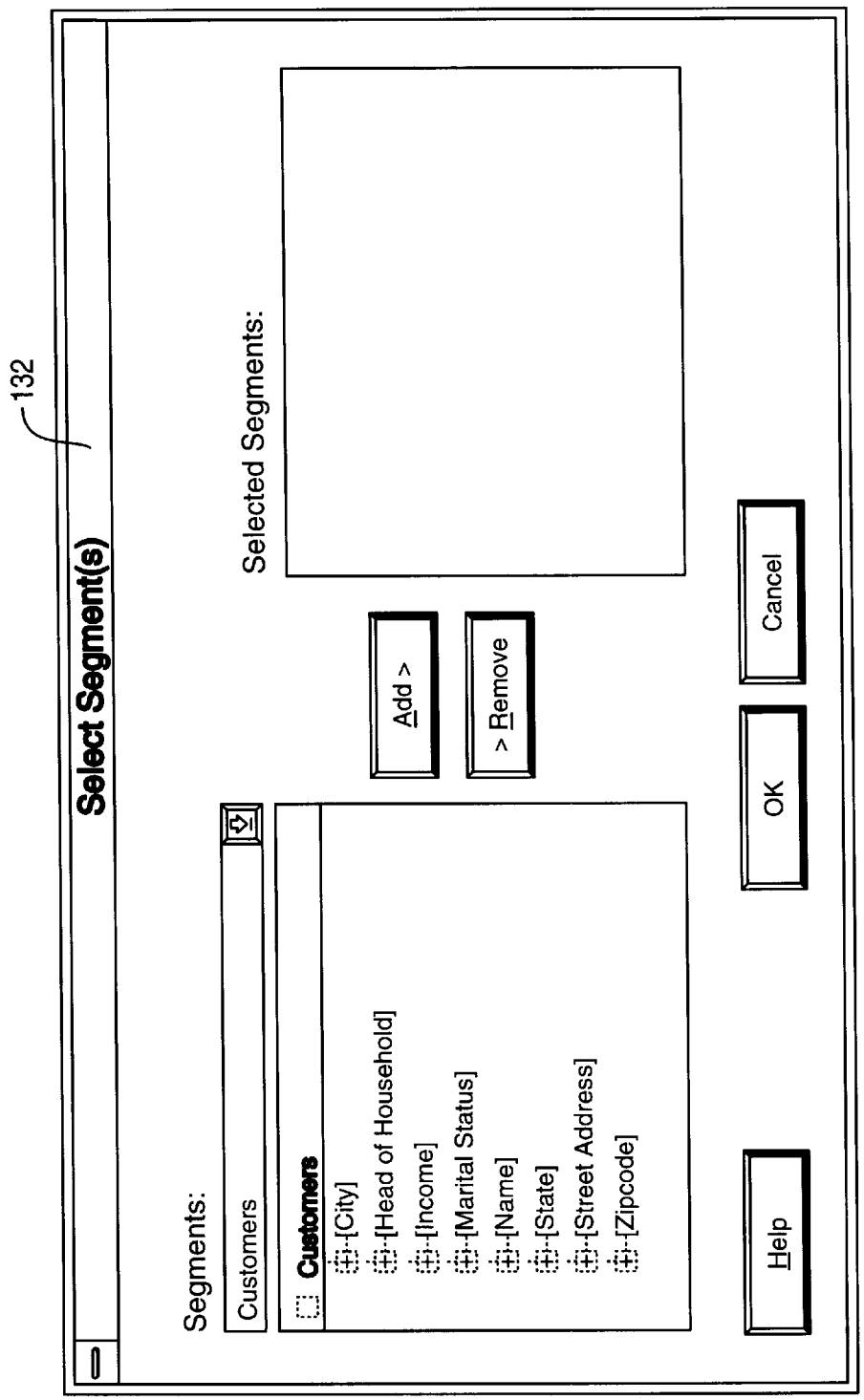

With reference to FIG. 9A, Measures of information may be created and modified within the Measures divider of the Business Information Setup window 132. A name for each Measure appears in the Measure Name field. A definition of a Measure appears in the Definition field. Mathematical operators, Time Slice constraints, Segment constraints, and constraints from other Measures may be inserted into the Definition using the corresponding buttons below the Definition field. With respect to FIGS. 9B and 9C, windows 132 may be displayed to select measures and select segments, respectively.

Figure 10:
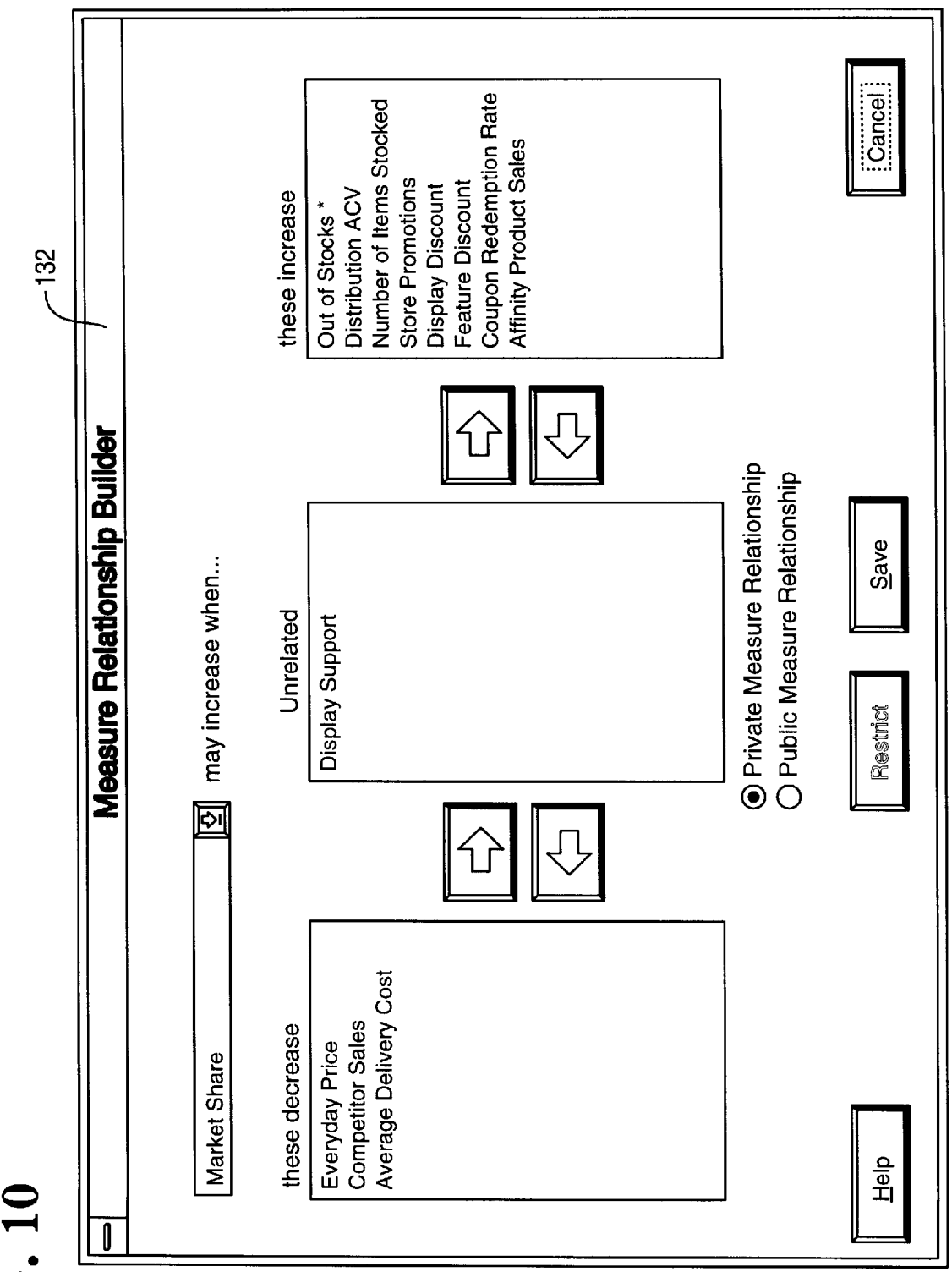

With reference to FIG. 10, Measure relationships may be defined and modified within the Measure Relations divider of the Business Information Setup window 132. Measure relationships are defined in terms of an if-then statement. A primary measure and whether it increases or decreases is selected in the Measure field, which represents the "If" part of the If-Then statement. Measures within the Unrelated field may be moved to either the Decreases field or the Increases field to form the "Then" part of the If-Then statement. With respect to FIG. 11, measure relationships may be restricted by means of the window 132 of that figure.

A batch of InfoFrames may be individually scheduled for automatic production. Scheduling of InfoFrames is particularly useful to those users that require periodic InfoFrames. InfoFrame time intervals may be selected under the Time Interval field, which provides daily, weekly, and monthly reporting options.

With reference to FIG. 12, a sample InfoFrame is shown within Analysis window 136. The type of analysis performed is indicated in the InfoFrame and in the title bar as "Change Analysis". The Segment (previously defined within the Segments divider of the Business Information Setup window 132) is "Store Ages Greater than 3 Years". The Measure (previously define within the Measures divider of the Business Information Setup window 132) is "Same Store Sales". The Time Slice (previously defined in the Time Slice Considered fields of the Analyst Builder window 130) is "Year to date 1995 vs. Last Year".

The InfoFrame provides a concise statement of changes that have occurred in the Primary Measure, Same Store Sales, and changes that have occurred in Measures related to the Same Store Sales, Stores Remodeled, and previously defined within the Measure Relations divider of the Business Information Setup window 132. The InfoFrame then contains an explanation, including a graph, for the change in the Primary Measure, Same Store Sales.

InfoFrame may include multiple instances of HTML associated with a Measure, representing hyperlinks to text data or graphic data representing the results of the Measure.

Figure 13:
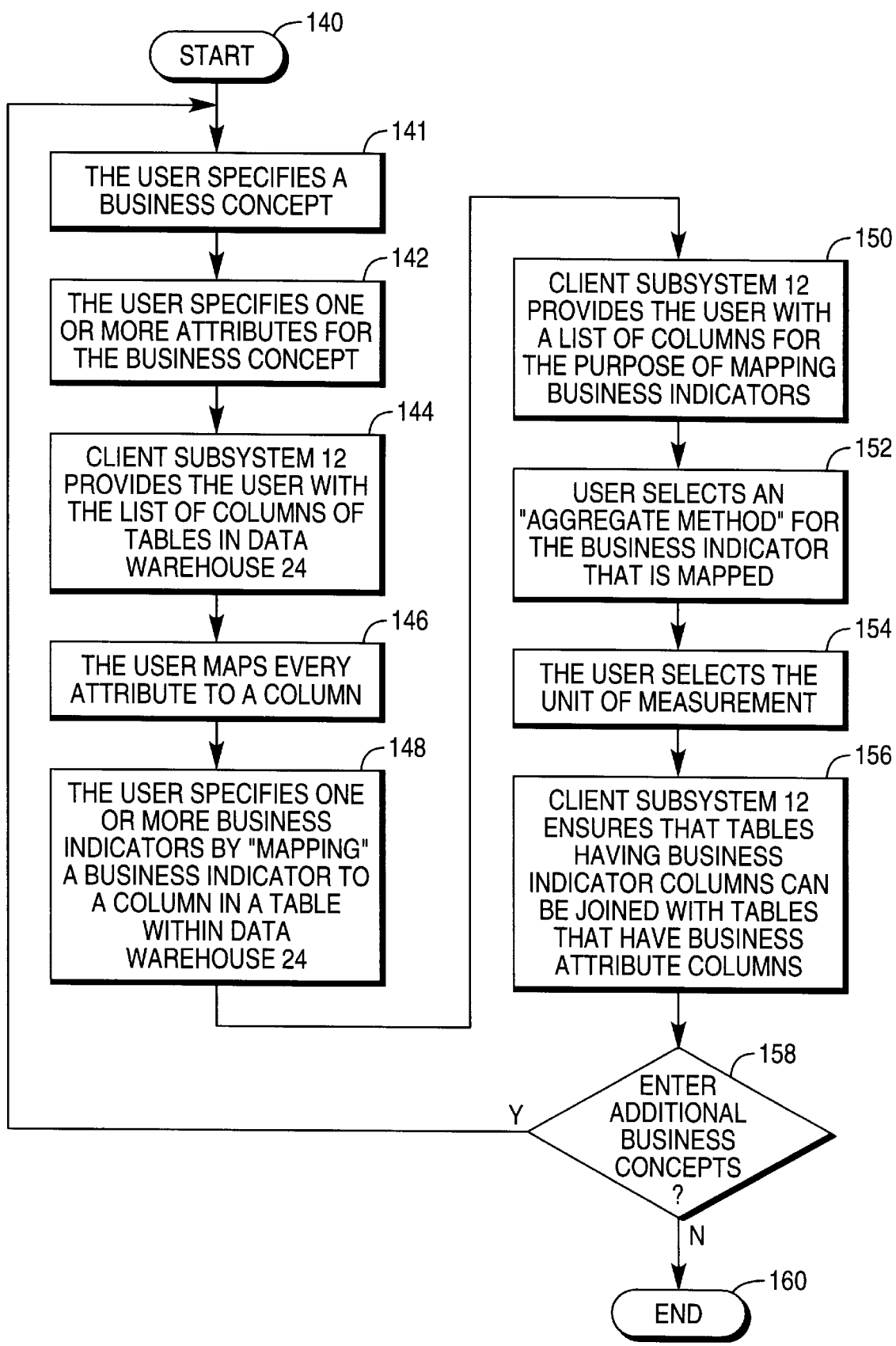
FIG. 13 is a flow diagram illustrating how metadata is created.

Turning now to FIG. 13, a method for creating metadata 25 using client subsystem 12 is illustrated beginning with START 140.

In step 141, the user specifies a Business Concept.

In step 142, the user specifies one or more attributes for the Business Concept.

In step 144, client subsystem 12 provides the user with the list of columns of tables in data warehouse 24.

In step 146, the user maps every attribute to a column. The user can provide a textual description of the business concepts and the attributes.

In step 148, the user specifies one or more Business indicators by "mapping" a Business Indicator to a column in a table within data warehouse 24.

In step 150, client subsystem 12 provides the user with a list of columns for the purpose of mapping Business Indicators as well.

In step 152, user selects an "aggregate method" for the Business Indicator that is mapped, which specifies how values for the Business Indicator are aggregated. The system supports the following aggregate methods:

Add
Average
Min
Max
Count
Last in period
First in period

In step 154, the user selects the unit of measurement, and specifies whether the Business Indicator is a currency. The user can optionally specify a plural form of the Business Indicator, a verb to describe change in the value of the Business Indicator, the precision for reporting the Business Indicator and a textual description of the Business Indicator.

In step 156, client subsystem 12 ensures that tables having Business Indicator columns can be joined with tables that have Business Attribute columns.

In step 158, client subsystem 12 determines whether the user wishes to enter additional Business Concepts. If so, the method returns to step 142. If not, the method ends at step 160.

The preceding description forms an overview of the present invention. The following sections describe the invention in further detail, broken into further sections.

2. Client Subsystem 12

The client subsystem 12 is described in further detail below.

Figure 14:
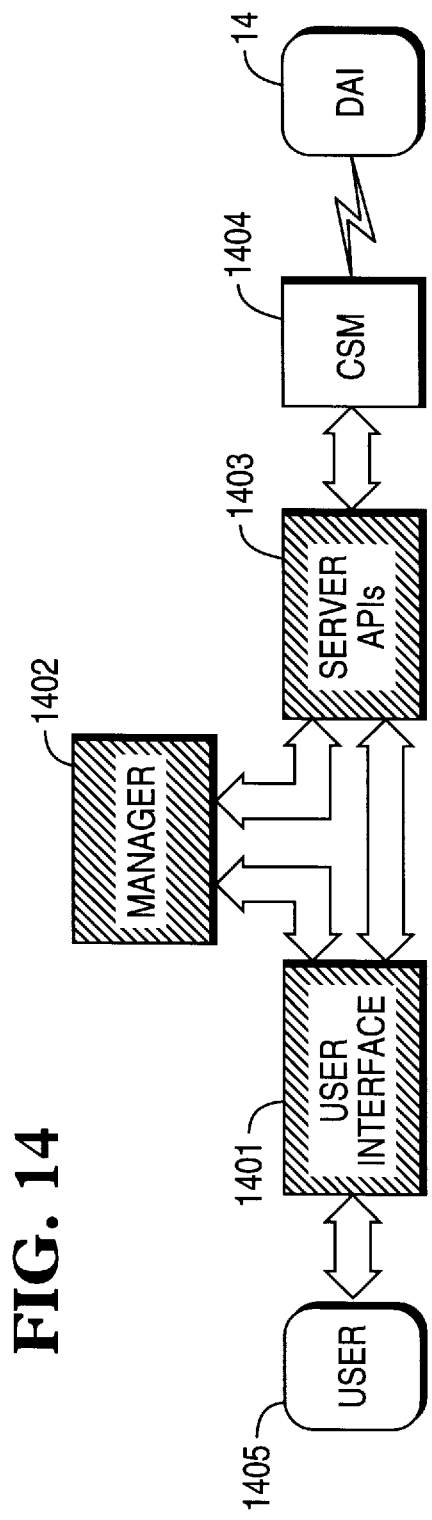
FIG. 14 is another block diagram of a client subsystem within the system of FIG. 1.

FIG. 14 illustrates a more detailed block diagram of the client subsystem 12. Client subsystem 12 contains three subsystems: User Interface (UI) 1401, Manager 1402, and Server APIs 1403. As its name implies, the user interface subsystem 1401 allows the user 1405 to interact with the client 12. At this level of detail, it can be seen that the User Interface subsystem 1401 uses services of both the Manager 1402 and the Server APIs 1403; the Manager 1402 also uses services from the Server APIs 1403. The Server APIs subsystem 1403 provides high level APIs which abstract all client 12 interactions with the DAI subsystem 14. All communications between the client 12 and the DAI subsystem 14 are sent through the Client Server Module (CSM) 1404, which is described in further detail below.

Figure 15:
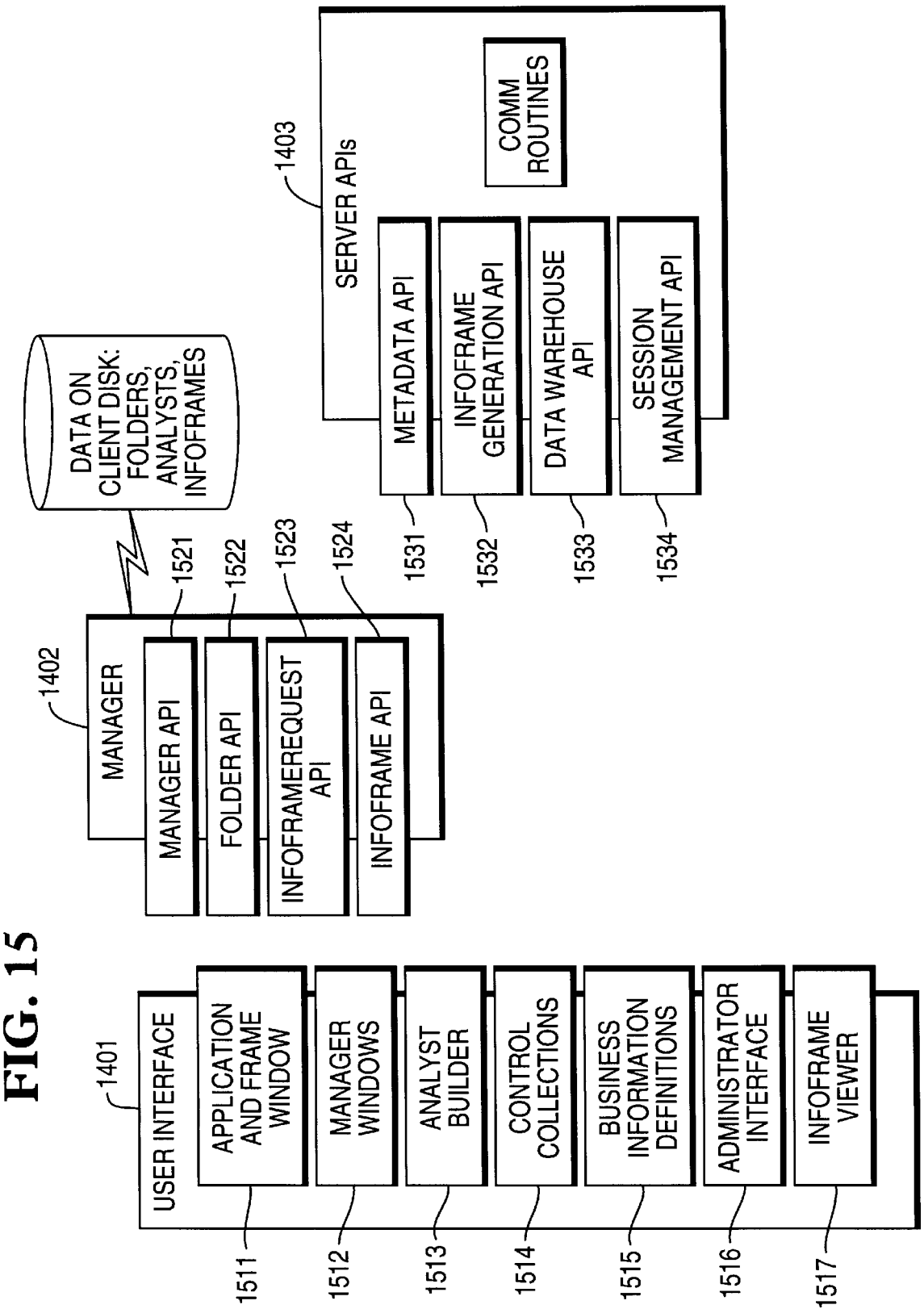
FIG. 15 is yet another block diagram of a client subsystem within the system of FIG. 1.

FIG. 15 illustrates a block diagram of the client subsystem 12 having an increased level of detail over the block diagram of FIG. 14. The user interface subsystem 1401 contains all portions of the program that are visible to the user 1405. Because this subsystem may be implemented as a standard MS-Windows style program, most of the units within the interface are either windows or dialog boxes. Each window or dialog box in the interface has one main class which defines its behavior, as detailed below. Some window or dialog classes also use other utility classes, which will also be defined below, where appropriate.

The "top level" of control within the client subsystem 12 is the Application object 1511. The application object 1511 is constructed automatically by the Microsoft Foundation Class (MFC) library's start-up code. The application object has two primary responsibilities: performing login validation, and displaying the main frame window. The frame window in a Multiple Document Interface (MDI) application owns the Menus, Toolbar, and Statusbar, and creates child window objects.

The User Login process consists of two steps: getting a User Name and Password from the User, and sending them to the Connect function of the Server APIs subsystem 1403. There are four possible results from an attempted Connect to the server 32:

login succeeded
login failed
too many login failures
no response from server 32; network down Upon an unsuccessful login, the login dialog is re-displayed, and the user 1405 may re-enter his/her name and/or password. After a certain number of unsuccessful attempts (number determined by server 32, not client 12), the server 32 will return the "too many failures" result, and the client 12 program will inform the user 1405 of this result, and then exit. If the network or server are down, the client 12 will start up in "off-line" mode, which allows the user 1405 to view saved InfoFrames, but not to create or edit Analysts, or send InfoFrame generation requests.

Upon a successful connect, the application will display the main frame window. A successful Connect result additionally returns an indication of whether the user 1405 has Administrator (MDTA) privileges; if so, the frame window is informed, so that special menu items may be enabled.

The Applicatioon object 1511 may make the following requests of other subsystems:

| Function Used | Subsystem |
| --- | --- |
| Connect | Session Management API [ServerAPIs subsystem 1403] |
| Disconnect | Session Management API [ServerAPIs subsystem 1403] |
| Display ManagerWindow | Manager Window [UI subsystem 1401] |

The Application object 1511 is an instance of the clnt_App class. It creates one instance each of clnt_UserLoginDlg and clnt_MainFrame.

Class clnt_App is a subclass of the MFC class CWinApp. We inherit most of the standard behavior of the CWinApp, but override the InitInstance function, in which we run the User Login process, and if successful, construct our main window, an instance of clnt_MainFrame.

clnt_MainFrame is a subclass of MFC class CMDIFrameWnd. We override the OnCreate function, in order to initialize the Toolbar, and Menus, and to create the initial Manager Window instance 1512.

The clnt_MainFrame instance handles some of the Menu and Toolbar requests, while others are handled by whichever Child Window is active (one of the four Manager Windows 1512 or the InfoFrame Viewer window 1517, as described below). The clnt_MainFrame instance is also responsible for enabling/disabling menu items that vary depending on which Child Window is active.

The User Login dialog is controlled by an instance of the clnt_UserLoginDlg class, a subclass of the MFC class CDialog. The clnt_UserLoginDlg instance displays a dialog which asks the User to enter a name and password. The name and password strings are returned to the calling function when the User clicks the "OK" button.

The Toolbar is controlled by an instance of class clnt__Toolbar, a subclass of MFC's CToolBar. Class clnt__Toolbar inherits all functionality from CToolBar, and adds support for drag-and-drop. Instances of clnt__Toolbar accept drops of one Folder (onto Trash button), one or more Analysts (onto Trash, RunNow, or View buttons), and one or more InfoFrames (onto Trash, View, and Print buttons).

The Business Information Definition 1515 includes all functionality related to addition, modification or deletion of Segments, Measures, and Measure Relationships.

Three dialog boxes are used in the Business Information Definition 1515 process; one for each type of Business Information to be edited. The dialogs are controlled by instances of the following classes which are instantiated by clnt__MainFrame (in response to User requests through the Menu or Toolbar).

clnt__BuildMeasureDlg. This dialog allows the user to update or delete an exisiting measure, or create a new Measure.

clnt__BuildSegmentDlg. This dialog allows the user to update or delete an exisiting segment, or create a new segment by defining attribute restrictions.

Clnt__BuildRelationDlg. This dialog allows the user to update or delete an exisiting MeasureRelation, or define a new relationship.

The Measure Relationship dialog uses the following services from other subsystems:

| Function Used | SubSystem |
|---|---|
| GetMeasureRelationship | Metadata API [Server APIs subsystem 1403] |
| AddMeasureRelationship | Metadata API [Server APIs subsystem 1403] |
| DeleteMeasureRelationship | Metadata API [Server APIs subsystem 1403] |
| UpdateMeasureRelationship | Metadata API [Server APIs subsystem 1403] |

The Measure dialog uses the following services:

| Function Used | SubSystem |
|---|---|
| AddMeasure | Metadata API [Server APIs subsystem 1403] |
| DeleteMeasure | Metadata API [Server APJs subsystem 1403] |
| UpdateMeasure | Metadata API [Server APIs subsystem 1403] |
| GetAllAnalysts | Manager API [Manager APIs subsystem 1402] |

The Segment dialog uses the following services:

| Function Used | SubSystem |
|---|---|
| AddSegment | Metadata API [Server APIs subsystem 1403] |
| UpdateSegment | Metadata API [Server APIs subsystem 1403] |
| DeleteSegment | Metadata API [Server APIs subsystem 1403] |
| GetAllAnalysts | Manager API [Manager APIs subsystem 1402] |

The Business Information Setup section 1515 is controlled by instances of the following classes: clnt__BuildRelationshipDlg, clnt__BuildMeasureDlg, clnt__BuildSegmentDlg and clnt__BuildRestrictDlg (all subclasses of the MFC's CDialog). If the user 1405 selects to modify a private segment or measure, the clnt__MeasureDefDlg and clnt__SegmentDefDlg objects will be responsible for traversing through the list of existing Analysts and InfoFrames and if the segment or measure is found, the objects will take the following actions:

In case of Delete

A message will be displayed to the User 1405 that deleting will cause some Analysts to no longer run correctly. The User 1405 will be presented with a list of Analysts that will be affected by this deletion. When an Analyst runs on a deleted segment or measure an error message will be returned.

In case of Modify

The newest segment/measure definition will always be used. The old definitions will be replaced.

The User change requests will be transferred to DAI (through the Server APIs subsystem) for immediate update of the Metadata.

The Analyst Builder dialog box 1513 allows the User 1405 to select the parameters needed to generate a specific InfoFrame (see below). It also allows the User 1405 the option of Scheduling and/or defining Trigger conditions for an Analyst. To allow this to happen, the main Analyst dialog will prompt the User 1405 to complete a sequence of sub-dialogs: Measures, Segments, TimeSlice, Schedule, and Trigger.

Other portions of the User Interface subsystem 1401 (i.e., Menus, Toolbar, or a Manager Window) invoke the Analyst Builder dialog 1513 either by passing it an existing Analyst object to view/edit, or by passing a NULL parameter, indicating that a new Analyst is to be created.

The clnt__AnalystSheet dialog will instantiate a clnt__InfoFrameRequest object when the User 1405 requests to "Save" on a new Analyst or "Save As" on an existing Analyst.

The clnt__AnalystSheet dialog makes the following requests to other subsystems:

| Function Used | SubSystem |
|---|---|
| NewAnalyst | Manager API [Manager subsystem 1402] |
| UpdateAnalyst | Manager API [Manager subsystem 1402] |
| RunAnalystNow | InfoFrame Generation API [Server APIs subsystem 1403] |
| SetFrameDefinition | InfoFrameRequest API [Manager subsystem 1402] |
| GetFrameDefinition | InfoFrameRequest API [Manager subsystem 1402] |

The clnt__AnalystSheet class instantiates sub-dialogs of the following classes: clnt__AnalystMeasurePage, clnt__AnalystSegmentPage, clnt__AnalystTimeSlicePage, clnt__AnalystSchedulePage, clnt__AnalystTriggerPage (all subclasses of MFC's CPropertyPage). These correspond to five panels within the main dialog box which the User 1405 will be led through in sequence.

Also, the Analyst subsystem 1513 will use clnt__MetaTree class and clnt__MeausreMap class which will provide access to the Metadate tables through MetaData API's.

The clnt__AnalystSheet subdialogs will be dynamically populated with the proper controls according to the User's 1405 selection of the Analyst type. The User input from the Dialog interfaces will be saved in a clnt__infoFrameRequest object and returned to Manager subsystem to be saved (and submitted for scheduling, if a Schedule is present—see below regarding further details of the scheduler subsystem 18).

The clnt__AnalystMeasurePage makes the following requests to the other subsystems:

| Function Used | SubSystem |
| --- | --- |
| GetName | InfoFrameDefinition API [Manager subsystem 1402] |
| SetName | InfoFrameDefinition API [Manager subsystem 1402] |
| GetFrameType | InfoFrameDefinition API [Manager subsystem 1402] |
| SetFrameType | InfoFrameDefinifion API [Manger subsystem 1402] |
| GetTargetMeasure | InfoFrameDefinition API [Manager subsystem 1402] |
| SetTargtMeasure | InfoFrameDefinition API [Manager subsystem 1402] |
| GetComparisonMeasure | InfoFrameDefinition API [Manager subsystem 1402] |
| SetComparisonMeasure | InfoFrameDefinition API [Manager subsystem 1402] |
| GetAdditonalMList | InfoFrameDefinition API [Manager subsystem 1402] |
| SetAdditionalMList | InfoFrameDefinition API [Manager subsystem 1402] |

The clnt_AnalystSegmentPage makes the following requests to other subsystems:

| Function Used | SubSystem |
| --- | --- |
| GetTargetSegment | InfoFrameDefinifion API [Manager subsystem 1402] |
| SetTargetSegment | InfoFrameDefinition API [Manager subsystem 1402] |
| GetComparisonSegment | InfoFrameDefinifion API [Manager subsystem 1402] |
| SetComparisonSegment | InfoFrameDefinifion API [Manager subsystem 1402] |
| GetAdditionalSList | InfoFrameDefinition API [Manager subsystem 1402] |
| SetAdditionalSList | InfoFrameDefinition API [Manager subsystem 1402] |
| GetPartitionList | InfoFrameDefinition API [Manager subsystem 1402] |
| SetPartitionList | InfoFrameDefinition API [Manager subsystem 1402] |
| GetParentPartition | InfoFrameDefinition API [Manager subsystem 1402] |
| GetParentPartition | InfoFrameDefinition API [Manager subsystem 1402] |

The clnt_AnalystTimeSlicePage makes the following requests to other subsystems:

| Function used | Subsystem |
| --- | --- |
| GetPeriodType | InfoFrameTimeSlice API [Manager subsystem 1402] |
| SetPeriodType | InfoFrameTimeSlice API [Manager subsystem 1402] |
| GetAnalysisType | InfoFrameTimeSlice API [Manager subsystem 1402] |
| SetAnalysisType | InfoFrameTimeSlice API [Manager subsystem 1402] |
| GetYearType | InfoFrameTimeSlice API [Manager subsystem 1402] |
| SetYearType | InfoFrameTimeSlice API [Manager subsystem 1402] |
| GetTrendInterval | InfoFrameTimeSlice API [Manager subsystem 1402] |
| SetTrendlnterval | InfoFrameTimeSlice API [Manager subsystem 1402] |
| GetDuration | InfoFrameTimeSlice API [Manager subsystem 1402] |
| SetDuration | InfoFrameTimeSlice API [Manager subsystem 1402] |
| GetNumDuration | InfoFrameTimeSlice API [Manager subsystem 1402] |
| SetNumDuration | InfoFrameTimeSlice API [Manager subsystem 1402] |
| GetBasePeriod | InfoFrameTimeSlice API [Manager subsystem 1402] |
| SetBasePeriod | InfoFrameTimeSlice API [Manager subsystem 1402] |
| GetBaseThruPeriod | InfoFrameTimeSlice API [Manager subsystem 1402] |
| SetBaseThruPeriod | InfoFrameTimeSlice API [Manager subsystem 1402] |
| GetCompPeriod | InfoFrameTimeSlice API [Manager subsystem 1402] |
| SetCompPeriod | InfoFrameTimeSlice API [Manager subsystem 1402] |
| Operator= | InfoFrameTimeSlice API [Manager subsystem 1402] |
| GetTimeSlice | InfoFrameDefinition API [Manager subsystem 1402] |

The clnt_AnalystSchedulePage makes the following requests from other subsystems:

| Function | Subsystem |
| --- | --- |
| GetNumInterval | InfoFrameSchedule API [Manager subsystem 1402] |
| SetNumInterval | InfoFrameSchedule API [Manager subsystem 1402] |
| GetInterval | InfoFrameSchedule API [Manager subsystem 1402] |
| SetInterval | InfoFrameSchedule API [Manager subsystem 1402] |
| GetStartDate | InfoFrameSchedule API [Manager subsystem 1402] |
| SetStartDate | InfoFrameSchedule API [Manager subsystem 1402] |
| GetNumLimit | InfoFrameSchedule API [Manager subsystem 1402] |
| SetNumLimit | InfoFrameSchedule API [Manager subsystem 1402] |
| GetLimit | InfoFrameSchedule API [Manager subsystem 1402] |
| SetLimit | InfoFrameSchedule API [Manager subsystem 1402] |
| GetScheduleFlag | InfoFrameSchedule API [Manager subsystem 1402] |
| SetScheduleFlag | InfoFrameSchedule API [Manager subsystem 1402] |
| GetTriggerFlag | InfoFrameSchedule API [Manager subsystem 1402] |
| SetTriggerFlag | InfoFrameSchedule API [Manager subsystem 1402] |
| Operator= | InfoFrameSchedule API [Manager subsystem 1402] |
| SetSchedule | InfoFrameReuest API [Manager subsystem 1402] |

The clnt_AnalystTriggerPage makes the following requests from other subsystems:

| Function | Subsystem |
| --- | --- |
| GetTriggerList | InfoFrameTrigger API [Manager subsystem 1402] |
| SetTriggerList | InfoFrameTrigger API [Manager subsystem 1402] |
| GetMessageFlag | InfoFrameTrigger API [Manager subsystem 1402] |
| SetMessageFlag | InfoFrameTrigger API [Manager subsystem 1402] |
| GetFrameFlag | InfoFrameTrigger API [Manager subsystem 1402] |
| SetFrameFlag | Update the state of the frame generation action |
| GetAnalyslist | InfoFrameTrigger API [Manager subsystem 1402] |
| SetAnlyslist | InfoFrameTrigger API [Manager subsystem 1402] |
| Operator= | InfoFrameTrigger API [Manager subsystem 1402] |

-continued

| Function | Subsystem |
| --- | --- |
| GetMeasure | Trigger API [Manager subsystem 1402] |
| SetMeasure | Trigger API [Manager subsystem 1402] |
| GetOperator | Trigger API [Manager subsystem 1402] |
| SetOperator | Trigger API [Manager subsystem 1402] |
| GetOperand1 | Trigger API [Manager subsystem 1402] |
| GetOperand2 | Trigger API [Manager subsystem 1402] |
| SetOperand1 | Trigger API [Manager subsystem 1402] |
| SetOperand2 | Trigger API [Manager subsystem 1402] |
| GetValue1 | Trigger API [Manager subsystem 1402] |
| GetValue2 | Trigger API [Manager subsystem 1402] |
| SetValue1 | Trigger API [Manager subsystem 1402] |
| SetValue2 | Trigger API [Manager subsystem 1402] |
| Operator= | Trigger API [Manager subsystem 1402] |
| SetTrigger | InfoFrameRequest API [Manager subsystem 1402] |

The following is a list of user input requirements for each InfoFrame Type:
 (R=Required, O=Optional)
 clnt_MeasureDlg:

| Analysis Type | Target Measure | Additional Measures | Comparison Measure |
| --- | --- | --- | --- |
| Change | R | O | |
| Segment Comparison | R | O | |
| Measure Comparison | R | | R |
| Summarization | R | O | |
| Trend | R | O | | clnt_SegmentDlg:

| Analysis Type | Target Segment | Additional Segments | Comparison Segment |
| --- | --- | --- | --- |
| Change | R | O | |
| Segment Comparison | R | O | R |
| Measure Comparison | R | O | |
| Summarization | R | O | |
| Trend | R | O | | clnt_TimeSliceDlg:

| Analysis Type | Base Period | Comparison Period | Time Interval |
| --- | --- | --- | --- |
| Change | R | R | |
| Segment Comparison | R | | |
| Measure Comparison | R | | |
| Summarization | R | | |
| Trend | R | | R |

The InfoFrame Viewer Window 1517 displays an InfoFrame on screen (see below). In addition to displaying the InfoFrame data, the Viewer 1517 supports the "Drill Down" capability by presenting hot spots to the User 1405, and generating the appropriate requests when a hot spot is selected. The InfoFrame Viewer also gives the User a capability to Annotate an InfoFrame.

When InfoFrame Viewer 1517 is created, it receives the name of the InfoFrame file and a pointer to the InfoFrame object. This data is parsed (further processing is also done, including generating graphs from embedded data), then displayed.

The Parser capability within the InfoFrame Viewer module 1517 is also used for the SaveAs requests; the raw InfoFrame data is translated to standard HTML data (i.e., MDT-specific graph data is translated into a graphical image in a standard format), and is written to a file in either ASCII or Unicode characters. The InfoFrame Viewer Window 1517 also supports the InfoFrame Print function. This functionality is built on the capabilities provided by the CDocument and CScrollView classes of MFC.

The InfoFrame Viewer subsystem 1517 makes the following requests to other subsystems.

| Function Used | SubSystem |
| --- | --- |
| UpdateInfoFrame | Manager API [Manager subsystem 1402] |
| DrillDown | Manager API [Manager subsystem 1402] |

Parser: the clnt_Parser class provides the HTML parsing capability for the Client 12 through the following three functions:

| Service Provided | Description |
| --- | --- |
| doParse | Called by the InfoFrame Viewer, this function parses the given HTML data, and returns a list of clnt_Tag objects, each representing an element of the HTML Data. The clnt_Tag objects can contain lists of sub-Tags, so that nesting is preserved. |
| SaveAsHTML_Unicode | Called by the Manager 1402 when the User requests to Save an HTML file. Parses the HTML data to replace any non-standard HTML elements with standard HTML data (for example, raw graph data must be transformed into a graphic image). Writes transformed data into a file, using Unicode characters. |
| SaveAsHTML_ASCII | Same as above, except characters are written out as ASCII. |

Viewer: the Viewer is implemented using the MFC Document/View architecture. Class clnt_Viewer is a subclass of CScrollView (MFC), which provides the automatic scrolling. Class clnt_ParserDoc is a subclass of CDocument. On creation, it instantiates a clnt_Parser object to parse the HTML Data. The clnt_Viewer then traverses the returned list of clnt_Tag objects and places their visual representations in the Window.

The following collection of controls are used by the user interface subsystem 1401:

clnt_TreeCtrl. All dialog controls which will be representing segments and/or partitions inherit from this class rather than from the MFC's CTreeCtrl. clnt_MetaTree control also inherits from this class.

clnt_MetaTree. This control is used to represent the Metadata segments and partitions in a hirerchical format. The following dialogs subclass this control: clnt_AnalystSegmentPage, clnt_BuildSegmentDlg, clnt_RestrictMeasureDlg.

clnt_TopLevelSegmentCombo. This conttrol is used to represent all Metadata top level segments in a DropDown ComboBox. The following dialogs subclass this control: clnt_AnalystSegmentPage, clnt_BuildSegmentDlg, clnt_RestrictMeasureDlg.

clnt_DurationCombo. This control represents the user's conditional operator choices in a dropdown combobox format. The following dialogs subclass this control: clnt_AnalystPeriodPage, clnt_AnalystSchedulePage.

clnt_OperatorCombo. This control represents the user's conditional operator choices in a dropdown combobox format. The following dialogs subclass this control: clnt_AnalystPeriodPage, clnt_AnalystSchedulePage.

clnt_DateEdit. This control is used to represent the locale date. It validates the user entry and formats the date properly for the locale. The following dialogs subclass this control: clnt_AnalystPeriodPage, clnt_AnalystSchedulePage.

Int_ReadOnlyListBox. This control is used for a non-select listbox. There is no dependencies from other subsystems. The following dialog subclasses this control: clnt_BuildSegmentDlg.

The clnt_MetaTree control uses the following services from other subsystems:

| Function Used | SubSystem |
| --- | --- |
| GetSegment | Metadata API [Server APIs subsystem 1403] |
| GetPartition | Metadata API [Server APIs subsystem 1403] |

The clnt_TopLevelSegmentCombo uses the following services from other subsystems:

| Function Used | SubSystem |
| --- | --- |
| GetSegment | Metadata API [Server APIs subsystem 1403] |

The clnt_MeasureCombo uses the following services from other subsystems:

| Function Used | SubSystem |
| --- | --- |
| GetBasicMeasure | Metadata API [Server APIs subsystem 1403] |
| GetCompositeMeasure | Metadata API [Server APIs subsystem 1403] |

The Administrator Interface 1516 consists of two tasks: User Account setup, and Metadata Builder. The User Accounts setup dialog allows the MDTA (Administrator) to create and manager User accounts, including login name, password, and User type. The Metadata Builder allows the MDTA to define Dimensions, Attributes, and Basic Measures, to create Segments, map columns for Time values, and define Year types.

The User Accounts screen utilizes the clnt_UserLogin class from the Server APIs subsystem 1403. The Metadata Builder screens utilize nearly all metadata functions provided by the Server APIs subsystem 1403. This includes the services of classes clnt_Communications, clnt_Dimension, clnt_Attribute, clnt_BasicMeasure, and clnt_Segment. It also uses the clnt_Schema class for access to the Data Warehouse schema.

The User Accounts dialog is controlled by an instance of clnt_UserAccountsDlg, a subclass of MFC's CDialog. The interface that clnt_UserAccountsDlg presents to the rest of the system is the standard for CDialog objects; the instance is constructed, and then DoModal( ) is called to display the dialog. The call to DoModal( ) returns only when the User 1405 presses the "Cancel" or "Close" button.

The Metadata Builder dialog may be a "wizard" style dialog, meaning that it presents a series of sub-dialogs in a pre-determined order. The User 1405 may press the "Next" and "Back" buttons to traverse the list of sub-dialogs, and may press "Cancel" to exit from the Metadata Builder. The "frame" of the wizard is implemented by class clnt_MasterSetup, which is a subclass of MFC's CPropertySheet. The constructor of clnt_MasterSetup creates one instance each of the dialog "pages" (clnt_AttributeDefinition, clnt_AttributeMapping, clnt_AttributeValueDefinition, clnt_AutomaticSegments, clnt_BasicMeasureDefinition, clnt_BasicMeasureMap, clnt_DimensionDefinition, clnt_Joins, clnt_TimeDimension, clnt_YearDefinition). The pages are loaded into the "wizard" automatically when it is displayed. This is transparent to the rest of the Client application 12, which simply constructs the Metadata Builder and calls DoModal( ) on the instance.

Each of the "pages" loads its initial display data through calls to the ServerAPIs 1403 metadata classes, and each page responds to the "Save" button by updating its data through the ServerAPIs 1403.

The clnt_MasterSetup has one linked list for each type of metadata used. Each list contains zero or more clnt_SetupObject objects. The clnt_SetupObject object contains two data members: one pointer to a CObject and one clnt_ObjectState enumeration. clnt_ObjectState can take on one of four values: STATE_EXISTING, STATE_NEW, STATE_DELETED, STATE_MODIFIED. These linked lists are available to every "wizard" page. Every time the user 1405 adds, deletes or modifies a metadata object, it is added to the appropriate linked list. These linked lists are used to determine which objects to display to the user 1405 and which ones to hide from the user 1405. The linked lists are also used by the "CANCEL" and "SAVE" buttons. When the user 1405 presses the "CANCEL" button, all objects in the linked lists are deleted. When the user 1405 presses the "SAVE" button, all objects in the linked lists are accessed. If the value of the enumeration is STATE_EXISTING the object is deleted from the list. If the value is STATE_NEW the object is added to the metadata on the server and deleted from the list. If the value is STATE_DELETED the object is deleted from the metadata on the server and the object is deleted from the list. If the value is STAT_MODIFIED the object is updated in the metadata on the server and the object is deleted from the list.

The "SAVE" button on the "wizard" page adds, deletes and modifies objects in a certain order. For deleting objects, the following table lists the object to be deleted in left column and the associated objects in the right column that will be deleted from the linked lists on the Client 12 if they exist. The row order in the left column defines which object will be deleted, added or modified first. Dimensions would be added first and Year Definitions would be added last.

| Object | Associated objects |
| --- | --- |
| Dimension | Attribute, Segment |
| Attribute | Enumerate Attribute Value, Restricted Integer Attribute, Restricted Float Attribute, Segment, Attribute Measure Join, Attribute Attribute Join |
| Enumerated Attribute Value | <none> |
| Restricted Integer Attribute | <none> |
| Restricted Float Attribute | <none> |
| Segment | Numerical Attribute Restriction |
| Numerical Attribute Restriction | <none> |
| Enumerate String Attribute Restriction | <none> |
| Partition | <none> |
| Basic Measure | Attribute Measure Join |
| Composite Measure | Constant, Segment List, Attribute Measure Join |
| Constant | <none> |

-continued

| Object | Associated objects |
|---|---|
| Segment List | <none> |
| Attribute Measure Join | <none> |
| Attribute Attribute Join | <none> |
| Measure Relationship | Measure Relation Range Restriction, Measure Relation Magnitude Restriction, Measure Relation Segment Constraint |
| Measure Relation Range Restriction | <none> |
| Measure Relation Magnitude | <none> |
| Measure Relation Segment Constraint | <none> |
| Time Definition | <none> |
| Time Mapping | <none> |
| Year Definition | <none> |

When the user deletes an object that already exist in the metadata 25 on the server 34, just that object is deleted. The "associated objects" for that object will be deleted by the DAI subsystem 14.

The Manager Windows 1512 give the User 1405 access to all types of data which are stored by the Manager subsystem 1402: Folders, Analysts, and InfoFrames, as well as information about Pending InfoFrames.

There are four types of Manager Windows 1512, each offering a different view of this data:

Analyst list (flat list of all Analysts)

InfoFrame list (flat list of all InfoFrames)

Folder View (includes Folder hierarchy; shows InfoFrames & Analysts in current Folder)

Pending Queue (flat list of InfoFrames pending in the DAI 14).

Note that the Pending Queue window is included with the other three Manager Windows because of its similarity in construction and interface behavior; the data it displays is actually quite distinct from that of the other three Windows.

Drag-and-Drop features are also supported by the Manager Windows 1512. The Analyst list, InfoFrame list, and Folder View can be the source of a "drag" operation (Users may drag one Folder, one or more Analysts, or one or more InfoFrames). The Folder View may also be the destination of a "drag" operation.

The first three Manager Window types (Analyst list, InfoFrame list, Folder view) use the following services from other subsystems:

| Function Used | SubSystem |
|---|---|
| GetRootFolder | Manager API [Manager subsystem 1402] |
| GetTrashBin | Manager API [Manager subsystem 1402] |
| GetAllAnalysts | Manager API [Manager subsystem 1402] |
| GetAllInfoFrames | Manager API [Manager subsystem 1402] |
| NewFolder | Manager API [Manager subsystem 1402] |
| RemoveFolder | Manager API [Manager subsystem 1402] |
| MoveFolder | Manager API [Manager subsystem 1402] |
| SetFolderName | Manager API [Manager subsystem 1402] |
| MoveAnalyst | Manager API [Manager subsystem 1402] |
| RemoveAnalyst | Manager API [Manager subsystem 1402] |
| MoyeInfoFrame | Manager API [Manager subsystem 1402] |
| RemoveInfoFrame | Manager API [Manager subsystem 1402] |
| EmptyTrash | Manager API [Manager subsystem 1402] |
| GetChildFolders | Folder API [Manager subsystem 1402] |
| GetInfoFrames | Folder API [Manager subsystem 1402] |
| GetAnalysts | Folder API [Manager subsystem 1402] |
| RemoveFolder | Folder API [Manager subsystem 1402] |
| RunAnalystNow | InfoFrame Generation API [Server API subsystem 1403] |

-continued

| Function Used | SubSystem |
|---|---|
| ViewInfoFrame | InfoFrame Viewer Window [User Interface subsystem 1401] |
| run AnalystBuilder dialog | Analyst Builder [User Interface subsystem 1401] |

The fourth Manager Window, Pending Queue, uses the following services from other subsystems:

| Function Used | SubSystem |
|---|---|
| GetStatus | InfoFrame Generation API [Server API subsystem 1403] |
| CancelAnalyst | InfoFrame Generation API [Server API subsystem 1403] |

Each of the four Manager Windows 1512 is controlled by a frame object and one or more control objects placed within the frame. In all four cases, the frame is represented by just one class, clnt_ManagerWnd, a subclass of CMDIChildWnd from MFC. The clnt_ManagerWnd object is parameterized on instantiation to indicate which control object(s) it should construct. As the superclass would suggest, it behaves as a standard MDI Child Window.

The control objects within the frame window inherit from MFC classes which are, in turn, wrappers for standard MS-Windows Controls. Classes clnt_AnalystCtrl, clnt_InfoFrameCtrl, and clnt_PendingCtrl each inherit from CListCtrl, and display their data in "columned" lists. Class clnt_FolderCtrl inherits from CTreeCtrl to display the tree-like hierarchy of the MDT Folders. These classes are instantiated, as needed, by the clnt_ManagerWnd, depending on the "style" flag it receives: clnt_AnalystCtrl is used in ANALYSTS mode and FOLDERS mode; clnt_InfoFrameCtrl is used in INFOFRAMES and FOLDERS modes; clnt_FolderCtrl is used in FOLDERS mode and by the clnt_SaveAs dialog box (a part of the Analyst Builder); clnt_PendingCtrl is used in PENDING mode.

When the User 1405 begins a drag-and-drop operation, the source window of the drag constructs an instance of clnt_DragWnd, which then controls the remainder of the drag-and-drop. The clnt_DragWnd is given a pointer to the object or list of objects being dragged, and also an indication of the type of object being dragged. It then sends a message to any window the cursor passes over, asking whether it is "OK" to drop the object in that window. The windows which support drops are clnt_FolderCtrl and clnt_Toolbar (see section 3.2.3). When the User 1405 releases the mouse 21 button, the clnt_DragWnd sends a message to the destination window requesting it to accept the dropped item(s), and also sends a message to the source window indicating that the drop was completed.

The Manager subsystem 1402 handles all functions related to manipulating, storing, and retrieving Folder 100 hierarchies, and the InfoFrames and Analysts that are stored in those Folders. Because all functions related to storing and retrieving this data are encapsulated in the Manager subsystem 1402, there will be minimal impact on the other Client subsystems if the Folders/InfoFrames/Analysts data store moves onto the Server tier 32 in an alternate embodiment of the present invention.

As can be seen FIG. 15, the Manager 1402 provides four APIs: Manager 1521, Folder 1522, Analyst 1523, and InfoFrame 1524. These APIs correspond to four classes which are described in the following sections. The main class in the Manager subsystem 1521 is the clnt_Manager class. Three data object classes: clnt_Folder, clnt_InfoFrameRequest, and clnt_InfoFrame, are used by the clnt_Manager, and by other subsystems. Access to Manager functions normally begins with a call to the clnt_Manager itself, requesting a list of Folders, Analysts, or InfoFrames. The objects which are returned by these queries can then be displayed to the User 1405 for viewing and/or manipulating. Requests for changes to any of the data objects pass through the clnt_Manager, which handles storing the changes on disk and, as applicable, sending the changes to the Server API subsystem 1403.

The Manager subsystem 1402 also provides a "TrashBin" capability; that is, when a request to delete an Analyst or an InfoFrame is received, the object is placed in the TrashBin, and not actually deleted until the next EmptyTrash command is received. The TrashBin is persistent between sessions of the Client 12. The TrashBin is implemented as an instance of the clnt_Folder class.

There is exactly one instance 1521 of the clnt_Manager class in the Client application 12. In order to ensure that only one instance will be created, and that it will be safely globally available, the class uses the "Singleton" design pattern (as described in Gamma, et al., *Design Patterns: Elements of Reusable Object—Oriented Software*, Addison-Wesley, 1995, ISBN 0-201-63361-2). In this pattern, the class provides a static member function which returns a pointer to the one instance of itself. The function automatically creates the instance the first time it is called. The constructor of the class is made protected, thus ensuring that the class is never instantiated elsewhere.

The clnt_Manager class handles the following requests from other subsystems:

| Service Provided | Description |
| --- | --- |
| GetManager | Static class function which returns a pointer to the one instance of clnt_Manager. See above. |
| GetRootFolder | Returns pointer to top clnt_Folder object. |
| GetTrashBin | Returns pointer to TrashBin (actually a clnt_Folder object). |
| GetAllAnalysts | Returns a list of all Analysts, without regard to Folder hierarchy. |
| GetAllInfoFrames | Returns a list of all InfoFrames, without regard to Folder hierarchy. |
| NewFolder | Creates a new Folder; parameter indicates the parent for the new Folder; returns pointer to the newly-created clnt_Folder object. |
| RemoveFolder | Removes the given clnt_Folder object; all of its subfolders, Analysts, and InfoFrames are also removed. |
| MoveFolder | Moves the given Folder to a new Parent Folder. |
| NewAnalyst | Stores a new clnt_InfoFrameRequest object in the given Folder, sends to ScheduleAnalyst Server API, if a Schedule is present. |
| UpdateAnalyst | Stores changes to an existing clnt_InfoFrameRequest object, sends to UpdateAnalyst Server API, if a Schedule is present. |
| MoveAnalyst | Moves clnt_InfoFrameRequest object to a different Folder. |
| RemoveAnalyst | Deletes the given clnt_InfoFrameRequest object; if a Schedule is present, sends a CancelAnalyst to the Server API subsystem. |
| UpdateInfoFrame | Stores changes to an existing clnt_InfoFrame object (normally changes to its HTML data, when annotations are added or raw data is processed into a graph, for example). |
| MoveInfoFrame | Moves the given clnt_InfoFrame object to a different Folder. |
| RemoveInfoFrame | Deletes the given clnt_InfoFrame object. |
| DrillDown | If requested DrillDown Frame is already generated, returns that Frame; if not, sends the Frame Generation request to Server API. |
| SaveInfoFrameAsMDTFile | Creates a file that can be e-mailed, etc. File is an "MDT InfoFrame File"—only useable by someone who has Client software 12. |
| SaveInfoFrameAsHTMLFile | Creates a file that can be e-mailed, etc. File is a standard HTML 3.0 file, viewable by any HTML Browser program. A parameter to the function indicates if ASCII or UNICODE output was requested by the User. |
| ImportMDTFile | Reads in a file previously created by SaveInfoFrameAsMDTFile command, stores it as an InfoFrame object in a Folder. The InfoFrame is then available for viewing through standard mechanisms. |
| EmptyTrash | Completely deletes all items currently in the TrashBin. |

The clnt_Manager object uses the following services from other subsystems:

| Function Used | SubSystem |
| --- | --- |
| ScheduleAnalyst | Analyst API [Server API subsystem 1403] |
| UpdateAnalyst | Analyst API [Server API subsystem 1403] |
| CancelAnalyst | Analyst API [Server API subsystem 1403] |
| GetStatus | InfoFrame Generation API [Server APJ subsystem 1403] |
| RetrieveFrame | InfoFrame Generation API [Server API subsystem 1403] |

Instances 1522 of class clnt_Folder are instantiated and deleted only by the clnt_Manager object. Other subsystems gain access to clnt_Folder instances starting with the clnt_Manager's GetRootFolder( ) or GetTrashBin( ) functions.

The clnt_Folder object handles the following requests from other subsystems:

| Service Provided | Description |
| --- | --- |
| GetFolderName | Returns name of this Folder. |
| SetFodlderName | Changes the name of this Folder. |
| GetChildFolders | Returns a list of clnt_Folder objects which are "children" of this Folder. |
| GetInfoFrames | Returns a list of clnt_InfoFrame objects which are stored in this Folder. |
| GetAnalysts | Returns a list of clnt_InfoFrameRequest objects which are stored in this Folder. |
| RemoveFolder | Removes the given clnt_Folder object; all of its sub-folders, Analysts, and InfoFrames are also removed. |

Instances 1523 of class clnt_InfoFrameRequest are created by the clnt_Manager object (when restoring saved Analysts from disk) and by the clnt_AnalystBuilder dialog class (when creating a new Analyst or doing a SaveAs on a current Analyst). Other subsystems normally access Analyst objects by retrieving them from their Folder (clnt_Folder::GetAnalysts( )). Instances of clnt_InfoFrameRequest are only deleted by the clnt_Manager object.

The clnt_infoFrameRequest class handles the following requests from other subsystems:

| Service Provided | Description |
| --- | --- |
| GetName | Returns name of this Analyst. |
| SetName | Assigns a new name for this Analyst. |
| GetRequestID | Return a unique request ID assigned by Manager |
| SetRequestID | Assigns a unique request ID to the Analyst Request |
| GetUserName | Returns the user name |
| SetUserName | Assigns a user name to the Analyst Request |
| GetFrameDef | Returns the clnt_InfoFrameDefinition object for this Analyst. |
| SetFrameDef | Updates the Analyst's FrameDefinition object. |
| GetSchedule | Returns the clnt_Schedule object for this Analyst. |
| SetSchedule | Updates the Analyst's Schedule object. |
| OetTrigger | Returns the clnt_Trigger object for this Analyst. |
| SetTrigger | Updates the Analyst's Trigger object. |
| GetContainingFolder | Returns the pointer to the containig folder object |
| SetContainingFolder | Updates the pointer to the containing folder object |

The clnt_InfoFrameRequest class does most of its work through three helper classes. The clnt_InfoFrameDefinition class stores a description of the InfoFrame Generation request that will be sent when this Analyst is run (or scheduled).

The clnt_infoFrameDefinition class handles the following requests from other subsystems

| Service Provided | Description |
| --- | --- |
| GetFolderID | Return the Folder ID assign to the analyst by clnt_Folder object |
| SetFolderID | Assigns the Folder ID to the Analyst. |
| GetAnalysisType | Returns the type of analysis Selected for this request. |
| SetAnalysisType | Updates the type of analysis selected for this request. |
| GetTargetMeasure | Returns the target measure selected for this analysis. Required |
| SetTargetMeasure | Updates the target measure selected for this analysis. Required. |
| GetComparisonMeasure | Returns the comparison Measure selected for this analysis. Required only for Measure Comparison Analysis. |
| SetComparisoriMeasure | Updates the Comparison Meausre Selected for this analysis. Required only for Measure Comparison Analysis |
| GetAdditionalMList | Returns a list of Additional measure Objects selected for this analysis. Optional. |
| SetAdditionalMList | Updates the List of Additional measure Objects slected for this analysis. Optional |
| GetTargetSegment | Returns the target segment selected for this analysis. Required |
| SetTargetSegment | Updates the target Segment selected for this analysis. Required. |
| GetComparisonSegment | Returns the comparison Segment selected for this analysis. Required only for Segment Comparison Analysis. |
| SetComparisonSegment | Updates the Comparison Segment Selected for this analysis. Required only for Segment Comparison Analysis |
| GetAdditionalSList | Returns a list of Additional measure Objects selected for this analysis. Optional. |
| SetAdditionalSList | Updates the List of Additional Segment Objects selected for this analysis. Optional |
| GetPartitionList | Returns the List of selected target Partitions. Optional. |
| SetPartitionList | Updates the List of selected target Partitions. Optional. |
| GetParentPartition | Returns the target segment's parent partition. Required only if target segment is not top level segment. |
| SetParentPartition | Updates the target segment's parent partition. Required only if target segment is not top level segment. |
| GetTimeSlice | Returns the pointer to the timeslice object for this analysis Required. |
| SetTimeSlice | Updates the pointer to the timeslice object for this analysis. Required. |
| Operator= | Copies the object into another |

The clnt_InfoFrameTimeSlice class handles the following requests from other subsystems:

| Service Provided | Description |
| --- | --- |
| GetPeriodType | Returns the type of timeslice selected for the request. |
| SetPeriodType | Updates the type of timeslice selected for the request. |
| GetAnalysisType | Returns the type of analysis selected for the request. |
| SetAnalysisType | Updates the type of analysis selected for the request. |
| GetYearType | Returns the type of year definition selected for the request |
| SetYearType | Updates the type of year definition selected for the request |
| GetTrendInterval | Returns the interval duration. Required only for Trend Analysis. |
| SetTrendInterval | Updates the interval duration. Required only for Trend Analysis. |
| GetDuration | Returns the time duration. |
| SetDuration | Updates the time duration. |
| GetNumDuration | Returns the number of durations. |
| SetNumDuration | Updates the number of durations. |
| GetBasePeriod | Returns the Specific Date's base period. |
| SetBasePeriod | Updates the Specific Date's base period. |
| GetBaseThruPeriod | Returns the Specific Date's thru period. |
| SetBaseThruPeriod | Updates the Specific Date's thru period. |
| GetCompPeriod | Returns the Specific Date's Comparison Period. Required only by Change Analysis. |
| SetCompPeriod | Updates the Specific Date's Comparison Period. Required only by Change Analysis. |
| Operator= | Copies one TimeSlice object inot another. |

The clnt_InfoFrameSchedule class stores definition of a schedule for the Analyst.

The clnt_infoFrameSchedule class handles the following requests from other subsystems:

| Service Provided | Description |
| --- | --- |
| GetNumInterval | Return Number of intervals the report should run. |
| SetNumInterval | Update the number of intervals the report should run. |
| GetInterval | Return the duration for the interval the report should run. |
| SetInterval | Updates the duration for the interval the report should run. |
| GetStartDate | Return the date to which the report is scheduled to start runing. |
| SetStartDate | Updates the date to which the report is scheduled to start running. |
| GetNumLimit | Returns the number of time periods the reports is scheduled to run. |
| SetNumLimit | Updates the number of time periods the report os scheduled to run. |
| GetLimit | Return the duration for the number of times the report is shceduled to run. |
| SetLimit | Updates the duration for the number of times the report is scheduled to run. |
| GetScheduleFlag | Returns the enabling or disabling state of the schedule. |
| SetScheduleFlag | Updates the enabling or disabling state of the schedule. |
| GetTriggerFlag | Returns the enabling or disabling state of the trigger definition. |

| Service Provided | Description |
| --- | --- |
| SetTriggerFlag | Updates the enabling or disabling state of the trigger definition. |
| Operator= | Copies one Schedule object into another |

The clnt_InfoFrameTrigger class handles definition of trigger conditions to be checked before the Analyst is run. The clnt_infoFrameTrigger class handles the following requests from other subsystems:

| Service Provided | Description |
| --- | --- |
| GetTriggerList | Return a list of triggers defined by the analyst |
| SetTriggerList | Updates a list of triggers defined by the analyst |
| GetMessageFlag | Return the enable/disable state depending on user selection of the action to be taken. In this case a message will be generated if trigger becomes true. |
| SetMessageFlag | Update the state of the message generation action. |
| GetFrameFlag | Return the enable/disable state depending on user selection of the action to be taken. In this case a Frame will be genereated if trigger becomes true. |
| SetFrameFlag | Update the state of the frame generation action |
| GetAnalystList | Return a list of analysts to be generated if the trigger becomes true. If List empty, this action is not selected. |
| SetAnlystList | Update the list of analyst to be generated if the trigger becomes true. If List empty, this action is not selected |
| Operator= | Copies the object into another |

The class clnt_trigger contains a single trigger condition. A list of clnt_trigger objects will be ANDed and defined as a single trigger. The clnt_Trigger class handles the following requests from other subsystems:

| Service Provided | Description |
| --- | --- |
| GetMeasure | Returns the measure selected. |
| SetMeasure | Updates the measure seleceted |
| GetOperator | Returns the operator selected |
| SetOperator | Updates the operator selected |
| GetOperand1 | Returns the first operand measure |
| GetOperand2 | Returns the second operand measure if operator is Between or not Between. |
| SetOperand1 | Updates the first operand measure |
| SetOperand2 | Updates the second operand measure if operator is Between or not Between. |
| GetValue1 | Returns the first operand value |
| GetValue2 | Returns the second operand value |
| SetValue1 | Update the first operand value |
| SetValue2 | Updates the second operand value, if Operator is Between or not Between. |
| Operator= | Copies the object into another |

Each instance 1523 of clnt_InfoFrameRequest must have a clnt_infoFrameDefinition object; the clnt_InfoFrameSchedule and clnt_Trigger objects are optional.

Instances 1524 of class clnt_InfoFrame are instantiated by the clnt_Manager object (when restoring saved Analysts from disk or receiving a new Frame from the Server API). Other subsystems normally access InfoFrame objects by retrieving them from their Folder (clnt_Folder::GetInfoFrames( )). Instances of clnt_InfoFrame are only deleted by the clnt_Manager object.

The clnt_InfoFrame class handles the following requests from other subsystems:

| Service Provided | Description |
| --- | --- |
| GetName | Returns name of this InfoFrame. |
| GetHTMLFile | Returns name of file containing HTML Frame data is stored. |
| UpdateHTMLFile | Informs InfoFrame that it's data file has been updated (may be required for annotation, drill-down, graph generation). |

The Server API subsystem 1403 encapsulates all functions which require communication with the MDT Server 32 (DAI 14). This isolates the User Interface 1401 and Folder Manager 1402 subsystems from specific knowledge about the Client-Server interface, keeping them independent of minor changes, etc.

As seen in FIG. 15, the Server APIs 1403 can be divided into four API modules: Metadata 1531, InfoFrame Generation 1532, Data Warehouse 1533, and Session Management 1534. The Server APIs subsystem 1403 also includes a set of internal routines for talking to the CSM 1404, which are shared by the four APIs. Each module is described below.

The Metadata API 1531 handles all Client 12 requests to view or modify portions of the MDT Metadata 25. Again the Metadata 25 resides on the server 34, and the Client 12 retrieves pieces of the Metadata 25 as needed, via the DAI 14.

The MetaData API 1531 provides the following services to other Client subsystems:

| Service Provided | Description |
| --- | --- |
| GetDimensions | Returns a list of clnt_Dimension objects representing all Dimensions. |
| AddDimension | Add a new Dimension. |
| UpdateDimension | Update an existing Dimension. |
| DeleteDimension | Remove an existing Dimension. |
| GetDimensionPartitions | Returns a list of clnt_Partition objects for all Child Partitions within a given Dimension. |
| GetPartitions | Returns a list of clnt_Partition objects for all Child Partitions within a given Segment. |
| AddPartition | Add a new Partition. |
| UpdatePartition | Update an existing Partition. |
| DeletePartition | Remove an existing Partition. |
| GetSegments | Returns a list of clnt_Segment objects for all defined Segments within a given Partition. |
| AddSegment | Add a new Segment. |
| UpdateSegment | Update an existing Segment. |
| DeleteSegment | Remove an existing Segment. |
| GetMeasures | Returns 3 lists: Basic Measures, Composite Measures, and all Measures which are accessible to the User (some Measures are used internally in the Client code). |
| AddMeasure | Add a new Measure. |
| UpdateMeasure | Modify an existing Measure. |
| DeleteMeasure | Remove an existing Measure. |
| GetMeasureRelationship | Retrieve a Measure Relationship. |
| AddMeasureRelationship | Add a new Measure Relationship. |
| UpdateMeasureRelationship | Update an existing Measure Relationship. |
| DeleteMeasureRelationship | Remove an existing Measure Relationship. |
| GetRelationships | Retrieve possible Relationship types for a given Attribute. |
| GetRange | Retrieve range of values for a given Attribute. |

The Metadata API uses the Communications Services module (see below) to communicate with the CSM 1404.

Several classes work together to provide the set of services listed in the table above. Class clnt_Dimension has public methods: GetDimensions (a static class method), AddDimension, UpdateDimension, DeleteDimension, and GetDimensionPartitions, AddDimensionPartition, DeleteDimensionPartition. Class clnt_Partition has public methods: GetSegments, AddSegment, DeleteSegment, UpdatePartition. Class clnt_Segment has public methods: GetPartitions, AddPartition, DeletePartition, UpdateSegment. Measure functions are represented by two classes: clnt_BasicMeasure and clnt_CompositeMeasure.

The InfoFrame Generation API 1532 contains all functions related to requesting that the DAI 14 run or schedule an Analyst, and retrieving status and completed InfoFrames from the DAI 14. Functions in this API 1532 are used by the Manager subsystem 1402 and the User Interface subsystem 1401.

The InfoFrame Generation API 1532 provides the following services to other Client subsystems:

| Service Provided | Description |
| --- | --- |
| GetInfoFrameGenerationInstance | Returns a pointer to the one-and-only-one instance of clnt_InfoFrameGeneration. |
| GetStatus | Query the DM for list of currenfly pending and/or completed InfoFrames. |
| RetrieveFrame | Retrieve a specific completed InfoFrame from the DAI. |
| RunAnalystNow | Send an InfoFrame Generation request to the DAI for immediate processing. |
| ScheduleAnalyst | Send an InfoFrame Generation request to the DAI with a schedule on which to run it. |
| UpdateAnalyst | Send the DAI a modification to an existing, scheduled Analyst. |
| CancelAnalyst | Cancel a previously scheduled InfoFrame Generation request. |

The InfoFrames API 1532 also uses the Communications Services module to communicate with the CSM 1404.

The InfoFrame Generation API 1532 functions listed above are public members of the clnt_InfoFrameGeneration class. The clnt_InfoFrameGeneration class will be instantiated only once, using the "Singleton" pattern (described previously).

The Data Warehouse API 1533 provides services related to setting up Metadata 25, at which time the MDTA (Administrator) needs access to information about the schema of the Data Warehouse 24. This API 1533 cis encapsulated in the clnt_Schema class. The Data Warehouse API 1533 provides the following services to other MDT Client subsystems:

| Service Provided | Description |
| --- | --- |
| GetTables | Returns a list of names of Tables from the current Schema data. |
| GetColumns | Returns a list of names of Columns from a given Table. |
| GetPrimaryKeys | Returns a list of names of Primary Keys in a given Table. |
| GetForeignKeys | Returns a list of Foreign Keys in a given Table. |
| ForeignToPrimary | Returns a list of Primary Keys associated with a given Foreign Key in a given Table. |
| PrimaryToForeign | Returns a list of Foreign Keys associated with a given Primary Key in a given Table. |
| LoadSchema | Loads schema from server; returns True if successful. |

The Data Warehouse API 1533 also uses the Communications Services module to communicate with the CSM 1404.

The Data Warehouse API 1533 is encapsulated in the clnt_Schema class. The clnt_Schema class has public member functions which correspond directly to the API calls described in the table above. The LoadSchema function loads all of the Data Warehouse schema onto the Client for the other API functions to access. The schema is discarded after each use.

The Session Management API 1534 contains functions related to establishing a session with the MDT Server (and to closing the connection when exiting). This includes functions related to User and Password management. The Session Management API provides the following services to other MDT Client subsystems:

| Service Provided | Description |
| --- | --- |
| GetSessionManager | Returns pointer to the one-and-only-one instance of class clnt_SessionManager. |
| Connect | Establish a connection to the Server and attempt to authenticate the given User Name and Password. |
| Disconnect | Orderly shutdown of our connection to the Server. |
| UpdateUserPassword | Change a User's password on the Server. |

The Session Management API 1534 also uses the Communications Services module to communicate with the CSM 1404.

The Session Management functions listed above are public member functions of class clnt_SessionManager. Class clnt_SessionManager is instantiated once and only once, using the "Singleton" pattern.

The Communication service encapsulates functions for talking to the DAI 14 via the CSM 1404. These functions are shared by the four APIs 1531, 1532, 1533 and 1534 within the Server APIs subsystem 1403. The Communications Services capabilities are encapsulated in class clnt_Communications, which will be a private superclass for all other classes in the Server APIs subsystem 1403.

3. Data Abstraction Intelligence (DAI) Subsystem 14

The data abstraction intelligence subsystem 14 is described in further detail below.

A key feature of the present invention (also referred to as Management Discovery Tool or MDT) is that it allows the user 1405 to easily choose different levels of granularity in the viewing and understanding of the business objects of interest, and have these different levels reflected in InfoFrames generated by the MDT. For example, when the user 1405 thinks of the concept of product, he or she may mean all products marketed by the Enterprise, or, more likely, some interesting subset of all products. This subset can be defined by restrictions on the attributes of product, either a single restriction such as men's clothing (defined as the product Department=men's clothing), or multiple restrictions, such as expensive men's suits made by Christian Dior (similarly defined by restrictions on Department, Price, and Manufacturer).

One of the insights in the design of the present invention is the notion that such subsets form hierarchies, and that these hierarchies may provide a convenient and powerful way for the user to both think about their business and select relevant levels or granularities for the production of InfoFrames. An important technical point, but one that is kept partially hidden from the user 1405, is how related segments form partitions.

The Management Discovery Tool of the present invention sits on top of a data warehouse 24, a single logical, consistent view of an enterprise's data. Typically, there are many different ways to store data; that is, there are different table structures or schema for a given set of data. For most, if not all, enterprises, there exists a small set of fundamental data types that are the lowest level of granularity and correspond to, typically, specific entities like product, customer, transaction, and the like. These entities can be thought of as having a set of attributes associated with them, and these attributes can have values. In the relational model, this corresponds to a table of entities, with the attributes mapping into columns. Again, physically, they may be stored as several tables, but conceptually, this is what MDT is working with.

Figure 16:
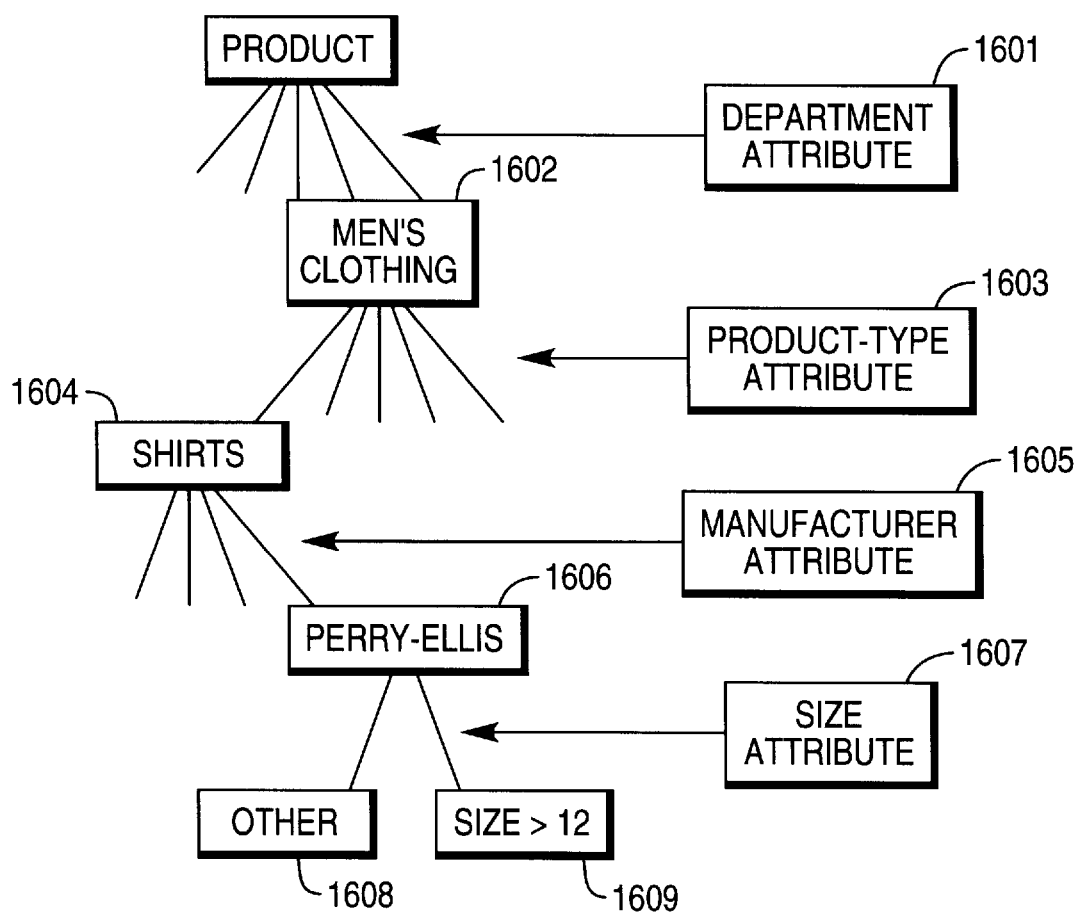
FIG. 16 is a database heirarchy that may be created according to the teachings of the present invention.

FIG. 16 illustrates the hierarchy formed by the user 1405 choosing the Department attribute 1601, the selecting segment Men's Clothing Department 1602 of the attribute; of choosing the Product-type attribute 1603, then selecting the segment Shirts 1604 of that attribute; the Manufacturer Attribute 1605, then Perry-Ellis 1606; and finally, the Size attribute 1607, and a particular partition 1608/1609. The final Business Segment of interest is: "Perry Ellis Men's Shirts". Note that this segment could have been reached in several different ways, in particular, by any order of relevant attributes.

This scheme creates several requirements for other parts of MDT. First, the attributes of each dimension must be available. Second, the legitimate values for each attribute must also be made available. For finite domains, these must be listed for the user 1405; for infinite domains, current minimum and maximum values may be useful. There is a subtly here that can perhaps be avoided at first: the possible attribute values may not, in fact, be appropriate in all cases. In the above example, all Manufacturers may not make Men's Shirts. It may be possible to query the database for legitimate values, or store this information as additional metadata.

An important requirement of the present invention is to provide the ability to save and re-use user-defined segments. If "Perry-Ellis Men's Shirts" is an important category to the user 1405, he or she should be able to save that category and re-use it in the generation of InfoFrames. Our approach allows users to define segments and automatically keeps these segments in a hierarchy. The table below provides a set of named segments and their definition, i.e. the restrictions on their attributes. All segments are on the dimension "Product".

| Name | Dept | Maker | Type | Size |
|---|---|---|---|---|
| Men's Clothing | MC | | | |
| Men's Shirts | MC | | Shirts | |
| Perry-Ellis Shirts | | Perry-Ellis | Shirts | |
| Perry-Ellis Men's Shirts | MC | Perry-Ellis | Shirts | |
| Men's Pants | MC | | Pants | |
| Large Men's Shirts | MC | | Shirts | Large |
| Large Men's Pants | MC | | Pants | Large |
| Gap Products | | Gap | | |
| Perry-Ellis Products | | Perry-Ellis | | |
| Guess Products | | Guess | | |
| Medium and Large Men's Clothing | MC | | | Medium + large |
| Small Men's Clothing | MC | | | Small |
| Small Men's Shirts | MC | | Shirts | Small |

Figure 17:
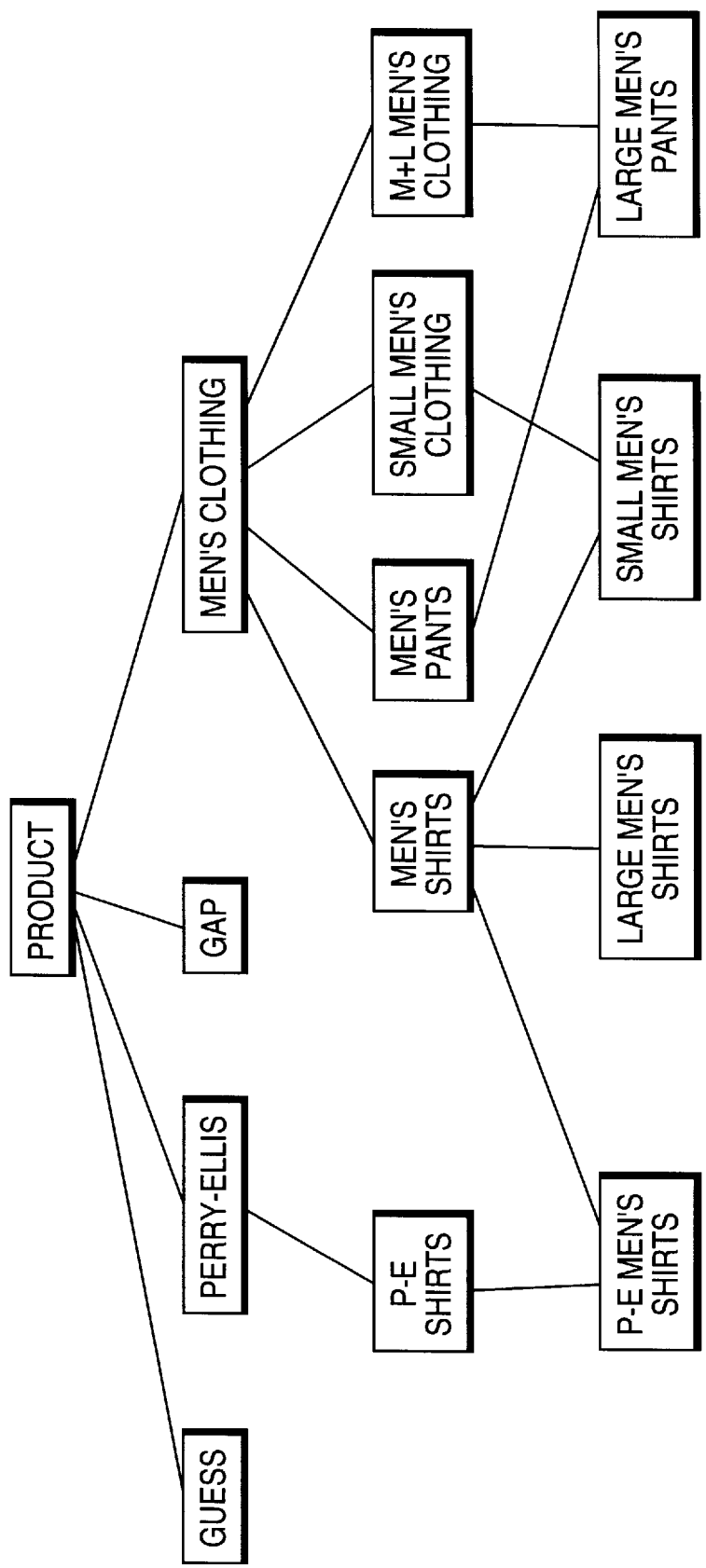
FIG. 17 is another heirarchy that may be created according to the teachings of the present invention.

The segments described above give rise to the segment hierarchy depicted in FIG. 17. Note that there is an inherent ambiguity in this structure: a given Business Segment can belong to several different partitions and have children beneath it whom are in several different partitions. For example, the Segment "perry-ellis-men's-shirts" belongs to two partitions. The first partition is on "perry-ellis-shirts" and uses the value "men's" to further discriminate (note the "Other" segment would now mean "perry-ellis-shirts-but-not-for-men". This segment is also part of a partion on "men's-shirts", and restricts the Manufacturer attribute to be perry-ellis. Here, the "Other" segment indicates "men's-shirts-made-by-everybody-but-perry-ellis".

Figure 18:
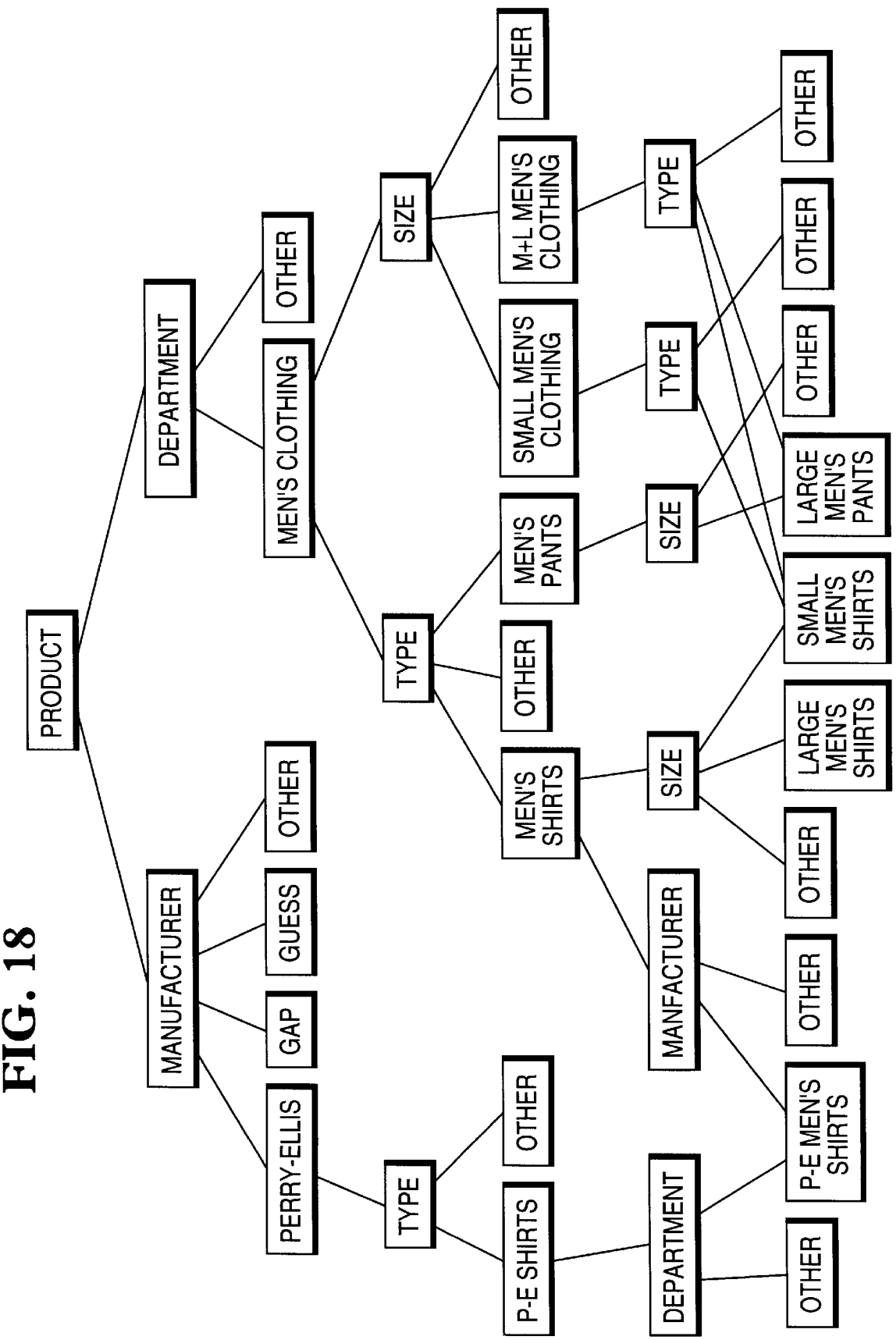
FIG. 18 is yet another heirarchy that may be created according to the teachings of the present invention.

In order to resolve the ambiguity, the notion of partition must be made explicit. Thus, FIG. 17 may be re-drawn as shown in FIG. 18 to include partitions (dark boundaries) and the "Other" segments. We now see from FIG. 18 that the notion of "partition" is just as important as the notion of "segment"; indeed, the two notions cannot be separated.

Referring back to FIG. 1, the MDT Data Abstraction Intelligence (DAI) subsystem 14 sits between the Client subsystem 12 and the Data and Schema Manipulation (DSM) subsystem 16. The DAI 14 (and the DSM 16) reside on the Applications Server 32 between the Desktop 30 and the Data Warehouse 24. The DAI 14 is responsible for instantiating user selected InfoFrames and managing several kinds of metadata used in this instantiation. This metadata represents (1) Dimensions and Measures that provide a customizable "dimensionalization" of the relational data in the warehouse; (2) Measure Relationships that provide explanatory text in the InfoFrame; and (3) metadata related to time. The DAI 14 also processes updates to this metadata that originate in the Client layer 12 and handles several other kinds of user updates, primarily by passing them through to the DSM 16 subsystem. Finally, the DAI 14 executes Alert requests from either the Client 12 or the Scheduler subsystem 18.

The design of the overall Client/Server envisions two kinds of DAI subsystems 14. The first kind of DAI 14 is needed to handle continual, synchronous requests for information from the Client 12. For example, the Client 12 may make a number of requests for metadata information during an active MDT session; the S-DAI (for Serial DAI) will handle these requests.

The second kind of DAI 14 will execute an Analyst, which may contain a trigger definition or an InfoFrame definition. This execution may take a relatively long time (e.g., hours) and will execute concurrently. This type of DAI 14 may be called the C-DAI, for Concurrent DAI. The C-DAI is spawned by an S-DAI in response to an InfoFrame request and given all the information it needs. When it is finished, it will write the resulting InfoFrame into a server disk file.

Figure 19:
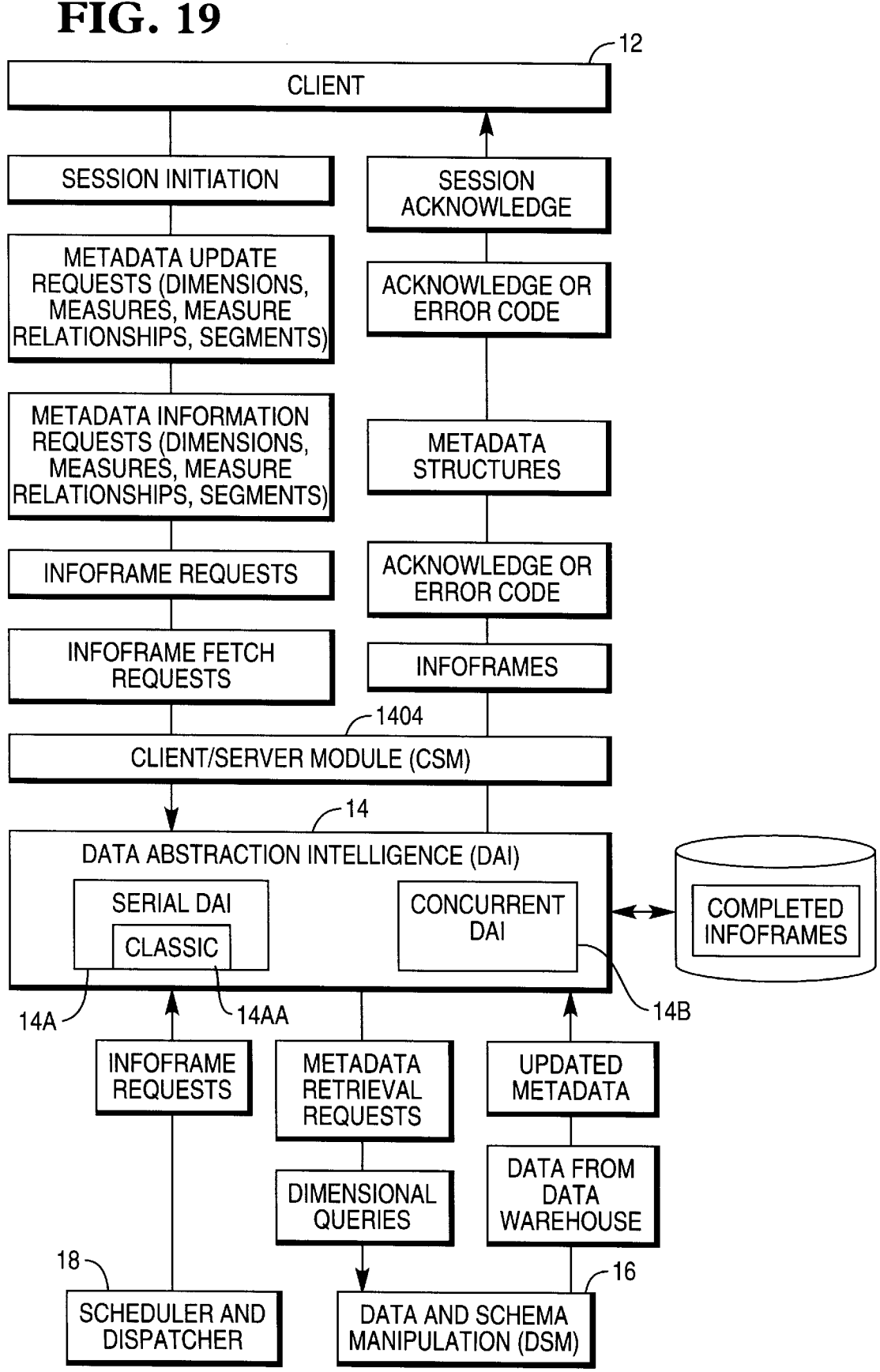
FIG. 19 is a general, high-level data flow between the DAI and the other subsystems and components of the system of the present invention.

FIG. 19 shows the general, high-level data flow between the DAI 14 and the other subsystems and components of the present MDT invention.

When a user logs onto the present invention, a Serial DAI (S-DAI) 14A is created to service various kinds of requests. All user requests from the Client 12 flow through the Client/Server module (CSM) 1404, which controls communication between Client 12 and Server 32. Requests for metadata, both read and update (write) requests, are handled by the S-DAI. Read requests cause the S-DAI to query the Data and Schema Manipulation (DSM) module 16 for metadata contained in the MDT metadata tables. The S-DAI handles update requests by using the "Classic subsystem", a system for managing heirarchical data structures available from Bell Laboratories of Lucent Technologies. The Classic subsystem may be used to check and properly position new user segments in the segment hierarchy. The Serial DAI also handles requests for previously generated InfoFrames, fetching them from the Server disk.

When a user requests that an Analyst be generated, a Concurrent DAI 14B is created by the Dispatcher (if resources permit), and the Concurrent DAI 14B is passed all the information in the Analyst definition. The Concurrent DAI 14B then uses its built-in algorithms and metadata requested from the CSM 1404 to generate the InfoFrame which is then stored on the Server disk.

The CSM module 1404 provides the low level services that pass messages from one process to another. Certain classes may be built on top of the CSM 1404 that make it easier to use, as described in further detail below.

The message-passing design consists of 5 classes and an enumerated type. mdt__MessageType, the enumerated type has a unique value for each type of message in MDT; mdt__TInStreamHandle and mdt__TOutStreamHandle are handles for incoming and outgoing message streams respectively; mdt__Message is an abstract base class for all MDT messages; dai__MessageHandler is an abstract base class for objects that can handle messages; finally, dai__MessageRegistry is the registry of message handlers.

```
mdt__MessageType is defined below.
    enum mdt__MessageType {
        UNDEFINED,
        CS_LOGIN,
        SC_LOGIN_RESPONSE,
        CS_GENERATE_INFOFRAME,
        CS_GET_INFOFRAME_STATUS,
        SC_INFOFRAME_STATUS,
        CS_GET_INFOFRAME,
        SC_INFOFRAME,
        END_OF_ENUM
    };
``` mdt__MessageType is an enum than defines all the message types understood by MDT processes. For each class derived from mdt__Message, there must be at least one value in mdt MessageType. This declaration of mdt__MessageType is used by all components of MDT. The message types shown are only a sample. The message types currently defined below are only a sample. This definition will evolve as MDT code is written.

```
mdt__TInStreamHandle is defined below.
    class mdt__TInStreamHandle : public csm__InStreamHandle {
        public:
            mdt__TInStreamHandle() : d__mtype(UNDEFINED) {}
            virtual void Connect(RWvistream *);
            mdt__MessageType GetMessageType() const;
        private:
            mdt__MessageType d__mtype;
    };
``` mdt__TInStreamHandle is a typed handle for incoming (received) message streams. An mdt__TInStreamHandle is used to pick up an incoming message stream from the CSM module 1404. The mdt__TInStreamHandle automatically reads the message's type from the incoming message stream and provides a member function to get that message type. Users of mdt__MessageRegistry need not use this class.

```
mdt__TOutStreamHandle is defined below.
    class mdt__TOutStreamHandle : public csm__OutStreamHandle {
        public:
            mdt__TOutStreamHandle(mdt__MessageType t) : d__mtype(t) {}
            virtual void Connect(RWvostream *);
            mdt__MessageType GetMessageType() const;
        private:
            mdt__TOutStreamHandle();
            mdt__MessageType d__mtype;
    };
``` mdt__TOutStreamHandle is a typed handle for outgoing message streams. An mdt__TOutStreamHandle is used to send a streamed message out via the CSM 1404. The mdt__TOutStreamHandle has a message type and automatically writes it's message type to the stream so that the mdt__TInStreamHandle on the receiving end can decode the message type.

```
mdt__Message is defined below.
    class mdt__Message {
        public:
            mdt__Message() : d__restoreVersion(0), d__restoreFlag(false) {}
            mdt__Message(const mdt__Message &);
            virtual mdt__MessageType GetMessageType() const;
            virtual int GetLatestVersion() const = 0;
            virtual void SetRestoreVersion(int restoreVersion);
            virtual int GetRestoreVersion() const;
            virtual void saveGuts(RWvostream &) const;
            virtual void restoreGuts(RWvistream &);
            virtual bool IsRestored() const;
        protected:
            virtual void SetRestoredFlag(bool);
        private:
            bool d__restoreFlag;
            int d__restoreVersion;
    };
```

Requests and Replys are communicated between Client 12, Serial DAI 14A, Concurrent DAI 14B, Scheduler 18 and Dispatch 2513 by the Client/Server Module (CSM) 1404.

CSM 1404 implements an mdt__Message class which will be used for sending or receiving Requests or Replies. A receiving mdt__Message will contain an input stream. A sending mdt__Message will contain an output stream. A stream is a well known C++ construct which allows the user to 'stream' the elements of a long message into a buffer, or to stream the elements of the message out of a buffer.

Each of the Request and Replies implemented for the present MDT invention are represented by a message derived frmo the mdt__Message base class and has appropriate functions for streaming itself into or out of a stream.

The CSM 1404 implements a csm__SimpleSocket and a csm__ServerSocket class. Each type of socket contains a TCP/IP socket. A TCP/IP socket is a well known API to a TCP/IP network. Other implementations are envisioned. Each type of socket can extract the stream buffer from a message and send it via the socket to a recieving csm__Simple or csm__ServerSocket, or can receive a stream buffer from a sending csm__SimpleSocket and install it in a message.

A csm__SimpleSocket is used to communicate messages between MDT subsystems in a committed, one to one relationship. A csm__ServerSocket is used to allow an MDT subsystem to accept messages from many other subsystems.

Figure 25:
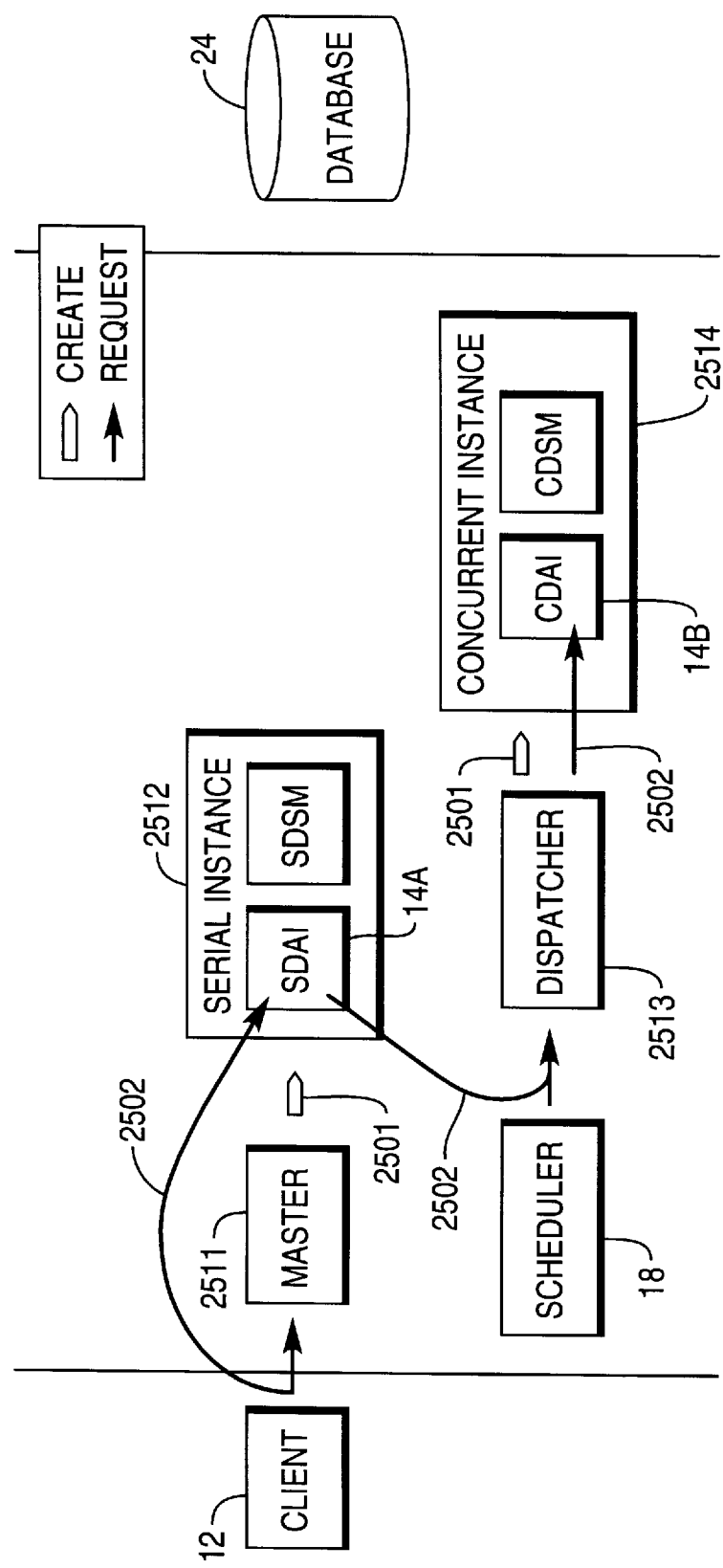
FIG. 25 is a description of the processes performed by the server of FIG. 1.

In FIG. 25, the Client subsystem 12 will maintain a csm__SimpleSocket which it will use to request a SDAI subsystem 2512 from the Master subsystem 2511, and which it will use thereafter to exchange messages with that SDAI subsystem. The Client 12 will use this socket whenever a user input to the Client 12 requires an exchange with the Server. In FIG. 25, the Master subsystem 2511 will maintain a csm__ServerSocket to receive messages from any Client subsystem 12 which wants to request an SDAI subsystem 14A. Excepting when the Master is activly starting or otherwise tending to the SDAI's, it will be listening at the csm__ServerSocket.

The SDAI subsystem 2511 will maintain a csm__SimpleSocket to exchange messages with the Client subsystem 12. Except when it is actually implementing a Client request, the SDAI 14A will be listening at its csm__SimpleSocket.

When the user 1405 submits an Analyst for immeadiate execution, the SDAI subsystem 14A will construct a new csm__SimpleSocket to communicate the Analyst to the Dispatcher 2501. When the user sumbits a Scheduled or Triggered Analyst, the SDAI will construct a csm__SimpleSocket to communicate the Analyst to the Scheduler 18. The Scheduler 18 will maintain a csm_ServerSocket to collect Scheduled or Triggered Analysts from any and all SDAI subsystems 2511. When the Scheduler determines the time has come to launch a Scheduled or Triggered Analyst, it will construct a csm_SimpleSocket to communicate that Analyst to Dispatcher subsystem 2513. Except when it is testing its Scheduled and Triggered Analyst lists or dispatching them, the Scheduler will be listening at its csm_SimpleSocket.

The Dispatcher subsystem 2513 will maintain a csm_ServerSocket to collect Analysts for execution from any ready SDAI subsystem 2511 or from the Scheduler subsystem 18; or to collect Analyst requests from the CDAI subsystem 14B. When an SDAI or the Scheduler presents an Analyst, the Dispatch will hold it until resource become available for its execution. When resources are available the SDAI will start a CDAI 14B. When the CDAI returns a request for the Analysts, the SDAI will create a csm_SimpleSocket to communicate that Analyst to the CDAI. Except when it is starting managing CDAIs, the SDAI subsytem 2513 will be listening at its csm_ServerSocket.

The CDAI subsystem 14B will construct a csm_SimpleSocket shortly after it is started to collect its Analyst from the Dispatcher subsystem 2513. After collecting this message, it will discard the csm_SimpleSocket. The CDAI 14B will exchange no other messages with the other subsystems of the present invention.

The mdt_Message abstract base class defines the object that holds the content of an MDT interprocess message. Each message has a message type, a message version, and the ability to read/write its data from/to a stream of message data. For each type of message, there is a concrete implementation of a class derived from mdt_Message. Each message class must implement GetLatestVersion to return its version and GetMessageType to return its mdt_MessageType. It must also implement the Rogue Wave saveGuts and restoreGuts methods to write its persistent member data to a stream and read the member data back from stream. Unpacking order is first in first out. There is only one derived message class per message type, but there can be several message types used by a derived message class. The same message code should be linked into both the sending and receiving processes. Version checking is used to robustly handle mismatches between the version of the code in the sending process and the receiving process. The message version is used by restoreGuts to insure that an incoming message stream can be restored and to migrate streams saved by older versions of the class to the current version. An mdt_Messages is sent/received from the CSM module 1404 by saving/restoring its guts to/from the stream pointed to by the mdt_TOutStreamHandle/mdt_TInStreamHandle class defined above.

```
dai_MessageHandler is defined below.
    class dai_MessageHandler {
    public:
        virtual bool HandleMessage(const mdt_Message &) = 0
    };
``` dai_MessageHandler is an abstract base class for message handler classes. If the process uses the message registry to dispatch received messages, at least one concrete message handler class must be implemented. As many as one message handler per registered message may be implemented.

```
dai_MessageRegistry is defined below.
    Class dai_MessageRegistry {
    public:
        dai_MessageRegistry(csm_Connect &);
        void DispatchMessages();
        void RegisterMessage(mdt_MessageType,
            dai_MessageCreateFunc,
            dai_MessageHandler &);
    private:
        dai_MessageCreateFunc d_createFunc;
        dai_MessageHandler *d_handler;
        csm_Connect *d_connect;
    };
``` dai_MessageRegistry is a class meant to be instantiated only once in each process that uses it. The message registry provides a method to register a handler for each message type and a method to dispatch all incoming methods. The dispatch method acts as the application's main loop. The return value of the HandleMessage method of the handler determines whether DispatchMessages blocks or returns after a message is processed. If the return value is true, it blocks.

The following is the set of events that occur as a message is transmitted from one process to another using the MDT typed stream handles and the message registry.
1. sending process constructs an instance of a concrete message class (derived from mdt_Message), MS and loads it with the proper message data.
2. sending process creates an mdt_TOutStreamHandle object with the same message type as the message. The mdt_TOutStreamHandle object writes the message type to the stream.
3. sending process uses the message's saveGuts member function to write the message to the message stream.
4. message's saveGuts method first calls base class method which writes the message's version number to the stream. Next it saves the message's persistent member data fields to the stream.
5. sending process calls csm_SendProcessConnect::Send( ) to send the message stream.
6. The CSM extracts bytes from the stream object and sends the bytes to the receiving process.
7. When the mdt_TOutStreamHandle object is destroyed, it in turn destroys the stream object it was connected to.
8. The receiving process should be waiting in a call to csm_ReceiveProcess::Receive( ). Internally, there is probably some queuing of messages.
9. The CSM in the receiving process gets the oldest queued message. It then converts the bytes into a stream object and connects that stream to the mdt_TInStreamHandle object that was passed to csm_ReceiveProcess::Receive( ).
10. When the stream is connected to the handle, the handle reads the message type from the stream and remembers it.
11. Finally, control returns from csm_ReceiveProcess::Receive( ) to the caller.
12. The receiving process gets the message type from the mdt_TInStreamHandle and constructs an empty instance of the right type of message class for that message type. If the message dispatcher is in use, this is handled by dai_MessageRegistry::DispatchMessages( ).
13. The receiving process calls the message's restoreGuts function. If the message dispatcher is in use, this is handled by dai_MessageRegistry::DispatchMessages( ).
14. The message's restoreGuts method first calls the restoreGuts method of its base class (usually mdt_Message) which reads the version number and saves it as the RestoreVersion member. Next control returns to the derived version of restoreGuts. It calls GetRestoreVersion and uses the resulting version number to determine which data members to read from the stream and what order to read them in. Next the data fields of the message class are read back from the stream.

15. The received message is now in its final form. If the dispatcher is in use, it looks up the handler for this message type in the registry and calls its HandleMessage method.

16. When the mdt_TInStreamHandle object used to receive the message is destroyed (or reconnected by another call to csm_ReceiveProcess::Receive( ), the stream it was pointing to is deleted.

The present MDT invention enables business or other users to monitor their data warehouse 24 by defining powerful report-generation objects called Analysts. An Analyst is an encapsulation of a generic type of business analysis, customized by the user 1405 by providing a set of parameters, a schedule, and a trigger condition. The Analyst periodically checks the trigger condition if it has a trigger condition, or periodically executes on the schedule if it has a schedule. Otherwise it executes right away. InfoFrames contain a variety of kinds of business data and hyperlinks which can be used to run other Analysts and generate related InfoFrames. The functionality of MDT, including Analyst definition and InfoFrame generation, requires an "MDT view" of the data warehouse 24 that we refer to as "MDT metadata" 25.

The word "metadata", in general refers to various kinds, of "data about data" in a database or data warehouse 24 (FIG. 1). MDT metadata 25 provides a customizable view of the data not restricted by the relational structure of the database. MDT metadata 25 is stored in the data warehouse 24 as a set of tables and is read by MDT present invention during start-up. Populating the metadata 25 in the warehouse 24 is a key part of the MDT installation process, and an MDT Administrator will generally be needed to extend and maintain the MDT metadata using knowledge of the structure of the data warehouse 24.

There are 4 main kinds of MDT metadata: (1) Dimensions and Attributes, (2) Segments and Partitions, (3) Measures, and (4) Measure Relationships. The present specification describes each kind of Metadata with a series of tables. Each table shows the column names and the types of the data values in that column (in parentheses). Some columns define MDT-oriented entities or objects, and others provide mapping information between MDT metadata and the relational schema of the warehouse. Primary keys for each table are italicized (if more than one column name is italicized, the combination of those column names forms the key).

MDT metadata 25 includes an explicit notion that certain data attributes can have a finite set of values. These are referred to as "enumerated attributes". For example, the present invention can represent the fact that the values for the attribute "State" are limited to a finite set of values (that is, each of the 50 States of the United States, in whatever encoding the data warehouse uses). The MDT metadata tables also refer to, for convenience, sets of values that are represented in enumerated types in source code header files. The word "enum" refers to column values of this type.

The table representation of MDT metadata 25 is first described in 4 sections, one for each main kind of Metadata. The following are then described: representation of time in MDT, the kinds of metadata that need to be stored in source code header files, and the issue of populating the metadata tables during installation is discussed.

Dimensions are the starting vocabulary for the domain: they define the high-level categories of entities. For example, in a retail domain, the Dimensions might be: Product, Market, and Time (Time is a universal Dimensions applicable to most domains and is discussed in a later section). Each Dimension has a set of attributes that can be used to describe its entities; for example, the various attributes for Product, like Department, Price, Style, and Manufacturer.

All tables in this section are set up during installation and are unlikely to change often, because they are all heavily dependent on the structure of the data warehouse 24 and the industry-specific view of the data. None of the tables in this section are generally modifiable by the end user, although occasional modification may be needed by the MDT Administrator to extend MDT metadata or respond to changes in the relational schema of the data warehouse.

As shown in the following table, dimensions are represented by their name and an associated Id. The Id is used to join with other tables more efficiently. The Seg-Id is the Id of the top-level segment for this dimension, and the Comment is a comment.

| Dim-Id (int) | Name (string) | Seg-Id (int) | Comment (string) |
|---|---|---|---|
| 001 | Product | | |
| 002 | Market | | |
| ... | | | ... |

The following table represents all of the attributes for each Dimension. Each attribute has a unique Id (Attr-Id), a name, and the Id (Dim-Id) of the Dimension they belong to. Attributes for different Dimensions can have the same name (but they will have different Ids). MDT-Type indicates the MDT type of the attribute. Each attribute is mapped to a single table and column, and we encode the data type of the field in the database that each attribute maps to (Column-Type). All the attributes for a given Dimension can be extracted from this table using the Dim-Id field. The enum values for MDT-Type are: enum, int, float, restricted-int, restricted-float, string. The enum values for Column-Type are all those types supported by the data warehouse.

| Attr-Id (int) | Name (string) | Dim-Id (int) | MDT-Type (enum) | Table (string) | Column (string) | Column-Type (enum) | Comment (string) |
|---|---|---|---|---|---|---|---|
| 006 | Manufacturer | 001 | enum | | | | |
| 016 | Size | 001 | int | | | | |
| 0057 | Region | 002 | enum | | | | |
| 017 | Department | 001 | enum | | | | |
| 0099 | Size | 002 | float | | | | |
| ... | ... | ... | ... | | | | |

With respect to attributes that are enumerated types, the following table represents the legitimate values for these attributes. These values will have both a user name, like "Men's Clothing" and the name of the actual data value, like "Dept-017". The information in these tables can be partially generated by a "Select . . . Distinct . . . " query for the attribute.

| Attr-Id (int) | Display-Name (string) | Data-Name (string) |
|---|---|---|
| 0017 | Men's Clothing | Dept-017 |
| 0017 | Housewares | |
| 0017 | Hardware | |
| 0057 | Southern | |
| ... | ... | ... |

For attributes that have type integer, the following table defines the appropriate ranges of values and a "typical value" if this would be useful to present to the user. Not all integer attributes have to appear in this table, if they do not have natural ranges and typical values.

| Attr-Id (int) | Min (int) | Max (int) |
|---|---|---|
| "age" | 0 | 120 |

For attributes that have type float, the following table defines the appropriate ranges of values and a "typical value" if this would be useful to present to the user. Not all float attributes have to appear in this table, if they do not have natural ranges and typical values

| Attr-Id (int) | Min (float) | Max (float) |
|---|---|---|
| "income" | 0 | 1000.00 |

A key part of the MDT metadata 25 are a set of segments and partitions for each Dimension. A segment is a set of attribute restrictions that define a class of objects of interest. For example, "Stores remodeled less than one year ago", or "non-seasonal store-shirts wide promotions", or "Perry-Ellis shirts of size 14 and larger". Segments are arranged in hierarchies, one for each Dimension. The hierarchies are further organized using the concept of a partition: a set of related segments differing only by the restriction on a single attribute. Segments and partitions are represented by a set of tables that capture the segment/partition hierarchy for each Dimension and define the attribute restrictions for each table.

The following table names each segment and the Dimensions it is a part of, and provides the name and the owner of the segment. The Owner string for segments that are globally owned will be defined in a header file; here and elsewhere it is shown as "ALL". There is a so-called "top-level segment" for each Dimension with the name "All X", where X is the Dimension name. The Num-Attrs field contains the number of attributes used to restrict this segment. For the "top-level segments", Num-Attrs will be equal to 0.

| Seg-Id (int) | Dim-Id (int) | Name (string) | Owner (string) | Num-Attrs (int) | Comment (string) |
|---|---|---|---|---|---|
| 112 | 001 | Men's Clothing | ALL | | |
| 26 | 001 | Men's Shirts | ALL | | |
| 14 | 001 | Perry-Ellis Shirts | pgs | | |
| 117 | 001 | Perry-Ellis Men's Shirts | pgs | | |
| ... | ... | ... | ... | | |

The following table represents all the numeric attribute restrictions for each segment represented in the following interval notation. In the first row above, if Attr-Id 017 stands for the Attribute "Size", then this row would read: "0<= Size<=100"; that is, "Size is greater than 0 and less than 100". Values are represented as Strings so restrictions of attributes of other type (like float or currency) can also be represented. The enum values of Operator-1 are: greater than, less than, greater than or is, less than or is, is, is not, is between.

| Seg-Id (int) | Attr-Id (int) | Value-1 (float) | Operator-1 (enum) | Value-2 (float) |
|---|---|---|---|---|
| 112 | 017 | 0 | "between" | 100 |
| 112 | 018 | | | |
| 14 | | | | |
| 117 | | | | |
| ... | ... | ... | ... | ... |

The following table represents all the set or enumerated type attribute restrictions for each segment. The The "Data Name" column is the same as before. For example, one might represent the segment "East Coast Cities" and define it as the set {New York, Boston, Washington, . . . }. To do this, several entries, one for each city, would appear in this table. This table can also be used to represent string attribute restrictions. The enum values for Operator are: is, is not, is in list, not in list.

| Seg-Id (int) | Attr-Id (int) | Operator (enum) | Data Name (string) |
|---|---|---|---|
| 112 | 019 | "in list" | Seattle |
| 112 | | | |
| 14 | | | |
| 117 | | | |
| ... | ... | ... | ... |

The following table defines each partition and the attribute it is defined over. The default partition name is that same as that of the attribute it is defined over. In this case, the user interface will display the partition name by appending "by-" as a prefix. The Name can be updated by the user 1405.

| Prtn-Id (int) | Name (string) | Owner (string) | Attr-Id (int) |
|---|---|---|---|
| 59 | | ALL | 0059 |
| 117 | | pgs | 0017 |
| ... | | ... | ... |

The following table and the next define the segment/partition hierarchy. This table represents the child partitions of each segment. This table can also be used to find the parent segments for a given partition.

| Seg-Id (int) | Prtn-Id (int) |
|---|---|
| 112 | 59 |
| 13 | 117 |
| ... | ... |

The following table represents child segments for each partition. This table can also be used to find the parent partitions for each segment.

| Prtn-Id (int) | Seg-Id (int) |
|---|---|
| 19 | 15 |
| 221 | 222 |
| ... | ... |

Measures are values in the data warehouse 24 that can be measured over the data. For example, Sales, Price, and Market Share are all measures in the retail domain. Different Measures are "rolled up" differently; for example, Sales over several markets are added while Market Share is averaged. The present MDT invention provides a set of Basic Measures during installation and allows the user to combine them to form more complicated Composite Measures using formulas.

The following table names the Measure, defines its rollup mechanism, and maps the Measure to a table and column. The Display Units column is for InfoFrame generation only. Precision is the number of digits needed to the right of the decimal point. The enum values for Rollup are: add, average, count.

| BM-Id (int) | Name (string) | Rollup (enum) | Table (string) | Column (string) | Display units (string) | Precision (int) | Comment (string) |
|---|---|---|---|---|---|---|---|
| 055 | Sales | add | | | | | |
| 0917 | Discount factor | average | | | | | |
| ... | ... | ... | | | | | |

Composite measures are built by combing basic measures, certain binary and unary operations, and special keywords that indicate, for example, the target segment, the child segments of a partition, or the sibling segments of a target segment. In addition, one can encode a set of segments to restrict a measure, using the next table. The Left-Arg and Right-Arg encode the kind of argument in "Left-M" or "Right-M", as shown here:
1. Basic measure
2. Composite measure
3. "Target segment"
4. "Parent segment"
5. Segment list: 2d argument is the Slist index (see next table).
6. Sibling segments
7. Child segments If the operator in Op is a unary operator (count, sum, average), then only the Left-M is used. If the operator in Op is a binary operator (+, −, etc.), then both the Left-M and Right-M are used.

| CM-Id (int) | Owner (string) | Name (string) | Display Units (string) | Left-M (int) | Left-Arg type (enum) | Op (enum) | Right-M (int) | Right-Arg type (enum) |
|---|---|---|---|---|---|---|---|---|

If the Composite Measure references a list of segments, then the elements of the list are represented in the following table.

| CM-Id (int) | Seg-Id (int) |
|---|---|
| 17 | 5 |
| 17 | 6 |

The following table is used to join an attribute with a basic measure to evaluate a dimensional query. The idea is that, for each attribute (that maps to a table and a column) and for each measure (that also maps to a table and a column), you need to be able to join their two tables. This table gives the column names for the two equivalent columns (keys) that can be used in the join.

| Attr-Id (int) | BM-Id (int) | Attr-Column (string) | BM-Column (string) |
|---|---|---|---|
| 5 | 8 | "cust_age" | "mkt_share" |

The following table is used to join two attributes together to evaluate a dimensional query. That is, if the previous table (above) is not sufficient to join all attributes in a dimensional query to the measure, this table can be searched to try to find a path of attributes that can be used to create multiple joins to combine all attribute tables with all measure tables.

| Attr1-Id (int) | Attr2-4d (int) | Attr1-Column (string) | Attr2-Column (string) |
|---|---|---|---|
| 17 | 4 | "cust_age" | "age" |

A Measure Relationship is a qualitative description of causality between Measures. For example, in general, if "Shelf Space" for a product goes up, then one would expect "Sales" to go up as well. In this example, "Shelf Space" is the independent Measure and "Sales" is the dependent measure. However, Measure Relationships are more complicated than a simple statement of causality and direction. One would not expect the above example to hold over all values of "Shelf Space" but only some range of values. Similarly, one might expect the relationship to hold only if the "Shelf Space" increased by some reasonable percent. Also, one might expect a measure relationship to hold only for some segments but not for others.

The following table defines basic Measure Relationships as follows. The value for the column I-Direction is either "direct" or "inverse", an enumerated type defined in a header file. If the value is "direct", then if the Independent Measure goes up, the Dependent Measure should go up. If the value is "inverse", then if the Independent Measure goes up, the Dependent Measure should go down. The enum values for I-Direction are: direct, inverse.

| MR-Id (int) | Owner (string) | Indepedent M-Id (int) | I-Direction (enum) | Dependent M-Id (int) |
|---|---|---|---|---|
| 019 | PGS | 5 | "direct" | 21 |

The following table restricts the Measure Relationship to a certain range of values of the Independent Measure. The Operation can be >, <, >=, <=, =, not=, or between. For between, both Value-1 and Value-2 are used. The enum values for Operation are: is less than, is greater than, is less than or =, is greater than or =, is, is not, between, not between.

| MR-Id (int) | Operation (enum) | Value-1 (float) | Value-2 (float) |
|---|---|---|---|
| 019 | "between" | 5 | 100 |

The following table applies only to Measure Relationships with the Change Analysis Analyst definitions. It restricts the Measure Relationship to apply only when the Independent Measure changes appropriately over the time period of the Change Analysis. The enum values for Direction are: increases, decreases.

| MR-Id (int) | Direction (enum) | Value (float) | Unit (string) |
|---|---|---|---|

The following table restricts the applicability of Measure Relations by segment. Note that if a Measure Relation applies to a given segment, it will also apply to all children segments.

| MR-Id (int) | Seg-Id (int) |
|---|---|
| 055 | 19 |
| ... | ... |

Time is an important part of MDT metadata 25. At one level, we would like the user to think of Time as another Dimension; however, because Time segments can be created on-the-fly (for example, the segment "Year-to-Date"), they are represented differently. We show this representation as a set of tables, although some of the information may be defined in source code header files.

The following table defines the lowest unit of granularity of time represented in the data warehouse 24. We are assuming that all representations of time in the data warehouse uses this single unit of time. The enum values for Base Unit are: day, week, month, year.

| Base Unit (enum) |
|---|
| Day |

If a database table is used by a measure, that table must have a column for time in it. The following table lists the columns for each table that represent time, for each basic measure.

| Table (string) | BM-Id (int) | Column (string) |
|---|---|---|
| Transaction | | Time-stamp |

The following table defines the different notions of year that may be important to the user 1405. The enum values for Week Start Day are: Sunday, Monday, Tuesday, . . . , Saturday.

| Name (string) | Start Month (string) | Start Day (int) | Week Start Day (enum) | Comment (string) |
|---|---|---|---|---|
| Calendar | January | | | |
| Fiscal | May | | | |

| Jan Start (int) | Feb Start (int) | Mar Start (int) | Apr Start (int) | May Start (int) | Jun Start (int) | July Start (int) | Aug Start (int) | Sept Start (int) | Oct Start (int) | Nov Start (int) | Dec Start (int) |
|---|---|---|---|---|---|---|---|---|---|---|---|
| Quarter 1 Begin | | | Quarter 1 Begin | | | Quarter 2 Begin | | Quarter 2 Begin | | | Quarter 3 Begin | | Quarter 3 Begin | | Quarter 4 Begin | | Quarter 4 Begin |

| Month (int) | Day (int) | Month (int) | Day (int) | Month (int) | Day (int) | Month (int) | Day (int) |
| --- | --- | --- | --- | --- | --- | --- | --- |

The Serial DAI (S-DAI) 14A (FIG. 19) is responsible for providing access to MDT metadata 25 to each Client 12. When a Client 12 logs into MDT, a Serial DAI 14A is created and connected to the Client session. All Client requests for metadata, including update requests, are handled by the Serial DAI 14A. In addition, the S-DAI 14A provides access to the MDT Administrator, allowing him or her to configure MDT using the setup screens.

Figure 20:
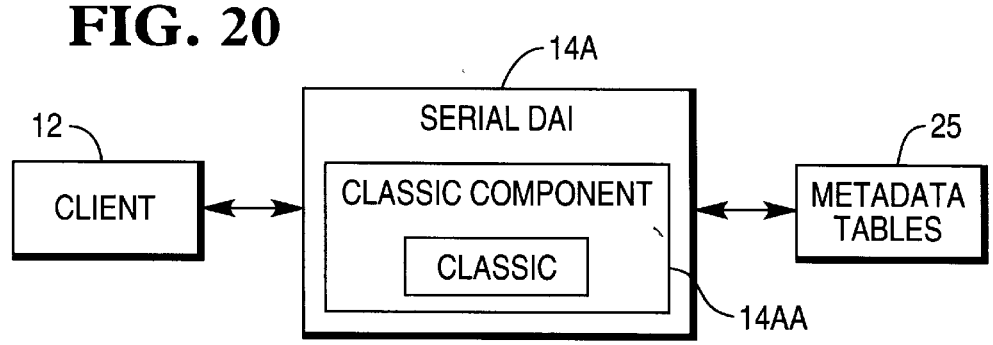
FIG. 20 is an architecture of a Serial DAI subsystem of FIG. 1.

The architecture of the Serial DAI is shown in FIG. 20.

The Serial DAI 14A gets requests in the form of MDT messages from the Client 12. Each MDT message has its own "reply class" in the S-DAI 14A. Messages for metadata access and simple update are handled through the Metadata table interface of the DSM 16 (that is, without using the Classic component 14AA—defined further below). Requests to add or delete segments use the Classic component 14AA to validate the request and update the hierarchy as needed.

Metadata access and simple update services are provided to the Client 12 by the Serial DAI 14A without use of the Classic component 14AA. Whenever the Client 12 needs a particular piece of Metadata, typically to present in the user interface, the Client 12 will send a request message to the S-DAI 14A. The S-DAI 14A will access the appropriate Metadata tables 25 to extract the appropriate Metadata. It will then package it up and return it to the Client 12 in one or more messages. The Metadata interface automatically provides access to public metadata and the metadata for this particular user.

Figure 21:
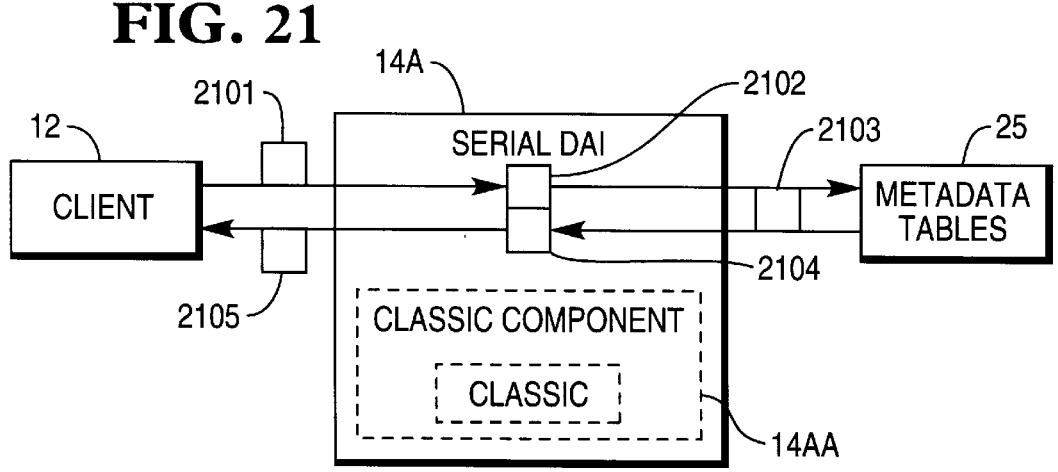
FIG. 21 is a flow diagram for the Serial DAI system of FIG. 1.

The general flow of data and control is shown in FIG. 21 and described below.

[step 2101] The Client 12 sends a metadata request message to the S-DAI 14AA. This message includes the the message type and the required parameters.

[step 2102] The Serial DAI 14A examines the message type and determines which Metadata table 25 is needed.

[step 2103] Using the parameters, the S-DAI scans the Metadata table(s) 25 for the correct metadata.

[step 2104] The Serial DAI 14A packages the metadata up.

[step 2105] The Serial DAI 14A sends a metadata message back to the Client 12.

In the unlikely event of an error, the S-DAI 14A will log the error in the server error log and return an error code to the Client 12. There may be several kinds of errors of varying severity.

New Composite Measures are added from the Client 12 using the user interface. Any syntactic or semantic checking will take place there. The syntax for Composite Measures is shown above. When the Client 12 indicates that a new Composite measure has been created, the Serial DAI will add the information to the appropriate metadata table, discussed previously.

An existing Composite Measure can be updated by pulling up an existing measure in the Measure Builder screen, editing it, and hitting the Save button. The edited Composite Measure will be saved to the Metadata tables 25 using the same Composite Measure Id. The Client 12 will display a warning message to the user 1405 to the effect that, if this Measure is being used in an Analyst, the meaning of the results presented in the subsequent InfoFrame will be different.

A Composite Measure can be deleted if it is owned by the user. The Composite Measure and its formula entries will be deleted from the appropriate table, previously described. A warning message will be presented to the user 1405, warning that if this Compound Measure is used by any Analyst or other Compound Measure, the subsequent InfoFrame will not be generated correctly and an "analyst-time" error will occur.

Adding a new measure relationship is similar to adding a new Composite measure. All checking, if any, will take place in the Client 12. When the Client indicates that a new measure relationship has been created, the Serial DAI 14A will add the information to the appropriate metadata tables.

Modifying a measure relationship is straightforward. The appropriate tables are updated and the measure relationship id is preserved. A Measure Relationship can be deleted if it is owned by the user 1405. The Measure Relationship and its table entries will be deleted from the appropriate tables. A warning message will be presented to the user, warning that if this Measure Relationship is used by an Analyst, the subsequent InfoFrame will not be complete and an "analyst-time" error will occur.

The Serial DAI 14A also processes requests from the MDT administrator. These requests are used to install MDT and make occasional changes to the public metadata. The Serial DAI 14A must handle the flow of information from both the data warehouse 24 to the Client 12 (sending both data warehouse schema information and metadata) and from the Client 12 to the data warehouse 24, in this case exclusively to the metadata. The Serial DAI 14A is not expected to have to do any processing on the data itself, i.e., to do additional integrity or exception checking.

Figure 22:
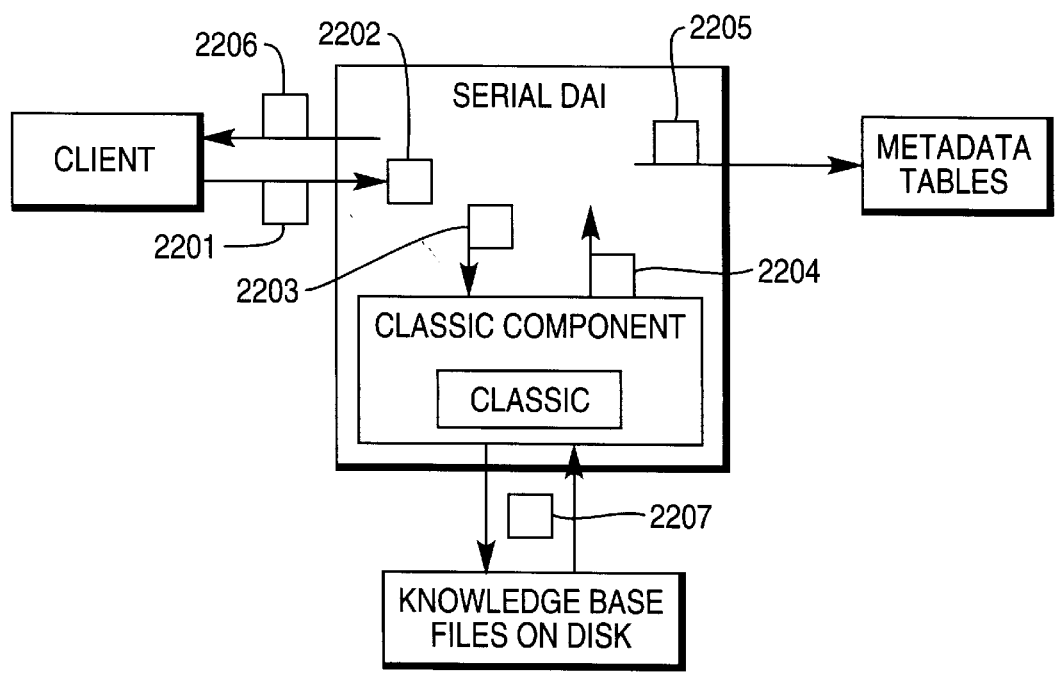
FIG. 22 is another flow diagram for the Serial DAI system of FIG. 1.

The data warehouse schema is passed to the Client 12 in one uninterpretted bundle and the Client 12 will interpret it. There are eight steps to setting up or installing MDT. Each step involves the Client 12 getting information from the Administrator through the user interface and passing information to the S-DAI 14A. The S-DAI 14A will update the metadata tables through the DSM interface. These steps are:

1. define dimensions
2. define and map attributes to database columns
3. rename coded attribute values
4. create basic segments
5. define and map basic measures to database columns
6. review the joins between database tables
7. assign database columns as time markers
8. define year types Classic 14AA is used to represent the user's segment and partition hierarchy, as described previously. When a user adds, modifies, or deletes a segment, the Classic component 14AA determines any and all changes that need to be made to the segment/partition hierarchy, or detects one of several possible kinds of errors. If there are no errors, these changes are then used to update the Client interface and the persistent metadata tables. This is shown in FIG. 22:

[step 2201] The Client 12 sends a segment update request, either an add, delete, or modify segment message.

[step 2202] The S-DAI receives the request.

[step 2203] It then calls the appropriate function in the Classic module, which uses Classic to determine all of the segment/partition changes the request induces.

[step 2004] These changes (or an appropriate error condition) are returned; if there is an error, this is passed back to the Client with no changes to the Metadata tables.

[step 2205] If there is no error, all changes are passed to the Metadata tables.

[step 2206] Again, assuming no errors, an acknowledge message is sent to the Client.

[step 2207] If the knowledge base is changed, the appropriate knowledge base file is updated.

The user's segment hierarchy is kept persistent in a knowledge base files on the Server disk. This is because it would be too time-consuming to re-create it each and every time from the Metadata tables. There is one knowledge base file for each dimension and each user. Each file reside in some area on the Server disk and be named "dimension-.user".

The user 1405 adds a new segment by selecting an existing segment (perhaps the top level segment) and then selecting a sequence of attributes and restrictions. This sequence defines a sequence of partitions and attributes. Consider the set of attributes and restrictions of: {age>65, income>100K}. This segment might be called "Wealthy Seniors". This would give rise to the following sequence, assuming the segment was defined at the top level:

```
All Customers
    [By-Age]                  <=partition named by its attribute
        Age>65                <=automatically named intermediate
                                 egment
            [By-Income]
                Wealthy Seniors   <=user-defined and named segment
```

The order of attributes is very important. That is, the final segment, "Wealthy Seniors", could also have been defined by Income and then by Age, with the same resulting final segment. However, the automatically created intermediate segment, and the two automatically created partitions, would be different. (In this case, the first partition would be "By-Income", the intermediate segment would be "Income>100", and the second partition would be "By-Age").

The following guidelines are supported for the creating of new segments:

1. The final user-named segment is created
2. "Supporting" partitions and segments are automatically created and named but only in the attribute order generated by the user 1405
3. If the final segment is a child of any existing partition it "appears there" as well.
4. If the final segment differs by a single attribute from an existing segment, the one intermediate supporting partition will be created.
5. If any segments are classified under the new segment and differ by just one attribute, the appropriate partition is created.

To illustrate guideline 4 above, let us assume the Customer hierarchy looks like this:

```
All Customers
    [By-Income]
        Moderate-Income
        High-Income
```

The user defines "Wealthy Seniors" as above. The hierarchy should now look like this:

```
All Customers
    [By-Age]
        Age>65
            [By-Income]
                Wealthy Seniors
    [By-Income]
        Moderate-Income
        High-Income
            [By-Age]
                Wealthy Seniors   <=segment and partition automatically
                                     added
```

Likewise, when the user 1405 adds a new segment, if there is an existing segment that belongs under that segment, differing by a single attribute, the existing segment will be put under the new segment and the new partition will be created.

The segment/partition hierarchy is somewhat of a strange beast. It is rooted at the "top-level segment" for that dimension, which is a segment with no attribute restrictions (this is why it represents "ALL-X", where X is the dimension, like Customer or Product). Each segment has a number of child partitions. Each partition represents a segmentation by a single attribute and has a number of child segments. A segment can belong to several partitions. A partition has only one parent segment.

The user 1405 creates a new segment by selecting a starting or parent segment, choosing a name for the final segment, and then entering a set of attributes and restrictions in the user interface. For each attribute restriction (in the order the user chose) a segment will be created and added to the segment/partition hierarchy. When a segment is added, partitions may need to be created both above and below the new segment.

Figure 23:
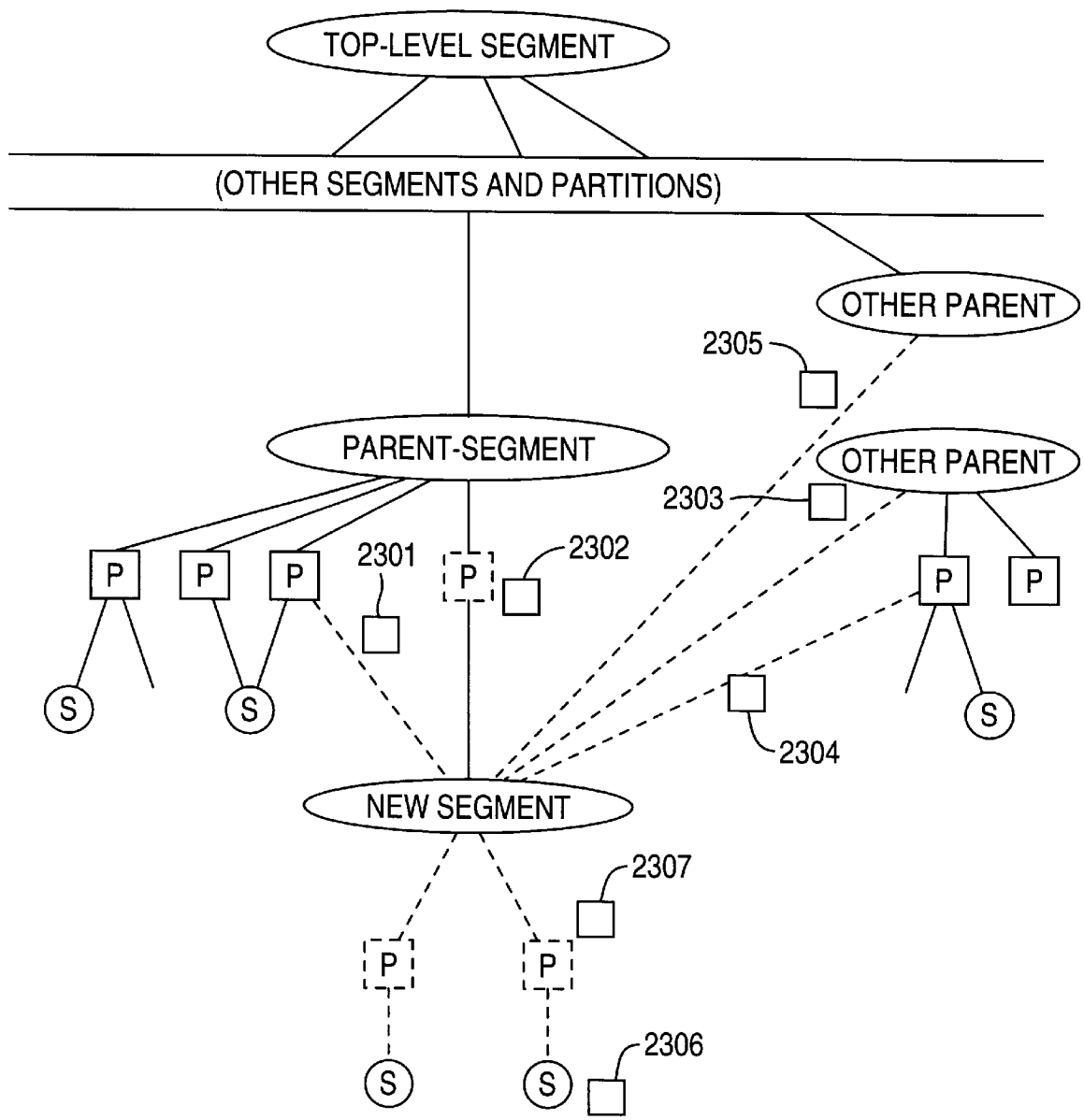
FIG. 23 is a depiction of the addition of a database segment in the system of the present invention.

FIG. 23 shows the addition of a segment (without loss of generality, one that differs from its parent by one attribute restriction). First, the new segment must be "fit" with a partition underneath its specified parent. If the new segment fits in an existing partition or partitions, it is added to those partitions (reference numeral 2301). If not, a new partition is created, (reference numeral 2302). As with all new partitions, other segments may fit and be added. For all other parents of the new segment (Classic will tell us all parents), we first make sure the new segment and parent differ by only 1 attribute. If so, as is true of the parent at reference numeral 2303, we again add to existing partitions (reference numeral 2304) or create a new one. (The Parent at reference numeral 2305 differs by more than one attribute. This means we don't know the order of the intervening segments, so we leave it alone.) Finally, any children segments of the new segment (like reference numeral 2306) (Classic will tell us the children of a segment) are fitted with new or existing partitions, like reference numeral 2307.

The following is a very brief sketch of the algorithm for adding a new segment to a user's hierarchy. When Classic 14AA is used, this is indicated by underlining.

INPUT: a parent segment and a new segment (NEW). The new segment consists of a single added attribute restriction. When the user 1405 inputs more than one attribute restriction, this basic algorithm is called several times, with names generated for the intermediate segments.

greate a temporary Classic segment for NEW

If NEW is identical to an existing segment return

```
/* for each parent:
        check that the level difference is one
        either add the segment to an existing partition or
            create a partition, add the segment, then add additional segments
*/
    get the parent segments of NEW
    for each Parent {
        if the level difference == 1 {
            fits_flag=FALSE;
            for each child partition of this segment {
                If the segment fits in this partition {
                    fits_flag=TRUE;
                    add the segment to the partition
                }
            }
            if (!fits_flag) {
                create a new partition under the parent
                add the segment to the partition
                for all other children of the current parent {
                    if the child fits this new partition
                    add it to the partition
                }
            }
        }
    }
/* Now that the segment has been added to all its parents:
    For all children of the new segment:
        check to see the level difference is 1
            either add it to an existing partition or
            create one
*/
    Get the children of the segment NEW
    For each child {
        if the level difference ==1 }
            for each child partition of NEW {
                if child fits with partition {
                    add it to the partition
                    fits_flag = TRUE
                }
                else {
                    create a new partition under NEW
                    add the child to it
                }
            }
    }
```

Deleting a segment can be surprisingly tricky. That is because various changes in the hierarchy can occur when a single segment is deleted. By design, we require that children of a segment to be deleted are themselves deleted if no other partitions refer to them.

Figure 24:
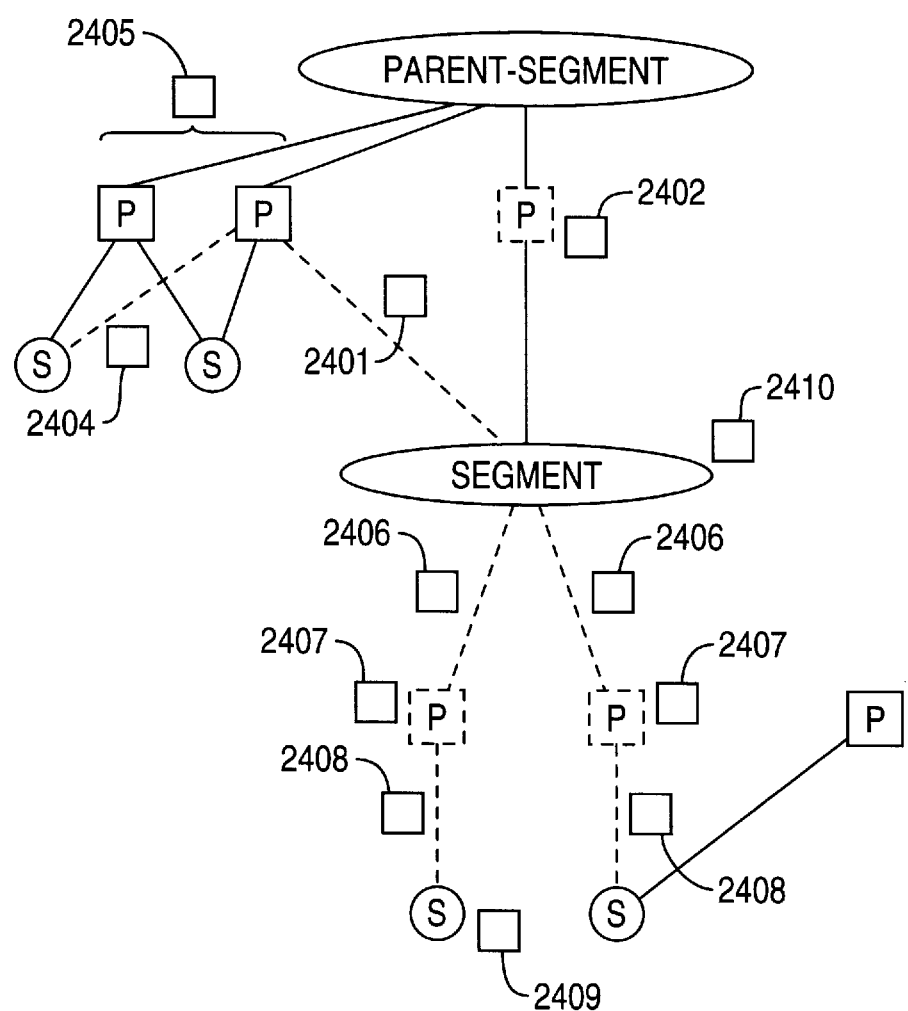
FIG. 24 is a depiction of the deletion of a database segment in the system of the present invention.

With reference to FIG. 24:

```
FOR ALL PARENT PARTITIONS
    [2401] remove the parent/segment link
    [2402] if no other segment, delete the partition
    FOR ALL CHILDREN OF THE PARENT SEGMENT
        [2404] see if they "fit" the partition now
FOR ALL PARENT PARTITIONS
    [2405] see if they are redundant and can be "collapsed"
FOR ALL CHILD PARTITIONS
    [2406] remove the segment/parttion link
    [2407] delete the partition
    FOR ALL CHILD SEGMENTS
        [2408] delete the child segment link
        [2409] if they have no parent partition, DELETE
[2410] DELETE THE SEGMENT
```

Mention was previously made of an "other" segment (referred to herein as "OS") that represents those entities not captured by the explicit segments in the final partition. For example, in a hierarchy that looks like this:

```
All Customers
    [By-Age]
        Age>65
            [By-Income]
                Wealthy Seniors
``` the OS under the partition "By-Income" would represent people older than 65 but whose income does not make them wealthy.

The OS will not be represented explicitly in the hierarchy. This is because its definition will change depending on what segments exist. For example, if the user added a segment called "Middle class seniors", the definition of the OS would change. Rather, the OS is implicit and its attribute restrictions can be computed by taking the restrictions of its sibling segments and negating them.

The Classic knowledge base must be initialized from the persistent metadata tables 25, either when a user 1405 first logs in or when a segment update request is received. Each dimension and its respective segments and partitions can be treated as a separate knowledge base. The initialization can be performed in two ways: (1) by making direct calls to Classic 14AA, or (2) by creating an ASCII flat file that Classic 14AA can read. The former is probably more efficient, while the latter may have advantages for debugging and retraction on error.

The general steps to create a Classic knowledge base are as follows, with reference to the table previously defined:

For each Dimension, read from the Dimension Definition table
→ define a dimension_filler individual for that Dimension
→ For each numeric or string attribute
    ◇ define the attribute role
→ For each enumerated attribute
    ◇ define the attribute role
    ◇ define the primitive "filler"
    ◇ for each enumerated attribute value
        * define the value individual
→ For each segment definition
    ◇ get all the attribute restrictions
    ◇ define the segment
    ◇ define the segment individual
→ For all partitions
    ◇ create a partition individual
→ For all Segment to Child Partition mapping
    ◇ create the mapping by adding the partition individual to the segment individual
→ For all Partition to Child Segment mapping
    ◇ create the mapping by adding the segment individual to the partition individual The modification of metadata, including the addition, deletion, and editing (changing) of metadata by both MDT Business-level users and the MDT Administrator (or Analyst level user), will now be described.

To modify metadata means to change it. In one embodiment, there are three kinds of change supported by the Serial DAI 14A and the Client interface: addition, deletion, and editing. The kinds of metadata involved typically include segments, composite measures, and measure relationships. There are two kinds of users 1405 who modify metadata: normal (or "business level" users), and the MDT Administrator or Analyst Level user, both refered to in this document as the MDTA. The MDTA can usually, but not always, be thought of as another user editing public metadata. We are generally not concerned here with the MDTA changing other kinds of MDT metadata like the mapping and join information. The table below summarizes these combinations:

| Subject | Action | Object |
|---------|--------|--------|
| User    | Add    | Segments |
| MDTA    | Delete | Composite Measures |
|         | Edit Relationships | Measure |
| MDTA    | Add    | Dimensions |
|         | Delete | Attributes |
|         |        | Basic Measures |

Modification of metadata is done through the Client interface, including the segment builder, measure builder, measure relationship builder, and some setup screens. The general flow of control is from the Client 12 to the Serial DAI (S-DAI) 14A, to the Classic component 14AA if segments are involved, and then to the metadata tables 25. Various warnings and errors may be presented to the user 1405, as appropriate.

Modification of metadata gets tricky for two reasons. First, their exist dependencies between metadata, for example, between segments and composite measures that refer to a segment, or dependencies between "public" metadata managed by the MDTA and various user's private metadata. Second, defined analysts, either scheduled or unscheduled, may refer to metadata that has been modified. Several important issues must be addressed, for example:

1. What happens when an analyst refers to missing metadata, i.e., metadata that has been deleted?
2. What happens when metadata is deleted and other metadata refers to it?
3. When the MDTA changes public segments, how are the user's segment hierarchies updated?
4. What happens when the MDTA deletes a dimension, attribute, or basic measure?

One can imagine two extreme approaches along a spectrum: one, do no checking whatsoever (a "user beware" approach), two, try to capture and prevent all potential problems. In a preferred embodiment, the present invention may be designed to be closer to the "user beware" side of the spectrum, although any other suitable design may be implemented. Given this, it is desirable to give the user 1405 warnings and information when available and to not do anything that surprises the user 1405 without warning and, if possible, confirmation.

The Concurrent DAI (CDAI) 14B (FIG. 19) is the MDT subsystem that generates InfoFrames. Its input is an InfoFrame Request from the Client 12 or Scheduler subsystems 18 and its output is an InfoFrame containing an external HTML text report contained in a file in the User Return Area. The working of the CDAI subsystem 14B, including how it is structured and the format of the resulting reports, are provided below.

The CDAI 14B may be a UNIX or NT process executing on the UNIX or NT Server platform. It is invoked by a Dispatcher component with the command line such as:

mdtqueryengine [-c <config>][-e <errlog>]

where the config name and the errlog name are optional Configuration file and Error Log names respectively, inherited by the Dispatcher from the Master's command line when the Master invokes it.

Certain features of the CDAI's 14B function may be determined by the value of attributes defined in a Configuration file. These attribute values specify the thresholds for Interestingness Heuristics, Localization Parameters and etc.

The CDAI 14B will generate an InfoFrame for the User and Error Logs for the MDT Administrator in the local text. The User's local (and language) may not be the same as the Administrator's however. For this reason, the CDAI 14B may reference two Message Catalogs to collect localized text. The Native catalog will be used as a source for localized text for InfoFrames. The Error catalog will be used as a source of localized text for the Error Log.

The text of the generated InfoFrame will be localizable. The localized names of Measures, Segments and Time Periods will be provided by the Client 12 or extracted from the Metadata. Other text will be kept as parameterized strings in an MDT Message Catalog. This is known as the Native catalog. The CDAI 14B will compute the name of the Native catalog from the value of the MsgCatalogPath attribute contained in the configuration file and the ISO language name provided by the client. A separate catalog must preferrably be kept to generate Error Logs in the MDT Administrators language.

The CDAI 14B will accept one mdt_InfoFrameRequest object in an RUN_ANALYST_REQUEST message. The Request may contain an InfoFrame Definition (mdt_InfoFrameDefinition), describing the InfoFrame to be generated. It may specify the type of the InfoFrame, the Segment(s) to be reported over, the Measure(s) to be reported on and the Time Period(s) to report for. In one embodiment, there are five types of Reports. These are:

Summarization—The basic analysis of a target measure over a target segment

Change Analysis—Summarization of the difference of a target measure over two separate time periods and over a target segment Measure Comparison—Summarization of the difference between two measures over a target segment Segment Comparison—Comparison of the same measure over two separate target segments Trend Analysis—Report of trends over time in the target measure and related measures over the target segment and related segments The Request may contain an InfoFrame Trigger (mdt_ InfoFrameTrigger). The Trigger defines a test for some condition in the data warehouse 24 and an Alert flag and may contain a "nested" InfoFrame Request. If the Request contains a Trigger, the CDAI 14B must only implement the InfoFrame Definition if the condition is true. If the condition is true, the CDAI 14B must also, if the Alert flag is true, generate an Alert and, if the Trigger contains an nested Request, execute the nested Request.

In general, the CDAI's 14B output will be an InfoFrame object containing a localized, extended HTML Report (see FIG. 12). The InfoFrame will be written into a file in the User Return Area (defined below).

The User Return Area is a directory whose path is given by the UserReturnAreaPath parameter fo the configuration file. On successful completion of the InfoFrame, the report will be named INF.<UID>.<UNQ> where UID is a User ID and UNQ is some string which guarantees that this file name will be unique from all other file names generated for this User.

The Unique identifier will be generated by the Dispatcher when it launches the CDAI 14B and will make it available to the CDAI 14B with the InfoFrame request. As each Report requires a unique name, a CDAI 14B instance can only generate one Report. Where an InfoFrame Request specifies more than one report, when a triggered request requires an Alert Report and 'other' Reports as well as 'the' Report, the CDAI 14B accepting the request will need to dispatch new CDAI's 14B to deal with this multitide of Reports.

The HTML extensions used to build the Report are described in further detail in U.S. patent application Ser. No. 08/742,003, filed Oct. 31, 1996, and entitled "Hypertext Markup Language (HTML) Eextensions For Graphical Reporting Over An Internet" and assigned to NCR Corporation, also the assignee of the present invention and patent application. U.S. patent application Ser. No. 08/742, 003 is incorporated herein by reference thereto.

These extensions will be interpreted by the Client viewer. The Report will contain either an InfoFrame Report, an Alert Report or an Error Report. An InfoFrame Report will be generated when the CDAI 14B successfully completes an InfoFrame definition. It will be generated by the ifgn_ Report class.

An Alert Report will be generated when an InfoFrame Request has a trigger and that trigger evaluates to true and the Alert flag is set. It will be generated by the ifgn_ AlertFrame class.

An Error Frame will be generated when the CDAI 14B is unable to evaluate a trigger or an InfoFrame definition and lives to tell about it. It will be generated by the ifgn_ ErrorFrame class.

The content of the InfoFrame Report (see FIG. 12) is highly variable, depending not only on the type of analysis required but on the values of the measures encountered. The Report may be organized in a variety of ways, such as a heading, four bulleted paragraphs, a table, etc. For example:
Heading Quotes the Analyst Description provided by the User when the Analyst is defined and names the Segments, Measures and Time Periods analysed and, if the Analyst had a trigger, the trigger terms and the time at which the trigger condition was satisfied.

Target Segment(s) Report—A bulleted paragraph which contains:

Target Segments—Text highlighting the results for the measure(s) over the segment(s) and time period(s) directly specified in the analyst definition. Additional measures are not reported in this section.

Parent Contribution—A bulleted paragraph highlighting any significant contribution made by the target segment(s) to its parent segment. This section is not included when the target segment(s) is a top level segment or if the target measure(s) contains a reference to a parent segment.

Sibling Comparison—A bulleted paragraph offering interesting comparisons of the target segment(s)' value to the values of its sibling segments. This section is not included when the target segment(s) is a top level segment.

Sibling Graphs—A bar or pie chart showing the values of the sibling segments or a Line graph showing trends. This graph is not produced if there are Drill Down segments.

Drill Down—A bulleted paragraph highlighting interesting relationships between the values of child segments in the drill down partition(s) to the value for the target segment. Drill Down partitions may be specified by the user in the analyst definition. If the user does not specify any drill down partitions, MDT automatically chooses one or more interesting partitions. See the section below on choosing drill down partitions to learn how they are automatically chosen. This section is not included when no child partition exists and no unrestricted attributes exist to create or if no existing or created partition is interesting.

Drill Down Graph—A bar or pie chart showing the values for the Drill Down Sements or a Line chart showing trends. This graph is not produced if there are no interesting Drill Down segments.

Formula Decomposition—A bulleted paragraph highlighting interesting contributions to the composite measure of its component measures. This section is included only when the target measure is a composite measure.

Measure Relationships—A bulleted paragraph describing possible causes for the difference between two values of the target measure (or the difference between the target and comparison measures for the Measure Comparison Analysis). The Summarization Analyis will not contain a Measure Relations paragraph.

Table

A table showing all the measure values reported during the analysis

Segments other than the Parent, Target or Comparison segment may be marked as hyperlinks (see again, e.g., FIG. 12). The underlying HREF will contain the information required to substitute this segment as the target segment for a new analyst of the same type, for the same measure, comparisons and periods.

The Alert Report is much more straight forward. It's most interesting characteristic is the hyperlink to the Analyst Name. When the InfoFrame Request was defined, an Analsyst may have been defined to optionally gather more information on the event. By selecting the hyperlink, the User can launch this Analyst. The text of the Alert frame may look like:

```
Alert: <Analyst Name>
<Target Segment>
<Additional Segment 1>
. . .
<Additional Segment n>
<Base Time Period Description>
Alert was triggered at <time alert triggered>
Click here to run <Analyst Name>now.
Trigger is:  <Measure Name>[<Operator><Measure Name>],
             <Measure Name>[<Operator><Measure Name>],
             <Measure Name>[<Operator><Measure Name>]
```

An Error Report may be simpler still. It is meant to communicate exactly one statement to the User 1405, a description of the error encountered. The format may be:

```
Error: <Analyst Name>
An Error Occurred at <time error occurred>
<Error Text>
```

The CDAI 14B may report errors to a server error log. The texts of the error messages are maintained in the error message catalog as parameterized, localizable strings.

4. DSM Subsystem 16 and Scheduler Subsystem 18

The data and schema manipulation subsystem 16 and scheduler subsystem 18 are described in further detail below.

The MDT Server 32 may implement two classes of Requests for the User 1405.

Interactive Requests; Metadata Fetch, Metadata Update, InfoFrame Scheduling, InfoFrame Status and etc. The Server will implement one Interactive Request at a time for each Client. That we handle one Interactive Request at a time is almost as interesting as that they are interactive so we will also call these Serial Requests.

Batch Requests; Trigger Requests and InfoFrame Generation. The Server must be able to implement multiple Batch Requests at a time. That we must handle multiple Batch Requests at a time is almost as interesting as that they are batch so we will also call these Concurrent Requests.

Each Concurrent Request will cause one or more queries against the Database. The ODBC standard supports asynchronous queries against the database but many implementations of ODBC do not. In these implementations, each Concurrent Request will require its own process. Because putting each Request in its own process allows us to work with many more ODBC implementations and passes responsibility for managing the memory and data structures for multiple Requests to the operating system, each Concurrent Request will be get its own process. This process will be the Concurrent instance.

If Serial Requests and returning results are made to be asynchronous events, a single Server instance might be able to handle all of the Server's Serial Requests. But implementing asynchronously, while not overly difficult, is rather pointless when each Client 12 can simply be handed a new Server instance. Each Client 12 is therefore assigned a Serial instance to handle its Interactive Requests.

Its important to note that Windows NT implements threads, and future revisions of the UNIX operating system should as well. Threads provide an opportunity to pass responsibility for handling asynchronous events to the operating system while still managing memory in a single process.

Also, for purposes of the present invention description, it will be assumed that the Serial and Concurrent instances will be implemented by unique executables, each implementing a subset of complete Server functionality appropriate to its Requests.

With reference to FIG. 25, the Server 32 may be implemented as a collection of cooperating processes. There will be five classes of processes, as described below:

The Master process 2511, responsible for accepting Client connections with the Server and assign the Client 12 a Serial instance.

The Serial instance 2512, responsible for executing all of this Clients Serial Requests. These will be Metadata Fetches and Updates, InfoFrame Scheduling Requests and etc. The Serial instance will queue Scheduled InfoFrame Requests in the Scheduler's Queue. The Serial instance will also get the Client's InfoFrame Generation Requests, a Concurrent Request, but it will pass this on the Dispatcher.

The Dispatcher process 2513, responsible for assigning a Concurrent instance to each Concurrent Request passed to it by the Serial instance or the Scheduler and for reporting the state of pending and executing Concurrent Requests.

The Concurrent instance 2514, responsible for executing a single Concurrent Request.

The Scheduler processes 18, responsible for passing InfoFrame Requests to the Dispatcher at the scheduled time.

Create relationships are indicated with white pointers 2501 from parent to child. Request relationships are indicated with black arrows 2502 from sender to recipient.

A process of the Server will share several resources in common to present a single state to the client. These are the Metadata, the Scheduler Queue and the Return Area.

When a User 1405 makes a change to the User's Metadata, that change must be visible to all of the User's subsequent InfoFrame Requests. When that User 1405 is the MDTA (Administrator) and the MDTA specifies changes to global Metadata, these changes must be visible to all subsequent Requests.

MDT's Metadata will be stored on the Customer's Data Warehouse 24. Accesses to this Metadata will be managed by the DSM 16. In order to optimize accesses to the Metadata, the DSM 16 will implement a shared memory, write through cache of the MDT tables.

Each User 1405 will use only a subset of Metadata, and for practical reasons that data will be re-organized from flat tables of the database into an application specific structure. Each of the User's Serial and Concurrent instances 2512, 2514 will need to keep a copy of this subset. This image will be constructed and maintained by the DAI 14.

When a User 1405 modifies a Metadata item, the DAI 14 will effect the change to the local image and will command the DSM 16 it update the data warehouse 24. The DSM 16 will write this change into the shared memory cache and through the cache to the warehouse 24.

Figure 26:
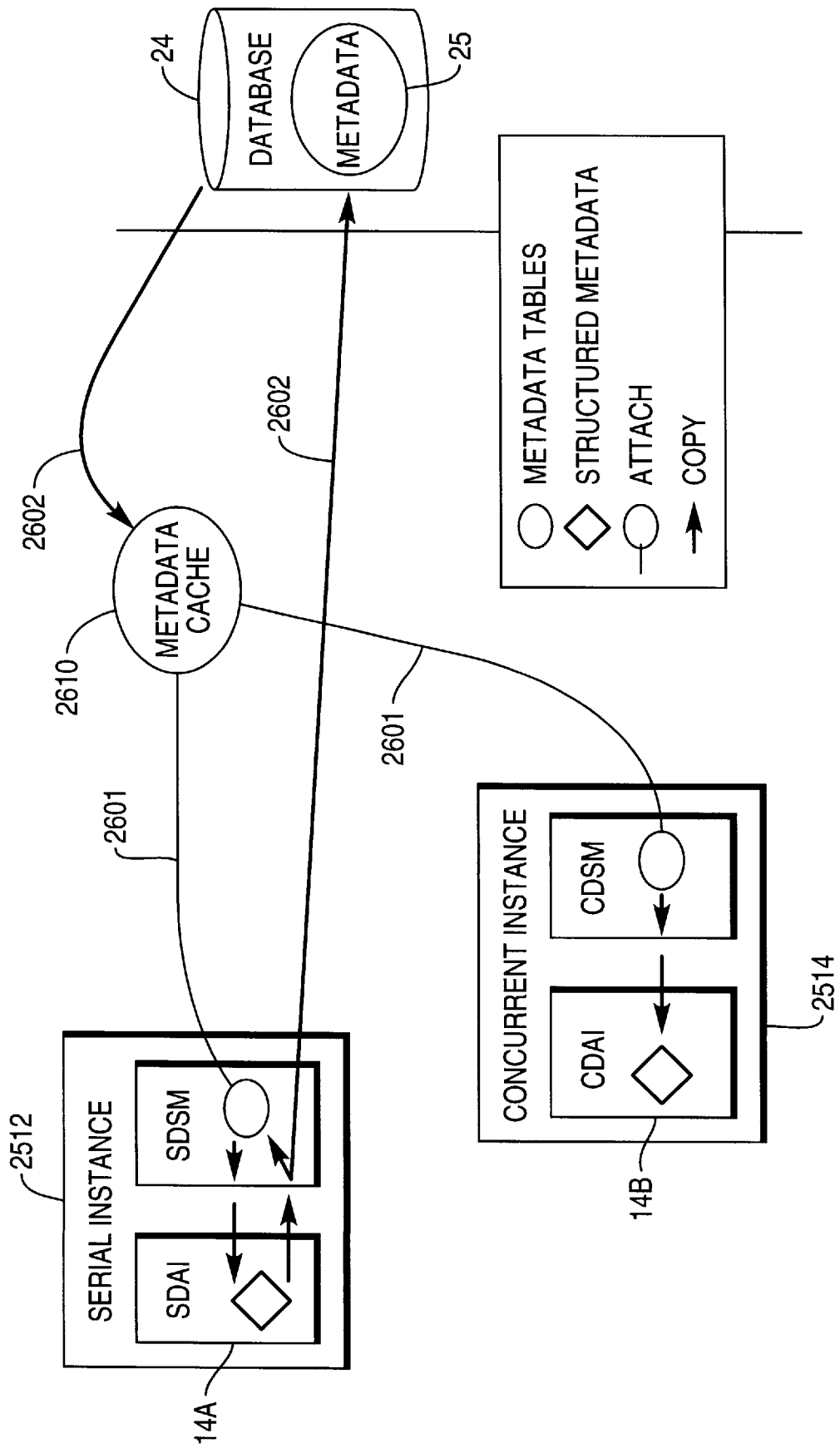
FIG. 26 is a diagram showing the relationships and operations with respect to metadata.

The relationships and operations on Metadata are illustrated schematically in FIG. 26. The light arrows 2601 represent attachments to the shared memory Metadata Cache 2610. The bold arrows 2602 represent the path of Metadata.

The present MDT invention will maintain a single Scheduler Queue which will list all of the InfoFrame Requests scheduled to execute at some future time or to execute at regular intervals.

When the User 1405 schedules an InfoFrame Request through the Client 12, the Schedule Request will be passed through the Serial instance 2512 to the Scheduler 18. The Scheduler 18 will accept the Request and will place the Request in the Schedule Queue. When the User 1405 deletes a Scheduled Request the Scheduler 18 will delete the Request from the Scheduler Queue. The DAI 14 will also accept a User's Schedule Status Requests. It will satisfy them by inspection of the Scheduler Queue.

At regular intervals, the Scheduler 18 will inspect the Scheduler Queue, will identify Requests that have come due and will pass them to the Dispatcher 2513. The Scheduler 18 will then remove non-recurring Requests from the Scheduler Queue.

The Dispatcher 2513 will create a Concurrent instance 2514 to execute the Requests. A Concurrent instance 2514 is a process and expect processes should be a limited resource which must be managed by the Dispatcher 2513. Thus, an InfoFrame Request passed to the Dispatcher 2513 may exist in one of two states: (1) pending (waiting for a process) and (2) Executing. The Dispatcher 2513 will keep a list of Pending and Executing Requests. When the User 1405 makes an InfoFrame Status Request, the Client 12 will pass it to the Serial instance 2512 and the DAI 14 will implement it. It will need to collect the list of the User's Request status from the Dispatcher 2513 to complete the Status Request.

The relationships and operations on the Scheduler Queue 2710 are illustrated schematically in FIG. 27. The path of the InfoFrame Request is represented by the black arrows 2701. Status Information regarding scheduled Requests and Pending or Executing Requests, which must be collected by the Serial instance in response to the Client's status Requests, is represented by White arrows 2702.

Completed InfoFrames will be parked in the Return Area between the time they are completed and the time the Client 12 calls to collect them. The Return Area is simply a directory on the file system. It will contain a sub-directory for each user 1405.

When the Concurrent instance 2514 completes an InfoFrame Request it will copy the InfoFrame into the User's sub-directory of the Return Area. Recurrent Requests may leave many InfoFrames in the Return Area. The Concurrent instance 2514 must generate unique names for each Report.

The Client 12 will occasionally pass InfoFrame Status Requests to the Serial instance 2512. The DAI 14 will implement the Request. The DAI 14 will need to inspect the User's sub-directory of the Return Area to identify the InfoFrames that have been completed. The DAI 14 might 'decode' the file names to produce Analyst names and execution dates to report to the Client 12.

The Client 12 will also occasionally pass InfoFrame Upload Requests to the Serial instance 2512. The DAI 14 will implement the Request. The DAI 14 will collect the InfoFrame from the User's sub-directory of the Return Area. It will pass the InfoFrame to the Client 12 and will remove the image from the Return Area when the Client 12 acknowledges receipt.

Figure 28:
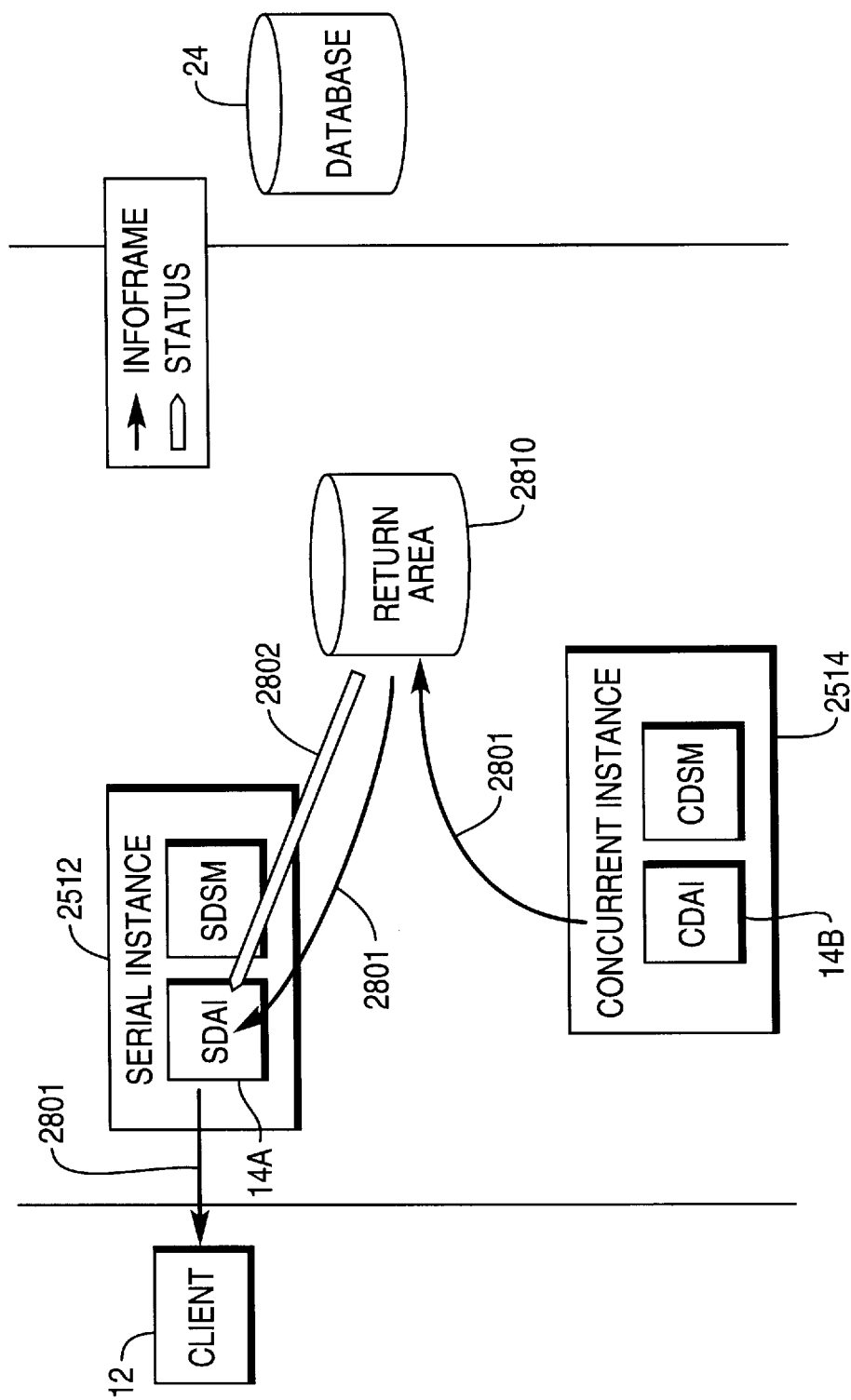
FIG. 28 is a diagram showing the relationships and operations with respect to the return area.

The relationships and operations on the Return Area 2810 are illustrated schematically in FIG. 28. The flow of the completed InfoFrame is represented by the black arrow 2801. The movement of status required by the Serial instance 2512 to satisfy a Client Status Request is represented by the white arrow 2802.

1. DSM Subsystem 16

The DSM Subsystem 16 is described in further detail below.

The SQL Generator receives a Dimensional Query from the InfoFrame Generator, generates the necessary database queries, and returns the results to the InfoFrame Generator. The interface to the database is through ODBC, which takes queries in the form of SQL strings.

The SQL Generator must query the database 24 to evaluate each Measure/Segment pair. The Measures may be from the dai_MeasureList. In the first form of QueryDatabase( ), the segments are the child segments of the targetPartition; in the second form, each Measure is evaluated only for the implied target segment. Each of the measures may be a Composite Measure, which may require multiple queries to evaluate the Measures that make up the Composite Measure.

Standard SQL programming techniques may be used to implement the DSM Subsystem 16.

2. Scheduler Subsystem 18

The scheduler subsystem 18 is described in further detail below.

The scheduler subsystem 18 is responsible for submitting Analysts with schedules and/or triggers to be run. It is also responsible for maintaining lists of scheduled and/or triggered Analysts; deleting, modifying and adding to those lists.

In this section, an Analyst which has a schedule, a trigger, or a schedule and a trigger will be referred to as a 'scheduled' Analyst unless there is a difference in the way the three types of Analysts behave.

When an InfoFrame request is received by the S-DAI subsystem 14A, it will be passed to the Scheduler subsystem 18 if it is associated with a scheduled Analyst. The Scheduler 18 will determine the proper time period in which to dispatch the Analyst. When it is scheduled to run, a request will be passed to the dispatcher 2513 as in the same manner that the S-DAI subsystem 14A passes non-scheduled requests.

Figure 29:
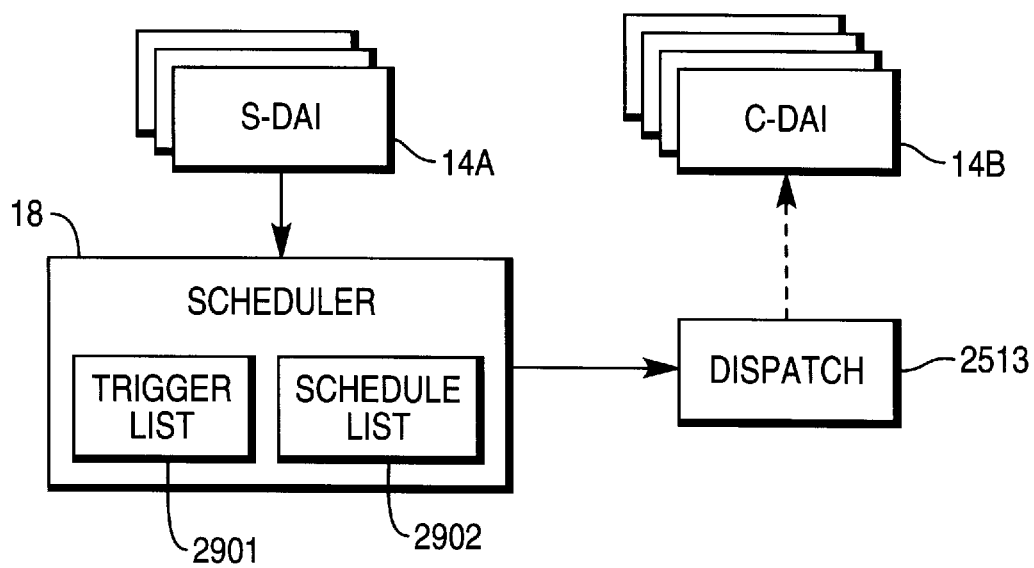
FIG. 29 is a diagram depicting the requests performed by an analyst.

FIG. 29 illustrates this process in further detail.

From the S-DAI 14A, the Scheduler 18 will receive scheduled InfoFrame requests, delete and disable user requests, delete scheduled Analyst requests. To uniquely identify requests, the S-DAI 14A must provide an Analyst id (contained in the InfoFrame request object) and a user id.

When a scheduled InfoFrame request is received, the Analyst is placed on the Trigger List 2901 if the Analyst has a trigger, or the Schedule List 2902 if it has either a schedule or a schedule and a trigger. The difference between a triggered Analyst and a scheduled, triggered Analyst is that the former is run at each trigger period while the latter is run only when scheduled.

The Scheduler 18 has two execution time periods, one for triggered requests and one for scheduled requests. The two time periods are configurable on each MDT server 32 and may be changed by the MDT Administrator.

When the trigger time period occurs, the Scheduler 18 traverses its list 2901 of triggered events. For those scheduled to run during that time slice and whose user account is enabled, a copy of the InfoFrame request without the trigger is passed to the Dispatcher 2513. An analogous process is followed for the schedule time period and schedule list 2902.

If a user 1405 is deleted, the Scheduler 18 will remove any Analysts from the lists which are owned by the deleted user. If a user 1405 is disabled, any Analysts on the lists will not run until the user 1405 is once again enabled. If an Analyst is modified, the user 1405 must explicitly remove any associated scheduled requests or they will continue to run with the old Analyst definition.

Although the present invention has been described with particular reference to certain preferred embodiments thereof, variations and modifications of the present invention can be effected within the spirit and scope of the following claims.

What is claimed is:

1. A system for analyzing a database, comprising:
   a) a database comprising data indicative of an organization;
   b) a server computer coupled to the database, the server computer including:
      i) means for defining a type of analysis to be performed on the data on a predetermined schedule including a trigger condition corresponding to a specified result of the analysis of the data in the database;
      ii) means for querying the database data according to the predetermined schedule defined by the defining means and analyzing the data according to the type of analysis defined; and
      iii) means for generating a report responsive to the querying means; and
   c) a client computer coupled to the server, the client computer including:
      i) means for receiving the report generated by the generating means; and
      ii) means for displaying the report to a user of the client computer.

2. The system of claim 1, wherein the querying means comprises a SQL server.

3. The system of claim 1, wherein the querying means comprises a SQL server.

4. The system of claim 1, wherein defining means includes means for defining a business indicator representing methods and formulae of analysis of data in the database and causal associations with other business indicators.

5. The system of claim 1, wherein the predetermined schedule defined by the defining means is a predetermined regular schedule.

6. The system of claim 1, wherein the predetermined schedule defined by the defining means is a predetermined period of time defined by a user of the system.

7. The system of claim 1, wherein the report generated by the generating means is based on a dimension of data different than a dimension of data for which the analysis is performed.

8. The system of claim 1, wherein the generating means is responsive to the querying means such that a report is generated when the trigger condition is satisfied.

9. A system for analyzing a database, comprising:
   a) a database comprising data indicative of an organization;
   b) a server computer coupled to the database, the server computer including:
      i) first means for receiving a request to analyze the data in the database;
      ii) means for querying the data in the database responsive to the receipt of the request by the receiving means and for analyzing the data according to the request;
      iii) means for generating a report responsive to the querying means, and corresponding to the request, wherein the report includes:
         a) a summary of the data queried by the querying means, and
         b) at least one hyperlink to a request to perform another type of analysis of the data; and
   c) a client computer coupled to the server computer, the client computer comprising:
      i) means for transmitting a request to analyze to the first receiving means;
      ii) second means for receiving the report generated by the generating means; and
      iii) means for displaying the report to a user of the system.

10. The system of claim 9, wherein the generating means generates a plurality of hyperlinks, wherein each of the plurality of hyperlinks points to request for performing another type of analysis of the data.

11. The system of claim 9, wherein the generating means includes means for generating at least one hyperlink that points to a request to perform a type of analysis of the data based on results of the analysis performed by the querying means.

12. In a computer system comprising a client computer, a server computer coupled to the client computer, and a database containing data coupled to the server computer, a system for analyzing the database, comprising the steps of:
   a) defining a type of analysis to be performed on the data on a predetermined schedule including a trigger condition corresponding to a specified result in the analysis of the data in the database;
   b) querying the database at the server computer according to the predetermined schedule and analyzing the data according to the type of analysis defined;
   c) generating a report at the server computer responsive to the querying means;
   d) transmitting the report to the client computer; and
   e) displaying the report to a user of the client computer.

13. The method of claim 12, wherein the defining step wherein defining means includes defining a business indicator representing methods and formulae of analysis of data in the database and casual associations with other business indicators.

14. The method of claim 12, wherein the predetermined schedule is a predetermined regular schedule.

15. The method of claim 12, wherein the predetermined schedule is a predetermined period of time defined by a user of the computer system.

16. The method of claim 12, wherein the generating step includes the step of generating a report based on a dimension of data different than a dimension of data for which the analysis is performed.

17. The method of claim 12, wherein the report is generated when the trigger condition of the defining step is satisfied.

* * * * *